(12) United States Patent
Yasumura

(10) Patent No.: US 7,298,633 B2
(45) Date of Patent: Nov. 20, 2007

(54) SWITCHING POWER SUPPLY CIRCUIT

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 246 days.

(21) Appl. No.: 10/523,755

(22) PCT Filed: Aug. 8, 2003

(86) PCT No.: PCT/JP03/10151

§ 371 (c)(1),
(2), (4) Date: Sep. 12, 2005

(87) PCT Pub. No.: WO2004/015849

PCT Pub. Date: Feb. 19, 2004

(65) Prior Publication Data

US 2006/0126364 A1 Jun. 15, 2006

(30) Foreign Application Priority Data

| Aug. 9, 2002 | (JP) | 2002-233630 |
| Aug. 9, 2002 | (JP) | 2002-233631 |
| Jun. 30, 2003 | (JP) | 2003-188344 |

(51) Int. Cl.
 *H02M 3/335* (2006.01)
 *H01F 17/00* (2006.01)
(52) U.S. Cl. ............................................. 363/21.02
(58) Field of Classification Search ................ 363/16, 363/17, 20, 21.01, 21.02, 21.04, 21.06, 21.12, 363/21.14, 97, 98, 131, 132
See application file for complete search history.

(56) References Cited

U.S. PATENT DOCUMENTS 5,835,368 A * 11/1998 Yasumura .................... 363/89
6,151,231 A * 11/2000 Saint-Pierre et al. .......... 363/95
6,370,041 B2 * 4/2002 Yasumura ..................... 363/19
6,396,717 B2 * 5/2002 Yasumura ................. 363/21.02

(Continued)

FOREIGN PATENT DOCUMENTS

JP        10-243648        9/1998

(Continued)

*Primary Examiner*—Matthew V. Nguyen
(74) *Attorney, Agent, or Firm*—Frommer Lawrence & Haug LLP; William S. Frommer; Thomas F. Presson

(57) ABSTRACT

A switching power supply circuit which can achieve enhancement of the power conversion efficiency is disclosed. In a composite resonance converter wherein a current resonance type converter constructed on the primary side and a primary side partial voltage resonance circuit are combined, a primary side DC input rectification circuit is formed from a full-wave rectification circuit. Further, a gap G of the core of an insulating converter transformer (PIT) is set to 2.0 mm to set the coupling coefficient of the primary winding (N1) and the secondary winding (N2) to approximately 0.81 of a loose coupling state. Further, the numbers of turns of the primary winding (N1) and the secondary winding (N2) are selected so that the induced voltage per one turn of the secondary winding (N2) is 2 V or less. With the configuration, if the leakage inductance (L1*l*) of the primary winding (N1) and the leakage inductance (L2*l*) of the secondary winding (N2) are increased, then reduction of the primary side current (I1) in a light load condition can be achieved and the switching output current (IQ1), (IQ2) can be reduced.

5 Claims, 27 Drawing Sheets

U.S. PATENT DOCUMENTS 6,496,389 B1 * 12/2002 Yasumura ................ 363/21.04
7,054,167 B2 * 5/2006 Yasumura .................... 363/16

FOREIGN PATENT DOCUMENTS

| JP | 2001-86749 | 3/2001 |
| JP | 2001-136746 | 5/2001 |
| JP | 2001-218460 | 8/2001 |

* cited by examiner

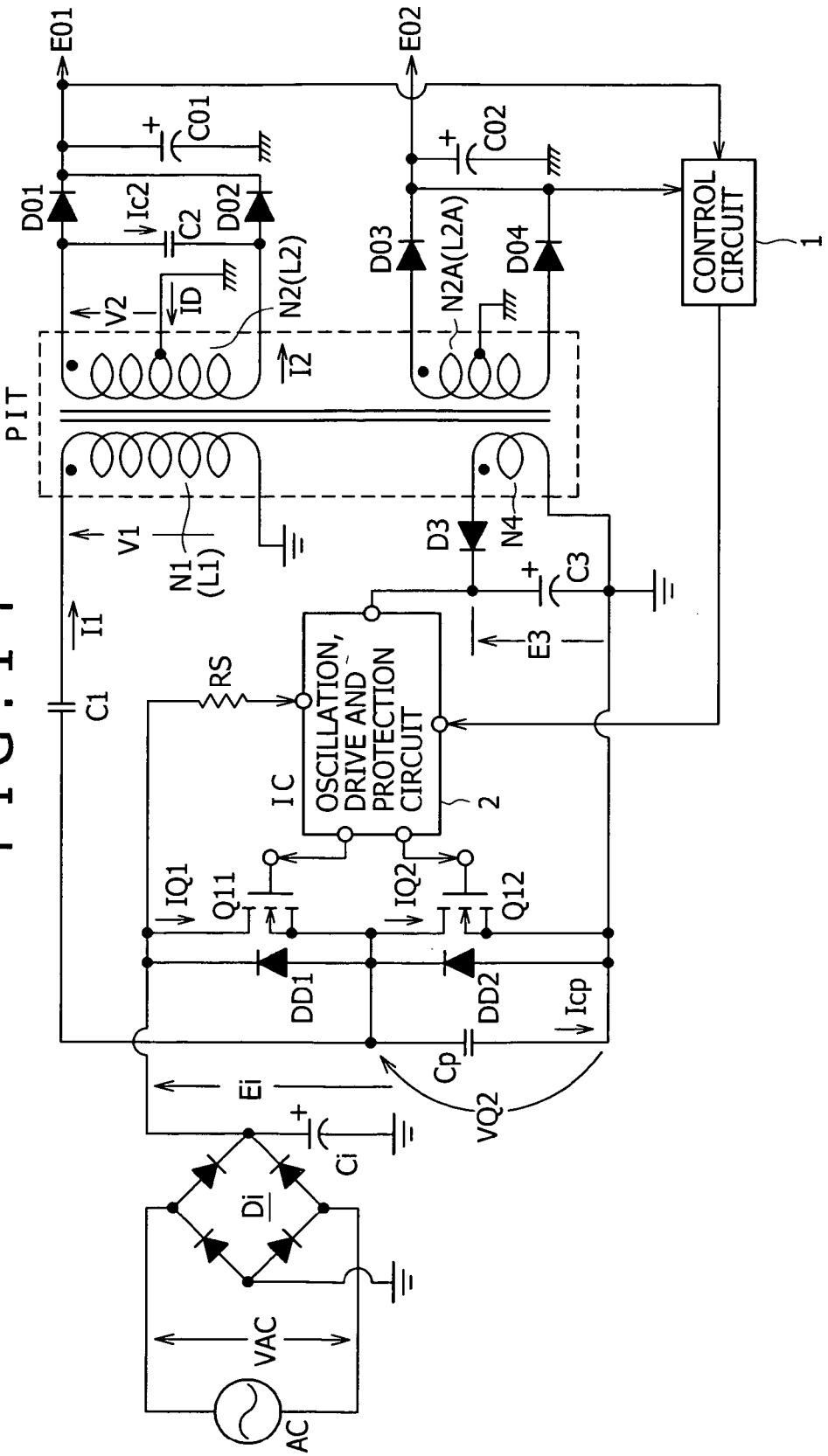
F I G. 1 4

SWITCHING POWER SUPPLY CIRCUIT

TECHNICAL FIELD

This invention relates to a switching power supply circuit provided as a power supply in various electronic apparatus.

BACKGROUND ART

Various switching power supply circuits are widely known including, for example, a switching power supply circuit of the flyback converter type or the forward converter type. The switching converters of the types mentioned are restricted in suppression of switching noise because the switching operation waveform is a rectangular waveform. Further, it is known that the switching converters are limited in enhancement in the power conversion efficiency from their operation characteristics.

Therefore, various switching power supply circuits which rely upon various resonance type converters have been proposed by the applicant of the present application. According to the resonance type converters, a high power conversion efficiency can be obtained readily, and low noise is achieved because the switching operation waveform is a sine waveform. Further, the resonance type converters have a merit also that they can be formed from a comparatively small number of parts.

FIG. 21 is a circuit diagram showing an example of a configuration of a power supply circuit which can be configured based on the invention proposed formerly by the applicant of the present application. The power supply circuit adopts a self-excited current resonance type converter.

The switching power supply circuit shown in this figure includes, as a rectification circuit system for producing a DC input voltage (rectified smoothed voltage Ei) from a commercial AC power supply (AC input voltage VAC), a voltage doubler rectification circuit including two rectification diodes D1 and D2 of the low speed recovery type and two smoothing capacitors Ci1 and Ci2 connected in such a manner as seen in the figure. In the voltage doubler rectification circuit, a rectified smoothed voltage Ei corresponding to twice the AC input voltage VAC is generated across the smoothing capacitors Ci1 and Ci2 connected in series.

The switching converter of the power supply circuit includes two switching elements Q1 and Q2 connected in half bridge connection and interposed between a positive electrode side node of the smoothing capacitor Ci1 and the ground point as seen in the figure. In this instance, a bipolar transistor (BJT; junction type transistor) having a withstanding voltage of 400 V is adopted for the switching elements Q1 and Q2.

Starting resistors RS1 and RS2 are inserted between the collector and the base of the switching elements Q1 and Q2, respectively.

Further, clamp diodes DD1 and DD2 are connected between the base and the emitter of the switching elements Q1 and Q2, respectively. In this instance, the cathode of the clamp diode DD1 is connected to the base of the switching element Q1, and the anode of the clamp diode DD1 is connected to the emitter of the switching element Q1. Meanwhile, the cathode of the clamp diode DD2 is connected to the base of the switching element Q2 and the anode of the clamp diode DD2 is connected to the emitter of the switching element Q2 similarly.

A series connection circuit of a base current limiting resistor RB1, a resonating capacitor CB1 and a driving winding NB1 is interposed between the base of the switching element Q1 and the collector of the switching element Q2. The capacitance of the resonating capacitor CB1 itself and the inductance LB1 of the driving winding NB1 cooperatively form a series resonance circuit.

Similarly, another series connection circuit of a base current limiting resistor RB2, a resonating capacitor CB2 and a driving winding NB2 is interposed between the base of the switching element Q2 and the primary side ground, and the resonating capacitor CB2 and the inductance LB2 of the driving winding NB2 cooperatively form a series resonance circuit for self oscillation.

An orthogonal control transformer PRT (Power Regulating Transformer) drives the switching elements Q1 and Q2 and performs constant voltage control in such a manner as hereinafter described.

The orthogonal control transformer PRT is formed as a saturable reactor of the orthogonal type wherein the driving windings NB1 and NB2 and a resonance current detection winding NA for detecting resonance current are wound and a control winding NC is wound in a direction orthogonal to those of the driving windings NB1 and NB2.

The orthogonal control transformer PRT is structured such that, though not shown in the drawings, two double channel-shaped cores having four magnetic legs are joined together at ends of the magnetic legs thereof to form a solid core. The resonance current detection winding NA and the driving winding NB are wound in the same winding direction on predetermined two ones of the magnetic legs of the solid core. Further, the control winding NC is wound in a direction orthogonal to that of the resonance current detection winding NA and the driving winding NB.

In this instance, the driving winding NB1 is connected at one end thereof to the base of the switching element Q1 through a series connection of the resonating capacitor CB1 and the base current limiting resistor RB1 and at the other end thereof to the collector of the switching element Q2. The driving winding NB2 is connected at one end thereof to the ground and at the other end thereof to the base of the switching element Q2 through a series connection of the resonating capacitor CB2 and the resistor RB2. The driving winding NB1 and the driving winding NB2 are wound such that voltages of the opposite polarities to each other are generated therein.

Meanwhile, the resonance current detection winding NA is connected at one end thereof to a node (switching output point) between the emitter of the switching element Q1 and the collector of the switching element Q2 and at the other end thereof to one end of a primary winding N1 of an insulating converter transformer (Power Isolation Transformer) PIT hereinafter described. It is to be noted that the number of turns (turn number) of the resonance current detection winding NA is, for example, approximately 1 T (turn).

The insulating converter transformer PIT transmits a switching output of the switching elements Q1 and Q2 to the secondary side.

The insulating converter transformer PIT is structured such that, as shown in FIG. 19, it includes an E-E type core formed from E type cores CR1 and CR2 made of, for example, a ferrite material and combined in such a manner that the magnetic legs thereof are opposed to each other as shown in FIG. 19. The primary winding N1 (N4) and a secondary winding N2 (N3) are wound in a divided state on the central magnetic leg of the E-E type core making use of a divisional bobbin B. In this instance, a Litz wire of approximately 60 mm$\phi$ is wound in a pattern winding on the divisional bobbin B to form the primary winding N1 (N4) and the secondary winding N2 (N3).

Further, in this instance, a gap G of 0.5 mm to 1.0 mm is formed in the central magnetic leg of the E-E type core. By the gap G, the coupling coefficient k of the primary winding N1 and the secondary winding N2 (N3) is set so that a loose coupling state of, for example, k≈0.8 is obtained.

The primary winding N1 of the insulating converter transformer PIT is connected at one end thereof to a node (switching output point) between the emitter of the switching element Q1 and the collector of the switching element Q2 through the resonance current detection winding NA so that a switching output may be obtained. The primary winding N1 is connected at the other end thereof to the primary side ground through a primary side series resonance capacitor C1 formed from, for example, a film capacitor.

In this instance, the primary side series resonance capacitor C1 and the primary winding N1 are connected in series, and the capacitance of the primary side series resonance capacitor C1 and a leakage inductance component of the insulating converter transformer PIT including the primary winding N1 (series resonance winding) cooperatively form a series resonance circuit for making operation of the switching converter as that of the current resonance type.

A primary side partial voltage resonance capacitor Cp for primary side partial voltage resonance is connected in parallel between the collector and the emitter of the switching element Q2, and the primary side partial voltage resonance capacitor Cp and the leakage inductance of the primary winding N1 form a partial voltage resonance circuit. Consequently, the switching elements Q1 and Q2 can perform zero voltage switching (ZVS) operation and zero current switching (ZCS).

With the primary side switching converter shown in the figure, operation of the current resonance type by the primary side series resonance circuit (L1-C1) and partial voltage resonance operation by the partial voltage resonance circuit (Cp//L1) are obtained.

In short, the power supply circuit shown in the figure adopts a form wherein a resonance circuit for making the primary side switching converter that of the resonance type is combined with another resonance circuit. In the present specification, a switching converter of the type just described is referred to as composite resonance type converter.

Further, on the secondary side of the insulating converter transformer PIT shown in the figure, the secondary windings N2 and N3 are wound independently of each other. Further, a bridge rectification circuit DBR and a smoothing capacitor C01 are connected to the secondary winding N2 to produce a secondary side DC output voltage E01. Meanwhile, a center tap is provided for the secondary winding N3, and rectification diodes D01 and D02 and a smoothing capacitor C02 are connected in such a manner as seen in the figure to the secondary winding N3 to form a full wave rectification circuit consisting of the [rectification diodes D01 and D02 and smoothing capacitor C02] to produce a secondary side DC output voltage E02.

In this instance, the secondary side DC output voltage E01 is branched and inputted also to a control circuit 1.

The control circuit 1 supplies DC current, whose level varies, for example, in response to the level of the secondary side DC output voltage E01 on the secondary side, as control current to the control winding NC of the orthogonal control transformer PRT to perform constant voltage control as hereinafter described.

As switching operation of the power supply circuit having the configuration described above, when a commercial AC power supply is made available first, starting current is supplied to the base of the switching elements Q1 and Q2, for example, through the starting resistors RS1 and RS2, and, for example, if the switching element Q1 is turned on first, then the switching element Q2 is controlled so as to be turned off. Then, resonance current flows as an output of the switching element Q1 through the resonance current detection winding NA→primary winding N1→primary side series resonance capacitor C1. The switching elements Q1 and Q2 are controlled so that the switching element Q2 is turned on and the switching element Q1 is turned off in the proximity of a point of time at which the resonance current becomes zero. Then, resonance current in the reverse direction flows through the switching element Q2. Thereafter, self-excited switching operation wherein the switching elements Q1 and Q2 are turned on alternately is started.

Since the switching elements Q1 and Q2 repeat on/off operations alternately using the terminal voltage of the smoothing capacitor Ci as an operation power supply in this manner, drive current having a waveform proximate to a resonance current waveform is supplied to the primary winding N1 of the insulating converter transformer PIT and an alternating output is obtained at the secondary windings N2 and N3.

The constant voltage control by the orthogonal control transformer PRT is performed in the following manner.

For example, if the secondary side DC output voltage E01 is varied by a variation of the AC input voltage or the load power, then the control circuit 1 variably controls the level of the control current to flow to the control winding NC in response to the variation of the secondary side DC output voltage E01.

By an influence of magnetic fluxes which are generated in the orthogonal control transformer PRT by the control current, the state of a saturation tendency of the orthogonal control transformer PRT changes, which acts to vary the inductance of the driving windings NB1 and NB2. As a result, the conditions of the self-excited oscillation circuit are varied to control the switching frequency fs to vary.

In the power supply circuit shown in the figure, the switching frequency fs is set in a frequency region higher than the resonance frequency of the series resonance circuit of the primary side series resonance capacitor C1 and the primary winding N1, and, for example, if the switching frequency fs becomes higher, then the switching frequency fs is spaced away from the resonance frequency of the series resonance circuit. Consequently, the resonance impedance of the primary side series resonance circuit to the switching output becomes higher.

Since the resonance impedance becomes higher in this manner, the drive current to be supplied to the primary winding N1 of the primary side series resonance circuit is suppressed, and as a result, the secondary side DC output voltage is suppressed thereby to achieve constant voltage control.

FIG. 22 is a circuit diagram showing an example of a configuration of another power supply circuit which can be configured based on the invention proposed formerly by the applicant of the present application. It is to be noted that like elements to those of the power supply circuit shown in FIG. 21 are denoted by like reference characters and description thereof is omitted herein.

Also the power supply circuit shown in FIG. 22 includes a current resonance type converter wherein two switching elements Q11 and Q12 are connected in a half bridge connection, but the driving method thereof is the separate excitation method. In this instance, a MOS-FET or an IGBT (Insulated Gate Bipolar Transistor) is adopted for the switching elements Q11 and Q12.

Further, in this instance, a rectification smoothing circuit formed from a bridge rectification circuit Di and a smoothing capacitor Ci rectifies and smoothes an AC input voltage VAC of a commercial AC power supply AC to produce a DC input voltage, for example, equal to a peak value of the AC input voltage VAC.

The switching elements Q11 and Q12 are connected at the gate thereof to an oscillation and drive circuit 11. The drain of the switching element Q11 is connected to the positive electrode of the smoothing capacitor Ci while the source of the switching element Q11 is connected to the primary side ground through the primary winding N1 and the primary side series resonance capacitor C1. Meanwhile, the drain of the switching element Q12 is connected to the source of the switching element Q11, and the source of the switching element Q12 is connected to the primary side ground.

Also here, a primary side partial voltage resonance capacitor Cp for primary side partial voltage resonance is connected in parallel to the drain-source of the switching element Q12.

Further, clamp diodes DD1 and DD2 are connected in parallel between the drain and the source of the switching elements Q11 and Q12.

The switching elements Q11 and Q12 are driven for switching so that switching operation similar to that described hereinabove with reference to FIG. 21 by the oscillation and drive circuit 11 may be obtained.

In particular, the control circuit 1 in this instance supplies current or a voltage of a level, which varies in response to a variation of the secondary side DC output voltage E01, to the oscillation and drive circuit 11 on the primary side through a photo-coupler PC. The oscillation and drive circuit 11 outputs a switching driving signal (voltage), whose period varies in response to the output level from the control circuit 1, alternately to the gates of the switching elements Q11 and Q12 so that stabilization of the secondary side DC output voltage E01 may be achieved. The switching frequency fs of the switching elements Q11 and Q12 is varied thereby.

In this instance, the oscillation and drive circuit 11 inputs a DC voltage E3 of a low voltage obtained by a rectification circuit formed from a rectification diode D3 and a capacitor C3 to the tertiary winding N4 formed on the primary side of the insulating converter transformer PIT so as to use the DC voltage E3 as an operation power supply. Further, the rectified smoothed voltage Ei is inputted through a starting resistor RS to start the oscillation and drive circuit 11.

FIG. 23 is a view showing operation waveforms of principal components of the power supply circuit shown in FIG. 21.

It is to be noted that also the operation waveforms of the power supply circuit shown in FIG. 22 are substantially similar to the operation waveforms of FIG. 23.

First, if the commercial AC power supply is made available and starting current is supplied, for example, through the starting resistor RS1 to the base of the switching element Q1 to turn on the switching element Q1, then the switching element Q2 is controlled so as to be turned off. Then, as an output of the switching element Q1, resonance current flows along the primary winding N1→primary side series resonance capacitor C1, and the switching elements Q1 and Q2 are controlled such that the switching element Q2 is turned on while the switching element Q1 is turned off in the proximity of a point of time when the resonance current becomes equal to zero. Thereafter, the switching elements Q1 and Q2 are controlled so as to be alternately turned on.

Consequently, within a period TON within which the switching element Q2 is on and another period TOFF within which the switching element Q2 is off, the collector-emitter voltage VQ2 of the switching element Q2 has such a waveform as shown in (a) of FIG. 23, and switching current IQ2 having such a waveform as shown in (b) of FIG. 23 flows to the collector of the switching element Q2.

Further, though not shown here, the collector-emitter voltage of the switching element Q1 and the switching current flowing to the switching element Q1 side have waveforms having a phase difference by 180° from the collector-emitter voltage VQ2 and the switching current IQ2 of the switching element Q2, respectively. In short, the switching elements Q1 and Q2 perform switching at timings at which they are turned on/off alternately.

In response to the switching operations of the switching elements Q1 and Q2, the primary side series resonance current I1 flowing to the primary side series resonance capacitor C1 has a sine waveform according to the switching period as shown in (c) of FIG. 23. In short, the primary side series resonance current I1 has a resonant waveform according to the current resonance type. An alternating voltage is excited also in the secondary winding N2 by an alternating voltage generated in accordance with current flowing through the primary winding N1.

Then, in response to the alternating voltage generated in the secondary winding N2 in such a manner as described above, such a waveform as shown in (e) of FIG. 23 is obtained as that of an inter-terminal voltage V2 between the input terminal of the positive electrode side and the input terminal of the negative electrode side of the bridge rectification circuit DBR connected to the secondary winding N2. In short, a waveform which is clamped at an absolute value level of a rectified smoothed voltage E0 within a period within which rectification current flows through the bridge rectification circuit DBR. The period within which the inter-terminal voltage V2 is clamped at the absolute value level of E0 corresponds to a period within which rectification current flows, and from this, it is indicated that, depending upon the inter-terminal voltage V2, the current flowing through the secondary winding N2 exhibits a discontinuous mode.

Further, to the primary side partial voltage resonance capacitor Cp connected in parallel to the switching element Q2, resonance current ICP flows only within a short period within which the switching elements Q1 and Q2 are turned on or turned off as shown in (d) of FIG. 23. In short, partial voltage resonance operation is performed.

Consequently, the switching elements Q1 and Q2 are controlled so as to perform ZVS operation and ZCS operation thereby to achieve reduction of the switching loss of the switching elements Q1 and Q2.

FIG. 24 is a view showing variation characteristics within the period TON of the AC-DC power conversion efficiency ($\eta$AC→DC), switching frequency fs and switching element Q2 when the load power Po of the secondary side DC output voltage E01 various from 0 W to 200 W when the AC input voltage VAC is VAC=100 V.

As shown in this figure, in the power supply circuit shown in FIG. 21, the switching frequency fs is controlled so as to decrease as the load power Po increases. Further, the switching element Q2 is controlled simultaneously such that the period TON within which the switching element Q2 is on increases.

Further, the AC-DC power conversion efficiency (ηAC→DC) in this instance is approximately 91.8% when the load power Po is Po=200 W, but approximately 92.4% when the load power Po is Po=150 W. Thus, the highest efficiency state is obtained when the load power Po is Po=150 W.

It is to be noted that, when to obtain such an operation waveform shown in FIG. 23 and a characteristic as shown in FIG. 24, the constants of part devices shown in FIG. 21 are selected in the following manner.

First, as regards the insulating converter transformer PIT, the primary winding N1=secondary winding N2=45 T are wound. Further, the primary side series resonance capacitor C1=0.056 μF and the primary side partial voltage resonance capacitor Cp=330 pF are selected.

FIG. 25 is a view showing a further circuit example of a switching power supply circuit as a related art which can be configured based on the invention proposed by the applicant of the present application formerly. It is to be noted that like elements to those of the power supply circuits shown in FIGS. 21 and 22 are denoted by like reference characters and description thereof is omitted herein.

In the power supply circuit shown in this figure, a partial voltage resonance circuit is combined with a separately excited current resonance type converter. Further, the power supply circuit adopts a configuration which satisfies conditions for the commercial AC power supply AC=100 V system.

Also in the power supply circuit shown in this figure, a full-wave rectification smoothing circuit is provided as an input rectification circuit similarly as in the power supply circuit shown in FIG. 22.

Further, in the present power supply circuit, in order to drive switching elements Q11 and Q12 for switching, an oscillation, drive and protection circuit 2 formed from, for example, an IC for universal use is provided. The oscillation, drive and protection circuit 2 includes an oscillation circuit, a driving circuit and a protection circuit. The oscillation circuit and the driving circuit apply a drive signal (gate voltage) of a required frequency to the gate of the each switching elements Q11 and Q12. Consequently, the switching elements Q11 and Q12 perform switching operation such that they are turned on/off alternately with a required switching frequency.

Meanwhile, the protection circuit of the oscillation, drive and protection circuit 2 detects, for example, an overcurrent or overvoltage state of the power supply circuit and controls the switching operation of the switching elements Q11 and Q12 so that the circuit may be protected.

The secondary winding N2 and another secondary winding N2A having a smaller turn number than that of the secondary winding N2 are wound on the secondary side of the insulating converter transformer PIT. In the secondary side windings, an alternating voltage is excited in response to the switching output transmitted to the primary winding N1.

The secondary winding N2 is provided with a center tap as shown in the figure and connected at the center tap thereof to the secondary side ground. Further, a full-wave rectification circuit formed from rectification diodes D01 and D02 and a smoothing capacitor C01 is connected to the secondary winding N2 as shown in the figure. Consequently, a rectified smoothed voltage E01 is obtained as a voltage across the smoothing capacitor C01. The rectified smoothed voltage E01 is supplied to a load side not shown and is branched and inputted also as a detection voltage for the control circuit 1 which is described below.

Also the secondary winding N2A is connected at a center tap thereof to the secondary side ground, and another full-wave rectification circuit formed from rectification diodes D03 and D04 and a smoothing capacitor C02 is connected to the secondary winding N2A. Consequently, a secondary side DC output voltage E02 is obtained as a voltage across the smoothing capacitor C02. The secondary side DC output voltage E02 is supplied also as an operation power supply for the control circuit 1.

The control circuit 1 supplies a detection output corresponding to a level variation of the secondary side DC output voltage E01 to the oscillation, drive and protection circuit 2. The oscillation, drive and protection circuit 2 drives the switching elements Q11 and Q12 such that the switching frequency is varied in response to the detection output of the control circuit 1 inputted thereto. Since the switching frequency of the switching elements Q11 and Q12 is varied in this manner, the level of the secondary side DC output voltage is stabilized.

Here, in the power supply circuit having the configuration described above, a voltage of approximately 1.7 V is obtained as a DC voltage E3 to be supplied as an operation power supply of the oscillation, drive and protection circuit 2.

A voltage of approximately 135 V is obtained as the secondary side DC output voltage E01. Then, under this condition, the turn number T of the secondary winding N2 is selected so that 5 V/T may be satisfied, and the secondary winding current flowing to the rectification diodes D01 and D02 exhibits a continuous mode.

FIG. 26 is a waveform diagram illustrating operation of the power supply circuit shown in FIG. 25 within a switching period. Here, operation under the conditions that the AC input voltage VAC=100 V and the load power Po=125 W is illustrated.

In this instance, the collector-emitter voltage VQ2 of the switching element Q12 within a period TON within which the switching element Q12 is on and another period TOFF within which the switching element Q12 is off has such a waveform as shown in (a) of FIG. 26, and collector current IQ2 having such a waveform as shown in (b) of FIG. 26 flows to the collector of the switching element Q12.

Further, the period A within which sawtooth waveform current of the negative polarity by the exciting inductance L1 of the primary winding N1 flows as collector current IQ2 through the clamp diode DD2 becomes a power non-transmission period within which power transmission to the load side is not performed.

In contrast, another period B within which resonance current of the positive polarity by a leakage inductance component L1*l* of the primary winding N1 and the capacitance of the primary side series resonance capacitor C1 flows as collector current IQ2 is a power transmission period within which power transmission to the load side is performed.

In this instance, since such primary winding current I1 as illustrated in (d) of FIG. 26 flows to the primary side series resonance capacitor C1, a voltage V1 which exhibits the opposite polarities within the period TON and the period TOFF as seen in (c) of FIG. 26 is obtained across the primary winding N1 of the insulating converter transformer PIT.

Further, since such secondary side current ID as shown in (f) of FIG. 26 flows between the center tap of the secondary winding N2 and the secondary side ground, the inter-terminal voltage V2 across the winding starting end side of the secondary winding N2 and the secondary side ground has such a waveform as shown in (e) of FIG. 26.

FIG. 27 is a waveform diagram which illustrates operation in the conditions of the AC input voltage VAC=100 V and the load power Po=25 W within a switching period for comparison with the waveform diagram shown in FIG. 26 within a switching period.

In this instance, the collector-emitter voltage VQ2 of the switching element Q12 within a period TON within which the switching element Q12 is on and another period TOFF within which the switching element Q12 is off has such a waveform as shown in (a) of FIG. 27, and switching current IQ2 having such a waveform as shown in (b) of FIG. 27 flows to the collector of the switching element Q12. In this instance, as can be seen from comparison with the waveform shown in (b) of FIG. 26, the period A exhibits an expansion. From this, it can be recognized that, when the load power Po is Po=25 (when the load is low), the power transmission to the load side decreases and the power conversion efficiency drops.

To the primary side series resonance capacitor C1 in this instance, primary side series resonance current I1 of such a sine waveform as shown in (d) of FIG. 27 flows. Consequently, a voltage V1 of such a waveform as shown in (c) of FIG. 27 is obtained across the primary winding N1 of the insulating converter transformer PIT.

Further, since such secondary side current ID as shown in (f) of FIG. 27 flows between the center tap of the secondary winding N2 and the secondary side ground, the inter-terminal voltage V2 between the winding starting end side of the secondary winding N2 and the secondary side ground has such a waveform as shown in (e) of FIG. 27.

FIG. 28 shows variation characteristics of the AC-DC power conversion efficiency ($\eta$AC→DC), switching frequency fs and switching output current IQ1 and IQ2 with respect to a load power variation of the power supply circuit shown in FIG. 25. Here, the characteristics under the conditions of the AC input voltage VAC=100 V and the load power Po=0 W to 125 W are shown.

In this instance, it can be seen that the AC-DC power conversion efficiency ($\eta$AC→DC) has a tendency that it increases as the load increases. In particular, although the AC-DC power conversion efficiency ($\eta$AC→DC) in this instance is, for example, approximately 92% when the load power Po is Po=125 W, when the load power Po ix Po=50 W, the AC-DC power conversion efficiency ($\eta$AC→DC) drops to approximately 89%, and when the load power Po is Po=25 W, the AC-DC power conversion efficiency ($\eta$AC→DC) further drops to approximately 82.5%. In this instance, the AC input power in the no-load condition is 4.2 W.

Meanwhile, the switching frequency fs has a tendency that it increases proportionally as the load decreases.

Further, the peak values of the switching output current IQ1 and IQ2 when the load power Po is Po=125 W is 3.5 Ap, and the peak values of the switching output current IQ1 and IQ2 when the load power Po is Po=25 W is 3.0 Ap.

According to the configuration of the power supply circuit shown in FIG. 25, when the load power Po is Po=25 W, resonance current of the positive polarity is caused to flow by the leakage inductance component L1$l$ (L1$l$=42 µH) of the primary winding N1 and the capacitance of the primary side series resonance capacitor C1, and the period B within which power transmission to the load side is performed becomes shorter. Then, the power non-transmission period A within which sawtooth waveform current of the negative polarity is caused to flow by the exciting inductance L1 (L1=165 µH) of the primary winding N1 becomes longer. As a result, with the power supply circuit of the configuration shown in FIG. 25, the AC-DC power conversion efficiency ($\eta$AC→DC) in a low load condition drops.

It is to be noted that the measurement results illustrated in FIGS. 26 to 28 are obtained by selecting part elements of the power supply circuit of FIG. 25 in the following manner.

First, with regard to the insulating converter transformer PIT, the gap G is set to G=1.0 mm to select the coupling coefficient k of k=0.87. Then, the primary winding N1=24 T, secondary winding N2=23 T+23 T, and tertiary winding N4=2 T are wound.

Further, the primary side series resonance capacitor C1=0.068 µF and the primary side partial voltage resonance capacitor Cp=470 µF are selected.

It is to be noted that, as another related art relating to the present invention, for example, the official gazette of Japanese Patent Laid-Open No. Hei 8-066025 can be listed.

Incidentally, with a power supply circuit constructed as a current resonance type converter of the half bridge type so as to obtain a DC input voltage by means of a full-wave rectification circuit, there is a limitation to enhancement of the power conversion efficiency. More particularly, the load power with which a power conversion efficiency of approximately 92% can be assured is approximately 120 W in the maximum. For example, within a range of the load power of 125 W to 150 W in a heavier load condition, the power conversion efficiency is equal to or lower than 92%.

Therefore, if it is tried to obtain a higher power conversion efficiency with a power supply circuit which can cope with, for example, maximum load power of 150 W or more, then the power supply circuit is configured so as to obtain a DC input voltage by means of a voltage doubler rectification circuit as shown in FIG. 21. By the configuration, the power conversion efficiency can be enhanced to approximately 93%. However, in this instance, it is necessary to incorporate two smoothing capacitors in the voltage doubler rectification circuit, and the part cost becomes higher as the voltage withstanding property of the switching elements Q1 and Q2 and the resonance capacitors increases.

Further, as a problem common to the related art power supply circuits described above, particularly the power conversion efficiency drops as the load power decreases.

For example, taking the power supply circuit shown in FIG. 25 as an example, the AC-DC power conversion efficiency ($\eta$AC→DC) is approximately 89% when the load power Po is Po=50 W and approximately 82.5% when the load power Po is Po=25 W. Also in a no-load condition wherein the load power Po is Po=0 W, the AC input power is approximately 4.2 W.

In this manner, for the composite resonance type converters which include a current resonance type converter described above as the related art converters, a higher power conversion efficiency is demanded within a range from a heavy load condition to a light load condition.

DISCLOSURE OF INVENTION

Therefore, according to the present invention, taking the subject described above into consideration, a switching power supply circuit is configured in the following manner.

In particular, the switching power supply circuit includes a rectification smoothing section for receiving a commercial AC power supply as an input thereto and performing rectification smoothing operation for the commercial AC power supply to produce a rectified smoothed voltage, a switching section including a plurality of switching elements for interrupting the DC input voltage inputted thereto, and a driving section for driving the switching elements to switch.

The switching power supply circuit further includes a converter transformer including a primary winding and a secondary winding wound on a core having a magnetic leg having a gap of a predetermined length or more formed therein such that the primary winding and the secondary winding have a loose coupling state with a coupling coefficient equal to or lower than a required value and have numbers of turns set so that an induced voltage per one turn of the secondary winding is equal to or lower than a predetermined level, an output of the switching section obtained at the primary winding being transmitted to the secondary winding.

The switching power supply circuit further includes a primary side series resonance circuit formed at least from a leakage inductance component of the primary winding of the converter transformer and a capacitance of a primary side series resonance capacitor connected in series to the primary winding for making operation of the switching section as that of the current resonance type, a primary side partial voltage resonance circuit formed from a capacitance of a primary side partial voltage resonance capacitor connected in parallel to a predetermined one of the switching elements which form the switching section and a leakage inductance component of the primary winding of the converter transformer for performing partial voltage resonance operation only within a turnoff period of the switching element which forms the switching section, and a DC output voltage production section for performing rectification operation in which the DC output voltage production section receives an alternating voltage obtained at the secondary winding of the converter transformer as an input thereto to produce a secondary side DC output voltage.

According to the configuration described above, the switching power supply circuit of the present invention has a basic configuration as a composite resonance type converter wherein a current resonance type switching converter and a primary side partial voltage resonance circuit are combined on the primary side. In addition, a gap of a predetermined length or more is formed in the core of the converter transformer such that the primary winding and the secondary winding have a loose coupling state with a coupling coefficient equal to or lower than a required value. Further, the numbers of turns of the primary winding and the secondary winding are selected such that the induced voltage per one turn of the secondary winding is set to a voltage with which secondary side current to flow through the secondary side of the converter transformer exhibits a continuous operation mode. Consequently, since the primary side series resonance current to flow through the primary winding can be reduced together with a decrease of the load power, reduction of the power loss on the primary side can be achieved and enhancement of the AC-DC power conversion efficiency can be achieved.

Further, the switching power supply circuit of the present invention can be constructed in the following manner.

In particular, the switching power supply circuit includes a rectification smoothing section for receiving a commercial AC power supply as an input thereto and performing rectification smoothing operation for the commercial AC power supply to produce a rectified smoothed voltage, a switching section including a plurality of switching elements for interrupting the DC input voltage inputted thereto, and a driving section for driving the switching elements to switch.

The switching power supply circuit further includes a converter transformer including a primary winding and a secondary winding wound on a core having a magnetic leg having a gap of a predetermined length or more formed therein such that the primary winding and the secondary winding have a loose coupling state with a coupling coefficient equal to or lower than a required value and the secondary winding has a number of turns set so that an induced voltage per one turn of the secondary winding is equal to or lower than a predetermined level, an output of the switching section obtained at the primary winding being transmitted to the secondary winding.

The switching power supply circuit further includes a primary side series resonance circuit formed at least from a leakage inductance component of the primary winding of the converter transformer and a capacitance of a primary side series resonance capacitor connected in series to the primary winding for making operation of the switching section as that of the current resonance type, and a primary side partial voltage resonance circuit formed from a capacitance of a primary side partial voltage resonance capacitor connected in parallel to a predetermined one of the switching elements which form the switching section and a leakage inductance component of the primary winding of the converter transformer for performing partial voltage resonance operation only within a turnoff period of the switching element which forms the switching section.

The switching power supply circuit further includes a DC output voltage production section for performing rectification operation in which the DC output voltage production section receives an alternating voltage obtained at the secondary winding of the converter transformer as an input thereto to produce a secondary side DC output voltage, and a secondary side partial voltage resonance circuit formed from a capacitance of a secondary side partial voltage resonance capacitor connected in parallel to the secondary winding of the insulating converter transformer and a leakage inductance component of the secondary winding for performing partial resonance operation on the secondary side.

According to the configuration described above, the switching power supply circuit of the present invention has a basic configuration as a composite resonance type converter wherein a current resonance type switching converter and a primary side partial voltage resonance circuit are combined on the primary side. Further, a secondary side partial voltage resonance circuit is provided also on the secondary side, and besides a gap of a predetermined length or more is formed in the core of the insulating converter transformer such that the primary winding and the secondary winding have a loose coupling state with a coupling coefficient equal to or lower than a required value. Further, the numbers of turns of the primary winding and the secondary winding are selected such that the induced voltage per one turn of the secondary winding is set to a voltage with which rectification current to flow through the secondary side of the converter transformer exhibits a discontinuous operation mode.

By a partial voltage resonance action of the partial voltage resonance circuit, also the waveform of the primary side series resonance current to flow through the primary side series resonance capacitor C1 can be made an M-shaped waveform, and the current waveform of the current flowing through the switching element can be made an M-shaped waveform. Consequently, the peak level of the primary side series resonance current to flow through the primary side or the current to flow through the switching element where the load power is within a range from 200 W to 0 W can be lowered, and enhancement of the AC-DC power conversion efficiency can be achieved.

Further, a secondary side partial voltage resonance circuit is formed on the secondary side of the insulating converter transformer so that partial voltage resonance operation may be obtained on the secondary side. As the partial voltage resonance operation, partial voltage resonance current flows within a period within which a discontinuous mode is established as described above and no rectification current flows.

BRIEF DESCRIPTION OF DRAWINGS

FIG. 14 is a circuit diagram showing a switching power supply circuit of a fifth embodiment;

BEST MODE FOR CARRYING OUT THE INVENTION

In the following, embodiments of the present invention are described.

Figure 1:
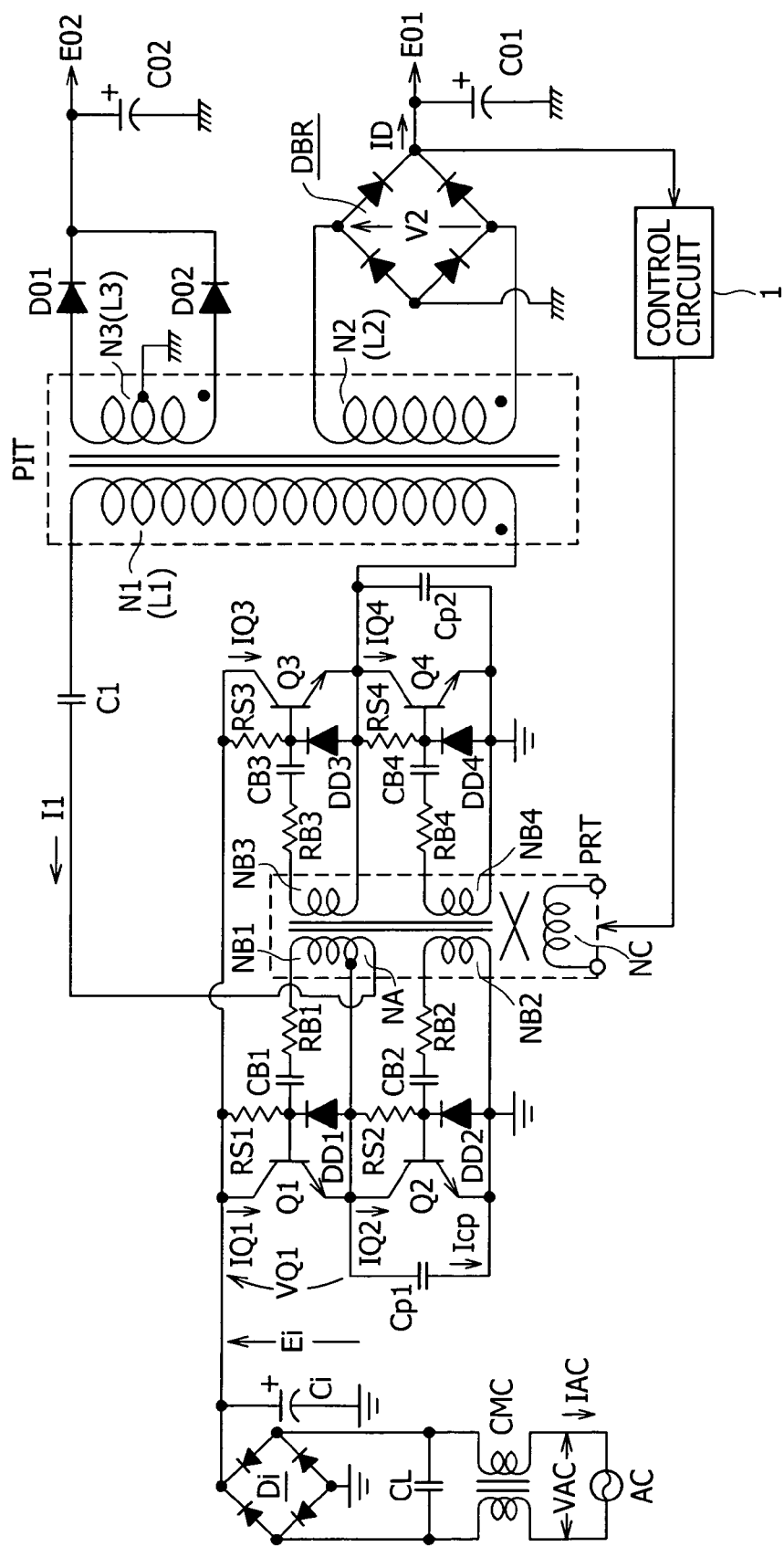
FIG. 1 is a circuit diagram of a switching power supply circuit of a first embodiment of the present invention.

FIG. 1 shows an example of a configuration of a switching power supply circuit as a first embodiment of the present invention.

The power supply circuit shown in FIG. 1 is a switching power supply circuit as a composite resonance type converter which includes, on the primary side, a self-oscillation current resonance type converter of a four-element configuration and a primary side partial voltage resonance circuit including a primary side partial voltage resonance capacitor.

In the present power supply circuit, a common mode choke coil CMC and a cross capacitor CL are provided as a noise filter for removing common mode noise from an commercial AC power supply AC and form a so-called line filter.

Further, as a rectification circuit system for producing a DC input voltage from a commercial AC power supply, a full-wave rectification smoothing circuit formed from a bridge rectification circuit Di and a smoothing capacitor Ci is provided and produces a rectified smoothed voltage Ei corresponding to a level equal to the AC input voltage VAC.

The current resonance type converter shown in this figure includes four switching elements Q1, Q2, Q3 and Q4 connected in a full bridge connection scheme as seen in the figure. In this instance, a bipolar transistor (BJT; junction type transistor) having a voltage withstanding property of 200 V is adopted for the switching elements Q1 to Q4.

The collectors of the switching elements Q1 and Q3 are connected to a line of the rectified smoothed voltage Ei (to the positive electrode of the smoothing capacitor Ci).

The emitter of the switching element Q1 is connected to the collector of the switching element Q2, and the emitter of the switching element Q2 is connected to the primary side ground.

The emitter of the switching element Q3 is connected to the collector of the switching element Q4, and the emitter of the switching element Q4 is connected to the primary side ground.

To the base of the switching element Q1, a self-oscillation driving circuit formed from a base current limiting resistor RB1, a resonating capacitor CB1 and a driving winding NB1 connected in series is connected. Here, the series connection of the resonating capacitor CB1 and the driving winding NB1 forms a series resonance circuit from the capacitance of the resonating capacitor CB1 and the inductance of the driving winding NB1, and the switching frequency is determined by the resonance frequency of the series resonance circuit. The base current limiting resistor RB1 adjusts the base current level as a driving signal to be supplied from the self-oscillation driving circuit to the base of the switching element Q1.

A damper diode DD1 is connected in a direction shown in the figure between the base and the emitter of the switching element Q1. Meanwhile, a starting resistor RS1 for supplying current upon starting to the base of the switching element Q1 is connected between the collector and the base of the switching element Q1.

Similarly, a self-oscillation driving circuit formed from a base current limiting resistor RB2, a resonating capacitor CB2 and a driving winding NB2 connected in series is connected to the base of the switching element Q2. The resonating capacitor CB2 and the driving winding NB2 form a series resonance circuit. A damper diode DD2 is connected between the base and the emitter of the switching element Q2, and a starting resistor RS2 is connected between the collector and the base of the switching element Q2.

Further, a self-oscillation driving circuit formed from a base current limiting resistor RB3, a resonance capacitor CB3 and a driving winding NB3 connected in series is connected to the base of the switching element Q3 similarly. The resonance capacitor CB3 and the driving winding NB3 form a series resonance circuit. A damper diode DD3 is connected between the base and the emitter of the switching element Q3, and a starting resistor RS3 is connected between the collector and the base of the switching element Q3.

Furthermore, a self-oscillation driving circuit formed from a base current limiting resistor RB4, a resonance capacitor CB4 and a driving winding NB4 connected in series is connected to the base of the switching element Q4 similarly. The resonance capacitor CB4 and the driving winding NB4 form a series resonance circuit. A damper diode DD4 is connected between the base and the emitter of the switching element Q4, and a starting resistor RS4 is connected between the collector and the base of the switching element Q4.

Primary side partial voltage resonance capacitors Cp1 and Cp2 are connected in parallel between the collector and the emitter of the switching elements Q2 and Q4, respectively.

The capacitance of the primary side partial voltage resonance capacitor Cp1 and the inductance component of the primary winding N1 of the insulating converter transformer PIT form a parallel resonance circuit (primary side partial voltage resonance circuit).

The primary side partial voltage resonance capacitor Cp1 performs partial voltage resonance operation wherein it resonates in voltage only within a short period of time within which the switching elements Q2 and Q3 are turned off. Meanwhile, the primary side partial voltage resonance capacitor Cp2 performs partial voltage resonance operation wherein it resonates in voltage only within a short period of time within which the switching elements Q1 and Q4 are turned off.

An orthogonal control transformer (drive transformer) PRT is provided to drive the switching elements Q1 to Q4 to switch and to variably control the switching frequency for constant voltage control.

The drive transformer PRT has driving windings NB1 to NB4 wound thereon and has a resonance current detection winding NA wound thereon making use of the driving winding NB1. Further, the drive transformer PRT is formed as a saturable rector wherein a control winding NC is wound in an orthogonal direction to the windings mentioned. It is to be noted that the windings are wound in such winding directions that voltages of the same polarity are excited in the driving winding NB1 and the driving winding NB4 and in the driving winding NB2 and the driving winding NB3 and besides voltages of the opposite polarities are excited in the driving winding NB1 and the driving winding NB2 and in the driving winding NB3 and the driving winding NB4. The number of turns (turn number) of the resonance current detection winding NA is, for example, approximately 1 T (turn).

In this instance, since a switching output obtained at the resonance current detection winding NA of the drive transformer PRT is induced in the driving windings NB1 to NB4 through a transformer coupling, an alternating voltage as a drive voltage is generated in the driving windings NB1 to NB4. This drive voltage is outputted as drive current from each series resonance circuit which forms a self-oscillation drive circuit to the base of the switching elements Q1 to Q4 through the base current limiting resistors RB1 to RB4. Consequently, each of the switching elements Q1 to Q4 performs switching operation in a switching frequency determined by the resonance frequency of the series resonance circuit.

The insulating converter transformer PIT transmits the switching outputs of the switching elements Q1 to Q4 to the secondary side.

The primary winding N1 of the insulating converter transformer PIT is connected at one end thereof to a node between the emitter of the switching element Q1 and the collector of the switching element Q2 through the series resonance capacitor C1 and the resonance current detection winding NA. The primary winding N1 is connected at the other end thereof to a node between the emitter of the switching element Q3 and the collector of the switching element Q4. Consequently, a switching output is obtained at the primary winding N1 as the set of the switching elements Q1 and Q4 and the set of the switching elements Q2 and Q3 alternately perform switching operation.

Further, the capacitance of the series resonance capacitor C1 and the leakage inductance component of the insulating converter transformer PIT including the inductance component of the primary winding N1 form a primary side series resonance circuit for making operation of the primary side switching converter as that of the current resonance type.

In this manner, with the primary side switching converter shown in the figure, operation of the current resonance type and partial voltage resonance operation described above are obtained compositely.

The switching operation of the present power supply circuit is, for example, such as follows.

First, if the commercial AC power supply AC is made available, then base current for starting is supplied to the base of the switching elements Q1 to Q4, for example, through the starting resistors RS1 to RS4. Here, since voltages of the opposite polarities to each other are excited, for example, in the driving windings NB1 and NB4 and the driving windings NB2 and NB3 of the drive transformer PRT, if the switching elements Q1 and Q4 are turned on first, then the switching elements Q2 and Q3 are controlled so as to be turned off. Then, the self-oscillation driving circuits of the switching elements Q1 to Q4 perform self-oscillation operation by resonance operation using the alternating voltages excited in the driving windings NB1 to NB4 as sources. Consequently, the set of the switching elements Q1 and Q4 and the set of the switching elements Q2 and Q3 are controlled so as to be turned on/off alternately. In other words, they perform switching operation.

Then, for example, when the switching elements Q1 are Q4 are on, resonance current flows, as a switching output of the switching elements Q1 and Q4, to the primary winding N1 and the primary side series resonance capacitor C1 through the resonance current detection winding NA. Then, in the proximity of a point of time at which the resonance current becomes "0", the switching elements Q1 and Q4 are turned off and the switching elements Q2 and Q3 are turned on. Consequently, resonance current flows in the opposite direction through the switching elements Q2 and Q3. Thereafter, self-excited switching operation wherein the set of the switching elements Q1 and Q4 and the switching elements Q2 and Q3 are alternately turned on by ZVS and ZCS is repeated. Further, when the switching elements Q1 to Q4 perform turn-on/off operation, current flows through the primary side partial voltage resonance capacitors Cp1 and Cp2 within a short period of time upon turning on and turning off of the switching elements Q1 to Q4. In other words, partial resonance operation is obtained.

Although a detailed structure is hereinafter described, a gap G of 1.5 mm or more is formed in a central magnetic leg of a core which forms the insulating converter transformer PIT. Thus, the primary winding N1 and the secondary windings N2 and N3 are wound on the core having such a structure as just described such that the coupling coefficient k between the primary winding N1 and the secondary windings N2 and N3 is, for example, 0.84 or less and exhibits a loose coupling state.

A bridge rectification circuit DBR and a smoothing capacitor C01 are connected in such a manner as seen in the figure to the secondary winding N2 to form a full-wave rectification circuit. A secondary side DC output voltage E01 is obtained across the smoothing capacitor C01 by full-wave rectification operation of the full-wave rectification circuit. The secondary side DC output voltage E01 is supplied to a load not shown. Further, the secondary side DC output voltage E01 is branched and inputted also as a detection voltage to the control circuit 1 as seen in the figure.

Further, on the secondary side, the secondary winding N3 is wound further. The secondary winding N3 is connected at a center tap point thereof to the secondary side ground. Further, the secondary winding N3 is connected at one end thereof to the anode of a diode D01 and at the other end thereof to another diode D02.

The cathodes of the diodes D01 and D02 are connected to the positive electrode side of the smoothing capacitor C02 thereby to form a full-wave rectification smoothing circuit to obtain a secondary side DC output voltage E02 which is, for example, a low voltage.

The control circuit 1 varies the control current (DC current) level to be supplied to the control winding NC in response to a level variation of the secondary side DC output voltage E01 to variably control the inductances LB1 to LB4 of the driving windings NB1 to NB4 wound on the drive transformer PRT. Consequently, the resonance condition of a series resonance circuit in each self-oscillation driving circuit is varied by the switching elements Q1 to Q4 formed including the inductances LB1 to LB4 of the driving windings NB1 to NB4 to vary the switching frequency of the switching elements Q1 to Q4 to achieve stabilization of the secondary side DC output voltage.

Figure 19:
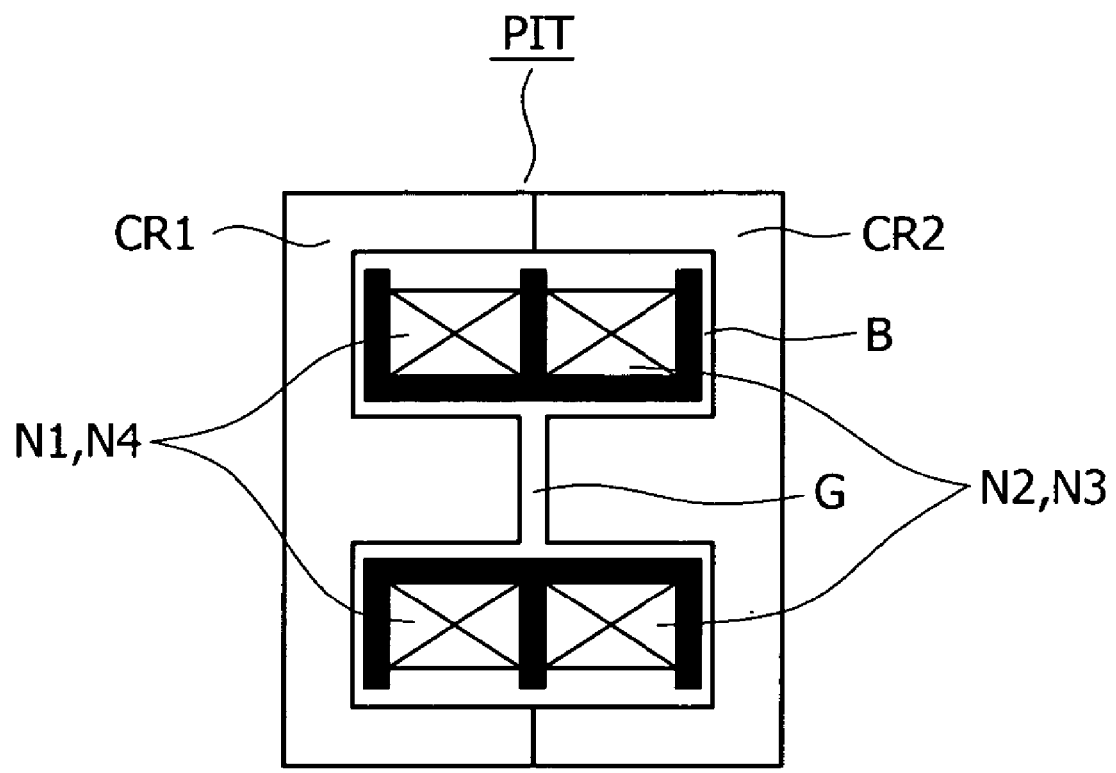
FIG. 19 is a sectional view showing an example of a structure of an insulating converter transformer provided in a power supply circuit of the present embodiment.
Figure 20:
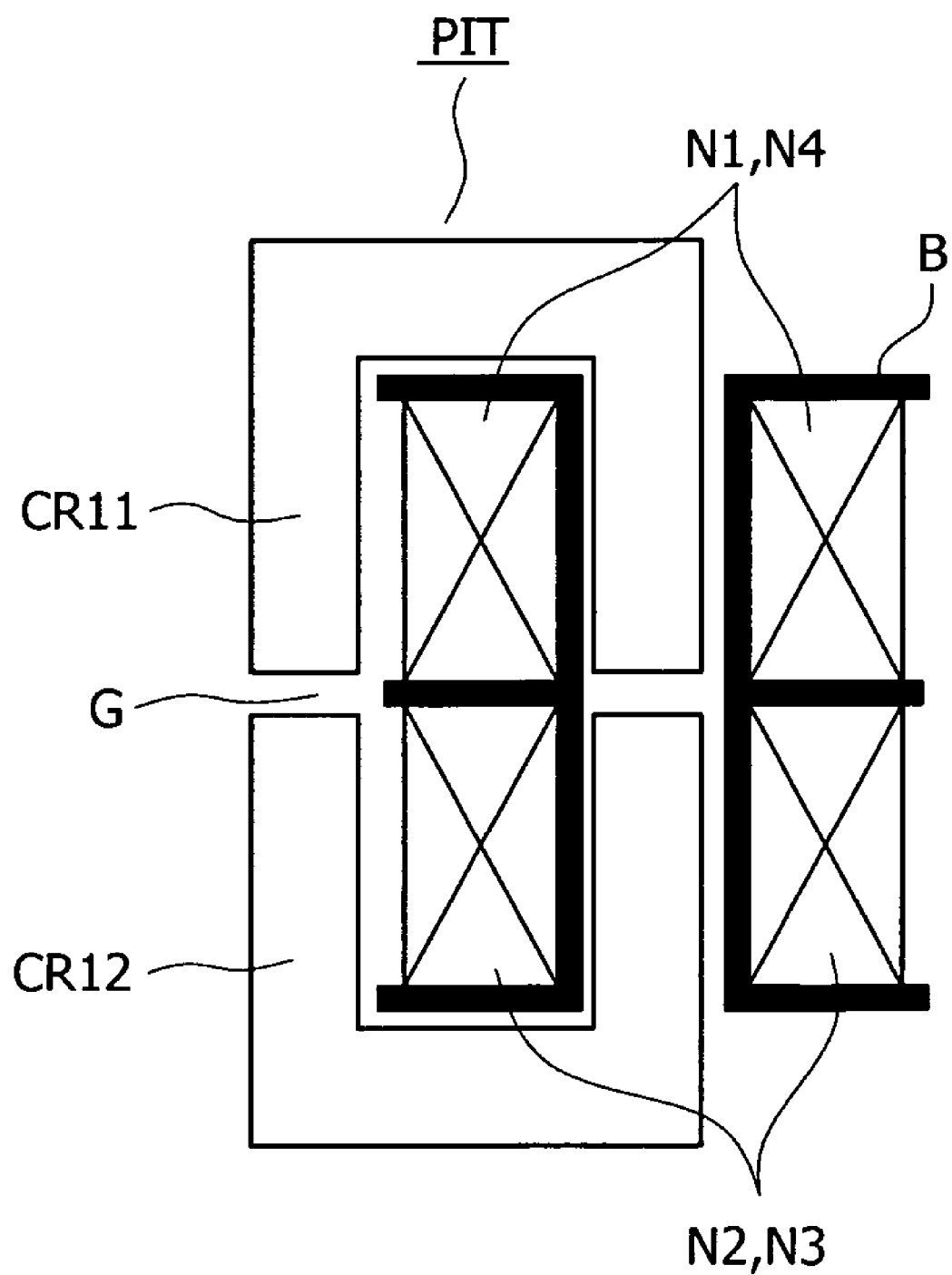
FIG. 20 is a sectional view showing an example of a structure of an insulating converter transformer provided in a power supply circuit of the present embodiment.

The structure of the insulating converter transformer PIT is a structure shown, for example, as a sectional view of FIG. 19 or FIG. 20, that is, a structure having a pair of E-E type cores or a pair of U-U type cores.

FIG. 19 shows an example of a structure which uses a pair of E-type cores.

As a core of the insulating converter transformer PIT, an E-E type core is formed by combining two E type cores CR1 and CR2 such that end portions of magnetic legs thereof are opposed to each other as seen in the figure. Further, in this instance, a gap G of 1.5 mm or more is formed between the opposing faces of the central magnetic legs of the E type cores CR1 and CR2.

It is to be noted that, for example, a ferrite material is used for the E type cores CR1 and CR2.

Further, in the present embodiment, in order to wind the primary windings N1 and N4 and the secondary windings N2 and N3 on the E-E type core (CR1, CR2) formed in such a manner as described above, a primary/secondary divisional bobbin B is used.

FIG. 20 shows an example of a structure which uses a pair of U type cores.

The insulating converter transformer PIT in this instance includes, as a core thereof, a U-U type core wherein U type cores CR11 and CR12 each having two magnetic legs are combined as shown in FIG. 20.

Further, the divisional bobbin B having the primary winding N1 and the secondary windings N2 and N3 wound in mutually divided winding regions thereof in such a manner as shown in the figure is attached to one of the magnetic legs of the U-U type core formed in such a manner as described above.

Also in this instance, a gap G of 1.5 mm or more is formed in the central magnetic leg of the U-U type core formed in such a manner as described above.

In this manner, in the power supply circuit shown in FIG. 1, from whichever one of the converters of FIGS. 19 and 20 the insulating converter transformer PIT is formed, the gap G of 1.5 mm or more is formed in the central magnetic leg of the E type cores CR1 and CR2 or the U type cores CR11 and CR12 so that the primary winding N1 and the secondary winding N2 may be coupled in a loose coupling state.

Furthermore, in the power supply circuit shown in FIG. 1, approximately 135 V is obtained as the secondary side DC output voltage E01. Further, the number of turns of the secondary winding N2 is selected so that the induced voltage per one turn of the secondary winding N2 may be equal to or less than 3 V/T (for example, 1.8 V/T) under the condition described. Consequently, the AC-DC power conversion efficiency ($\eta AC \to DC$) in a low load state wherein the load is, for example, approximately 5% of a maximum load power (for example, 200 W) is achieved.

Figure 2:
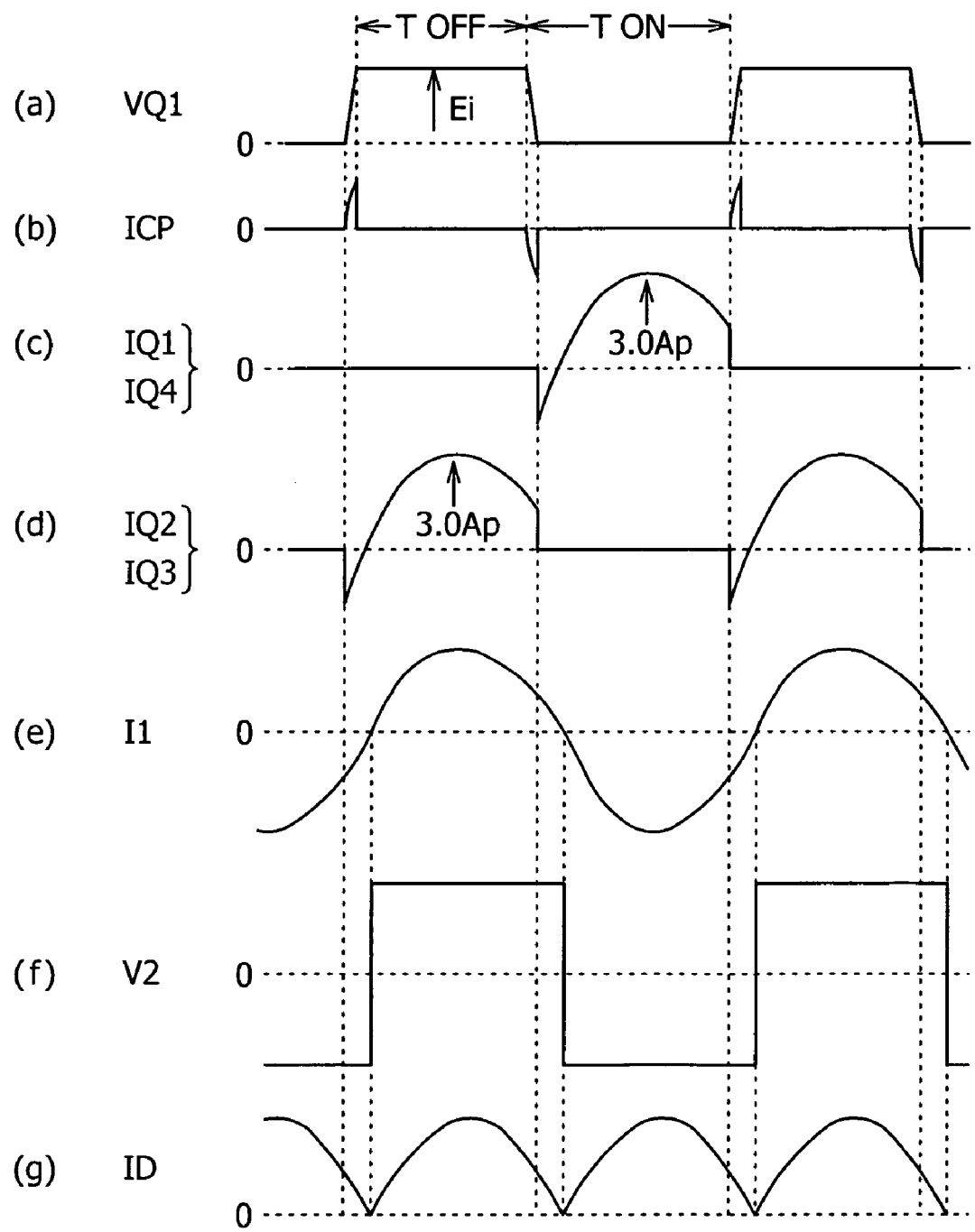
FIGS. 2(*a*) to (*g*) are waveform diagrams illustrating operation of the switching power supply circuit of the first embodiment.

FIG. 2 illustrates operation waveforms of different components where the AC input voltage VAC is VAC=100 V and the load power Po is Po=200 W.

Figure 3:
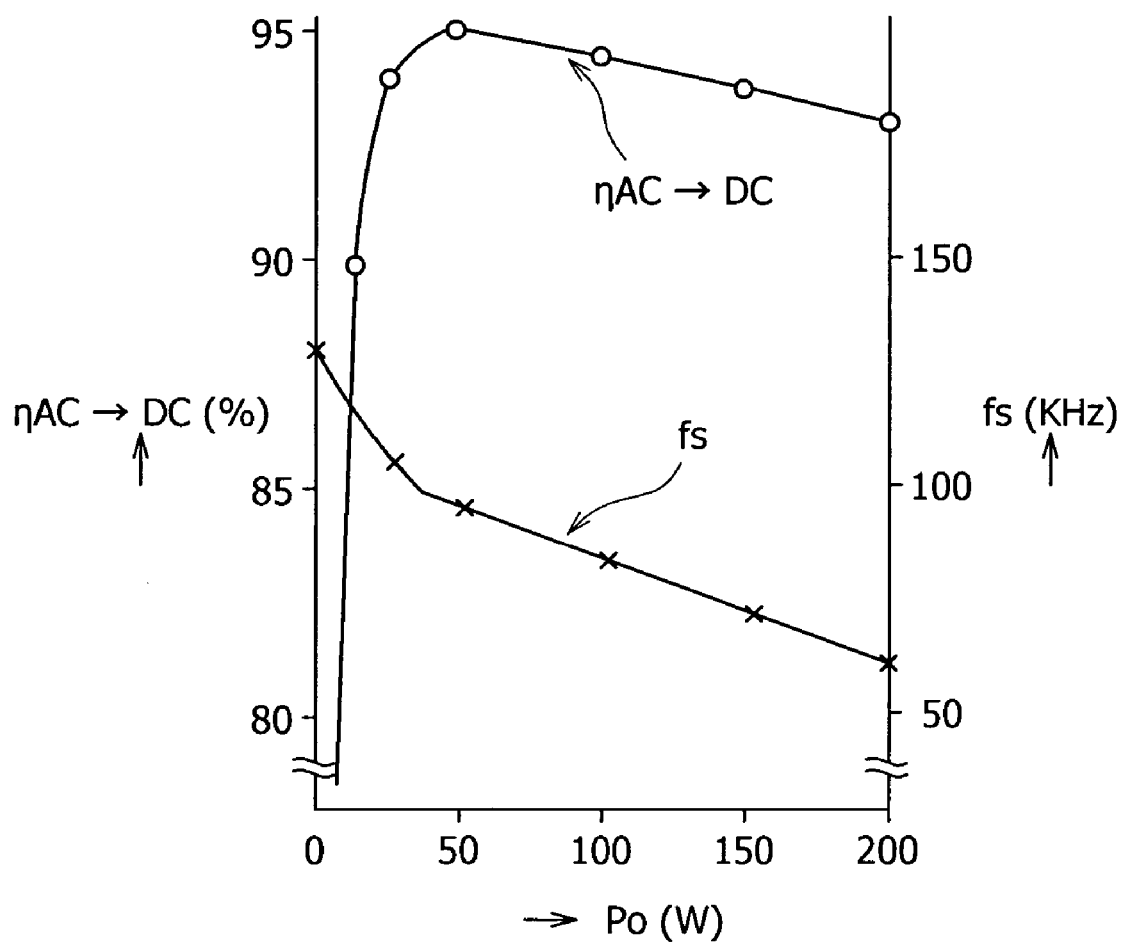
FIG. 3 is a characteristic diagram illustrating a characteristic of the switching power supply circuit of the first embodiment.

FIG. 3 illustrates variation characteristics of the AC-DC power conversion efficiency ($\eta AC \to DC$) and the switching frequency fs when the AC input voltage VAC is VAC=100 V and the load power Po varies from 0 W to 200 W.

It is to be noted that, when to obtain the measurement results illustrated in FIGS. 2 and 3, part elements of the power supply circuit shown in FIG. 1 are selected in the following manner.

First, as regards the insulating converter transformer PIT, the gap G is set to G=1.5 mm to select the coupling coefficient k=0.81. Further, the primary winding N1=20 T, secondary winding N2=75 T, exciting inductance L1=95 µH, leakage inductance L1$l$=32 µH, exciting inductance L2=950 µH, and leakage inductance L2$l$=318 µH are selected. Further, the primary side series resonance capacitor C1=0.092 µF is selected.

As seen in FIG. 2, operation of the switching elements Q1 to Q4 of the power supply circuit is indicated by the collector-emitter voltage VQ1 of the switching element Q1 illustrated in (a) of the figure, switching current IQ1 and IQ4 illustrated in (c) of the figure and the switching current IQ2 and IQ3 illustrated in (d) of the figure. In this instance, the switching elements Q1 and Q4 perform switching operation such that they exhibit an on state within a period TON and exhibit an off state within a period TOFF.

Here, if the switching elements Q1 and Q4 are turned on, then resonance current flows along a path of the switching element Q1→primary side series resonance capacitor C1→primary winding N1→switching element Q4. Then, the switching elements Q1 to Q4 are controlled such that the switching elements Q2 and Q3 are turned on and the switching elements Q1 and Q4 are turned off in the proximity of a point of time at which the resonance current becomes equal to zero. Consequently, the resonance current flows along a path of the switching element Q3→primary winding N1→primary side series resonance capacitor C1→switching element Q2. Thereafter, the switching elements Q1 to Q4 are controlled such that the switching elements Q1 and Q4 and the switching elements Q2 and Q3 are turned on alternately.

Further, through the primary side partial voltage resonance capacitor Cp1 connected in parallel to the switching element Q2, such resonance current ICP as illustrated in (b) of FIG. 2 flows within a short period of time within which the switching element Q2 is turned on or turned off. Further, though not shown in the figure, also through the primary side partial voltage resonance capacitor Cp2 connected to the switching element Q4, partial resonance current flows within a short period of time within which the switching element Q4 is turned on or turned off.

Consequently, switching current IQ1 and IQ4 flowing through the collector-emitter of the switching elements Q1 and Q4 has such a waveform as illustrated in (c) of FIG. 2. Further, the switching current IQ2 and IQ3 flowing through the switching elements Q2 and Q3 has a waveform having a phase displaced by 180 degrees from that of the switching current IQ1 and IQ4 and has such a waveform as shown in (d) of FIG. 2.

In this instance, the primary side series resonance current I1 flowing through the primary side series resonance capacitor C1 has such a sine waveform as shown in (e) of FIG. 2, and the primary side series resonance current I1 in the negative direction flows through the switching element Q1 while the primary side series resonance current I1 in the positive direction flows through the switching element Q2. In other words, drive current having a waveform proximate to a resonance current waveform is supplied to the primary winding N1 connected in series to the primary side series resonance capacitor C1 as the set of the switching elements Q1 to Q4 and the set of the switching elements Q2 and Q3 perform on/off operations alternately. An alternating voltage is excited also in the secondary winding N2 by an alternating voltage generated in response to the current flowing through the primary winding N1.

Then, the inter-terminal voltage V2 between the positive side input terminal and the negative side input terminal of the bridge rectification circuit DBR connected to the secondary winding N2 is obtained with such a waveform as shown in (f) of FIG. 2 in response to the alternating voltage generated in the secondary winding N2 in such a manner as described above. In short, a waveform which is clamped at the absolute value level of the rectified smoothed voltage E0 within a period within which rectification current flows through the bridge rectification circuit DBR is obtained.

Current ID having such a waveform as shown in (g) of FIG. 2 is outputted from the bridge rectification circuit DBR. In this instance, a continuous operation mode wherein the secondary side current ID flows continuously to the bridge rectification circuit DBR is exhibited as seen from (g) of FIG. 2.

Figure 21:
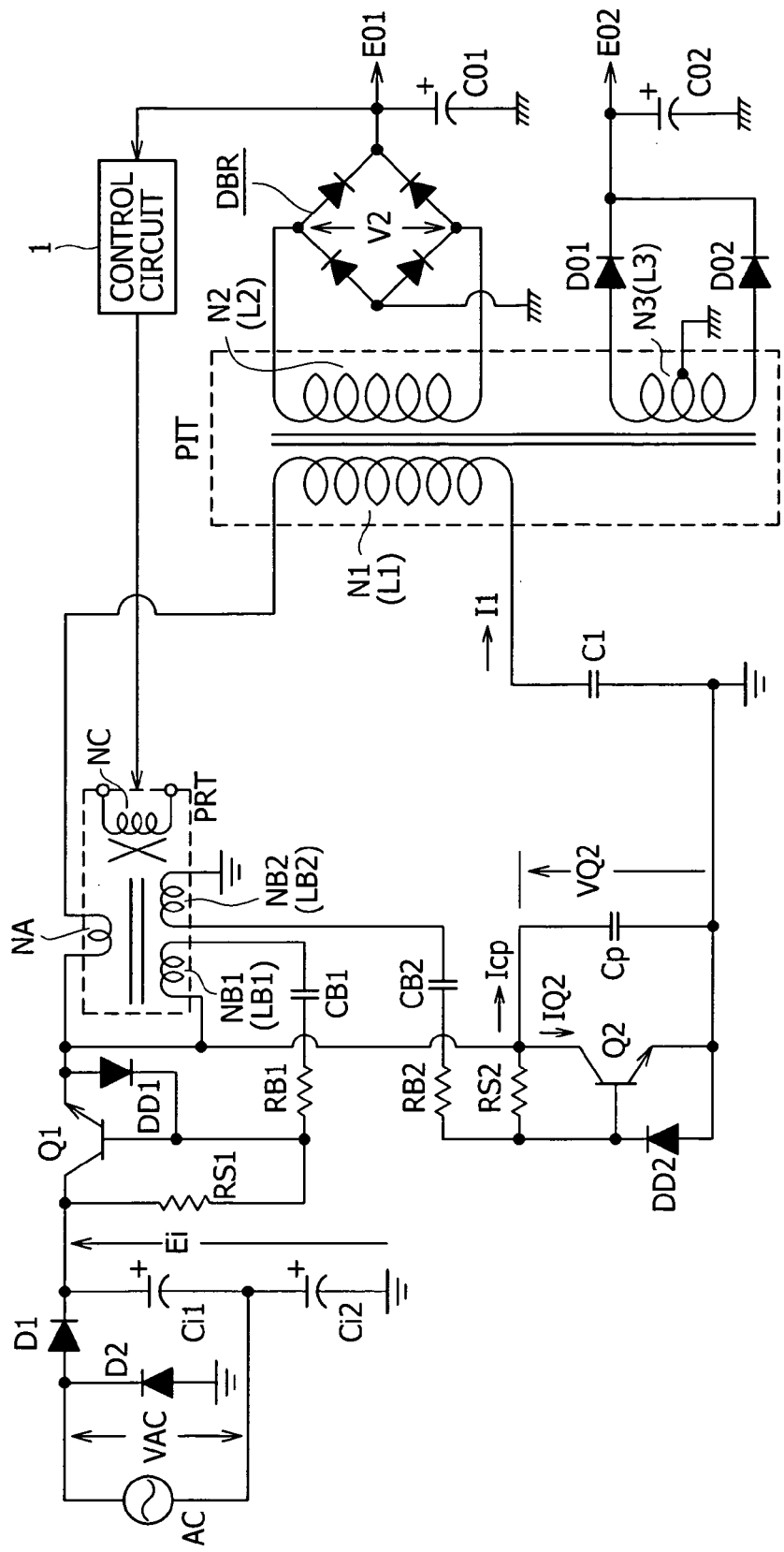
FIG. 21 is a circuit diagram showing an example of a configuration of a switching power supply circuit as a related art.
Figure 22:
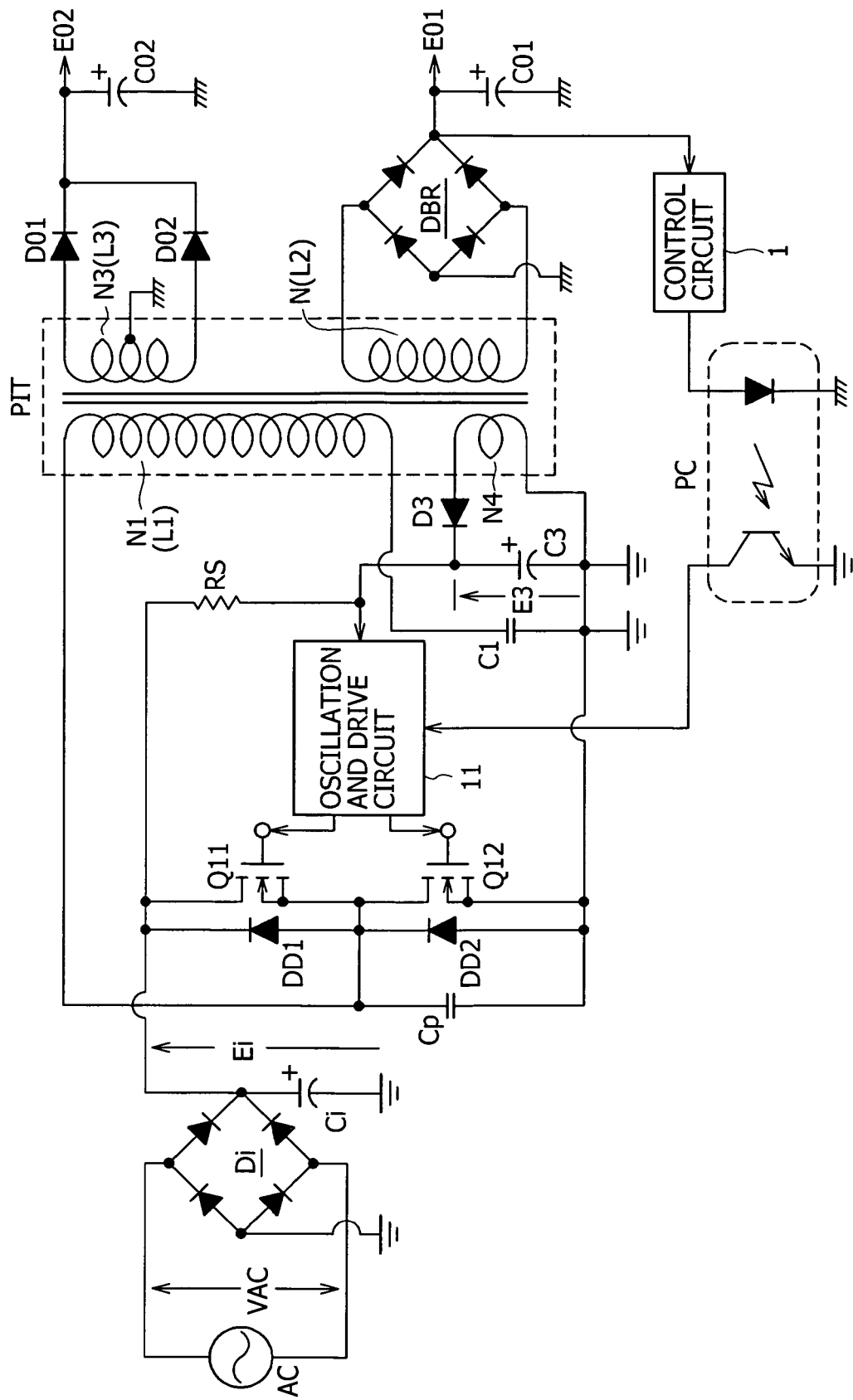
FIG. 22 is a circuit diagram showing another example of a configuration of a switching power supply circuit as a related art.

Here, for example, in the related art power supply circuits shown in FIGS. 21 and 22, a so-called discontinuous operation mode is exhibited wherein the secondary side current ID flows to the bridge rectification circuit DBR on the secondary side only within a series resonance period between the leakage inductance component L1$l$ of the primary winding N1 of the insulating converter transformer PIT and the primary side series resonance capacitor C1.

Figure 24:
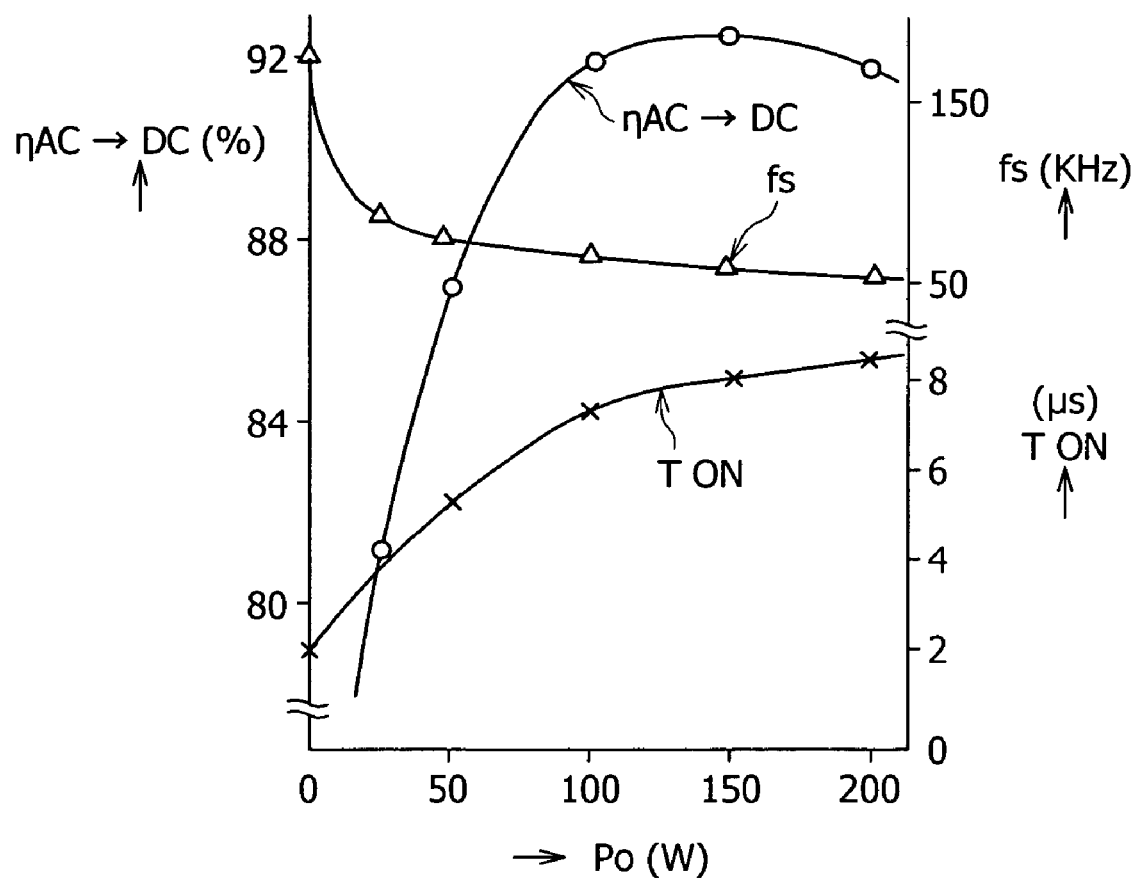
FIG. 24 is a view illustrating a characteristic of an AC-DC power conversion efficiency of the switching power supply circuit shown in FIG. 21.

In this instance, since the power non-transmission period increases as the load becomes lighter, even if the load power Po decreases, the primary side series resonance current I1 does not decrease and also the switching output current IQ1 and IQ2 flowing through the switching elements Q1 and Q2 does not decrease as described hereinabove. As a result, in the related art power supply circuits, the AC-DC power conversion efficiency (ηAC→DC) drops as the load power Po decreases as illustrated in FIG. 24.

In contrast, in the power supply circuit shown in FIG. 1, as the load power Po decreases, the leakage inductance component L1$l$ of the primary winding N1 and the leakage inductance L2$l$ of the secondary winding N2 of the insulating converter transformer PIT increase when compared with those of the related art power supply circuits, and the secondary side current ID flowing through the bridge rectification circuit DBR exhibits a continuous operation mode as shown in (g) of FIG. 2.

As a result, since the primary side series resonance current I1 flowing to the primary winding N1 can be decreased as the load power Po decreases, it is possible to achieve reduction of the power loss on the primary side and achieve enhancement of the AC-DC power conversion efficiency (ηAC→DC). As a characteristic of the AC-DC power conversion efficiency (ηAC→DC), it can be seen from FIG. 3 that a higher value than that of the characteristic, for example, illustrated as the related art in FIG. 24 is obtained over a substantially overall corresponding load variation range. Particularly, in the present embodiment, for example, up to the load power Po=approximately 50 W, the power conversion efficiency exhibits a tendency that it increases as the load decreases, and also where the load power Po is Po=50 W or less, for example, where the load power Po is Po=25 W, a power conversion efficiency of 92% or more is secured. In short, according to the present embodiment, particularly the problem of the related art that the power conversion efficiency drops as the load decreases is improved excellently.

According to an experiment, while, with the related art power supply circuit shown in FIG. 21, the AC-DC power conversion efficiency (ηAC→DC) at the load power Po=200 W (in a heavy load state) is approximately 91%, with the power supply circuit shown in FIG. 1, the AC-DC power conversion efficiency (ηAC→DC) can be enhanced up to approximately 93.0%.

Further, where the AC-DC power conversion efficiency (ηAC→DC) of the power supply circuit shown in FIG. 21 and the AC-DC power conversion efficiency (ηAC→DC) of the power supply circuit shown in FIG. 1 are compared with each other, the AC-DC power conversion efficiency (ηAC→DC) can be enhanced from approximately 92.4% to approximately 93.6% at the load power Po=150 W, from approximately 92.0% to approximately 94.3% at the load power Po=100 W, from approximately 87.0% to 95.0% at the load power Po=50 W, and from approximately 82.0% to approximately 94.0% at the load power Po=25 W.

As a result, when compared with the power supply circuit shown in FIG. 21, the power supply circuit shown in FIG. 1 can achieve reduction to approximately 3.2 W at the load power Po=200 W, to approximately 2.1 W at the load power Po=150 W, to approximately 2.7 W at the load power Po=100 W, to approximately 4.9 W at the load power Po=50 W, and to approximately 3.9 W at the load power Po=25 W.

Further, in the power supply circuit shown in FIG. 1, since the input rectification circuit which forms the input rectification smoothing circuit can be formed from a full-wave rectification circuit, the input rectification smoothing circuit requires only one smoothing capacitor. Further, since the switching element can be formed from a full-bridge coupling, also the voltage withstanding property of the switching elements Q1 to Q4 can be selected within a range from 400 V to 200 V, reduction of the cost of the circuit can be achieved.

Furthermore, since the switching characteristic of the switching elements is enhanced, heat generation by the switching element decreases, and there is an advantage also that the radiator plate for the switching elements can be formed with a reduced size or can be eliminated.

Figure 4:
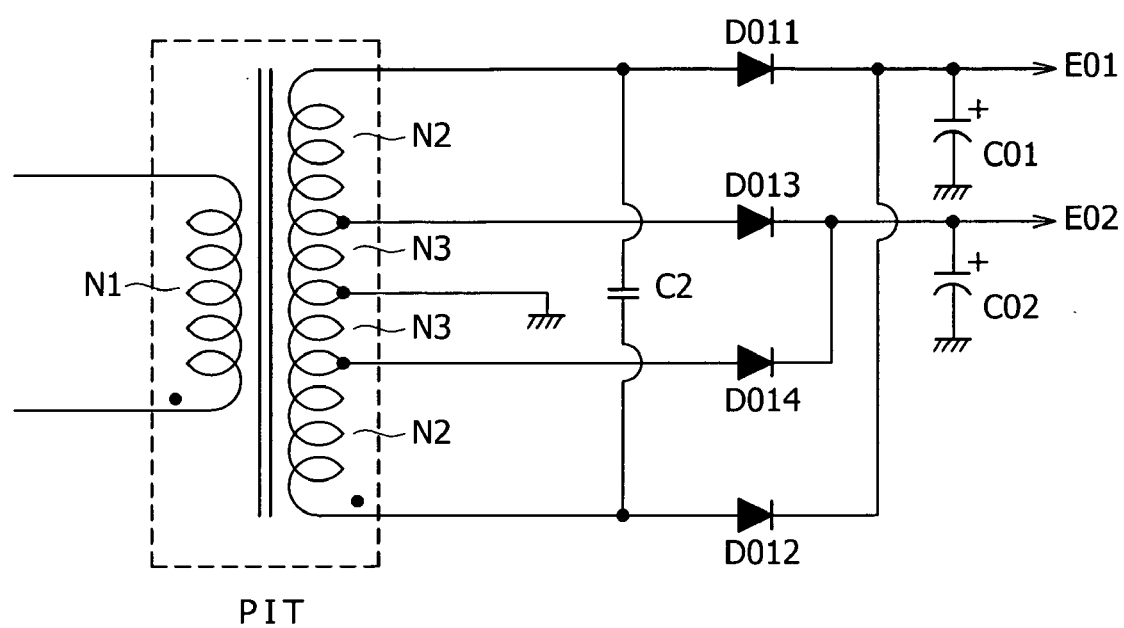
FIG. 4 is a view showing another example of a configuration of a secondary side circuit.

FIG. 4 is a view showing a configuration of another secondary side circuit which can be applied to the power supply circuit shown in FIG. 1.

In the secondary side circuit shown in FIG. 4, a center tap is provided for the secondary winding (N2+N3) and grounded to the secondary side ground. The secondary winding N2 is connected at one end and the other end thereof to the anodes of the rectification diodes D011 and D012, respectively. The cathodes of the rectification diodes D011 and D012 are connected to the positive electrode terminal of a smoothing capacitor C01. Consequently, a full-wave rectification circuit is formed, and a secondary side DC output voltage E01 is obtained across the smoothing capacitor C01.

Similarly, the secondary winding N3 is connected at one end and the other end thereof to the anodes of the rectification diodes D013 and D014, respectively. The cathodes of the rectification diodes D013 and D014 are connected to the positive electrode terminal of a smoothing capacitor C02. Consequently, another secondary side DC output voltage E02 is obtained across the smoothing capacitor C02.

In this instance, a secondary side partial voltage resonance capacitor C2 is connected in parallel to the secondary winding N2 of the insulating converter transformer PIT. In this instance, the secondary winding (N2+N3)=75 T is selected. Further, a capacitor of such a small capacity of approximately 1,000 pF is selected for the secondary side partial voltage resonance capacitor C2.

Where the secondary side partial voltage resonance capacitor C2 is connected in parallel to the secondary winding N2 in this manner, in the power supply circuit shown in FIG. 1, abnormal oscillation operation when the load power Po is Po<3.5 W is eliminated and stabilized constant voltage control operation down to the load power Po=0 W is obtained.

Figure 5:
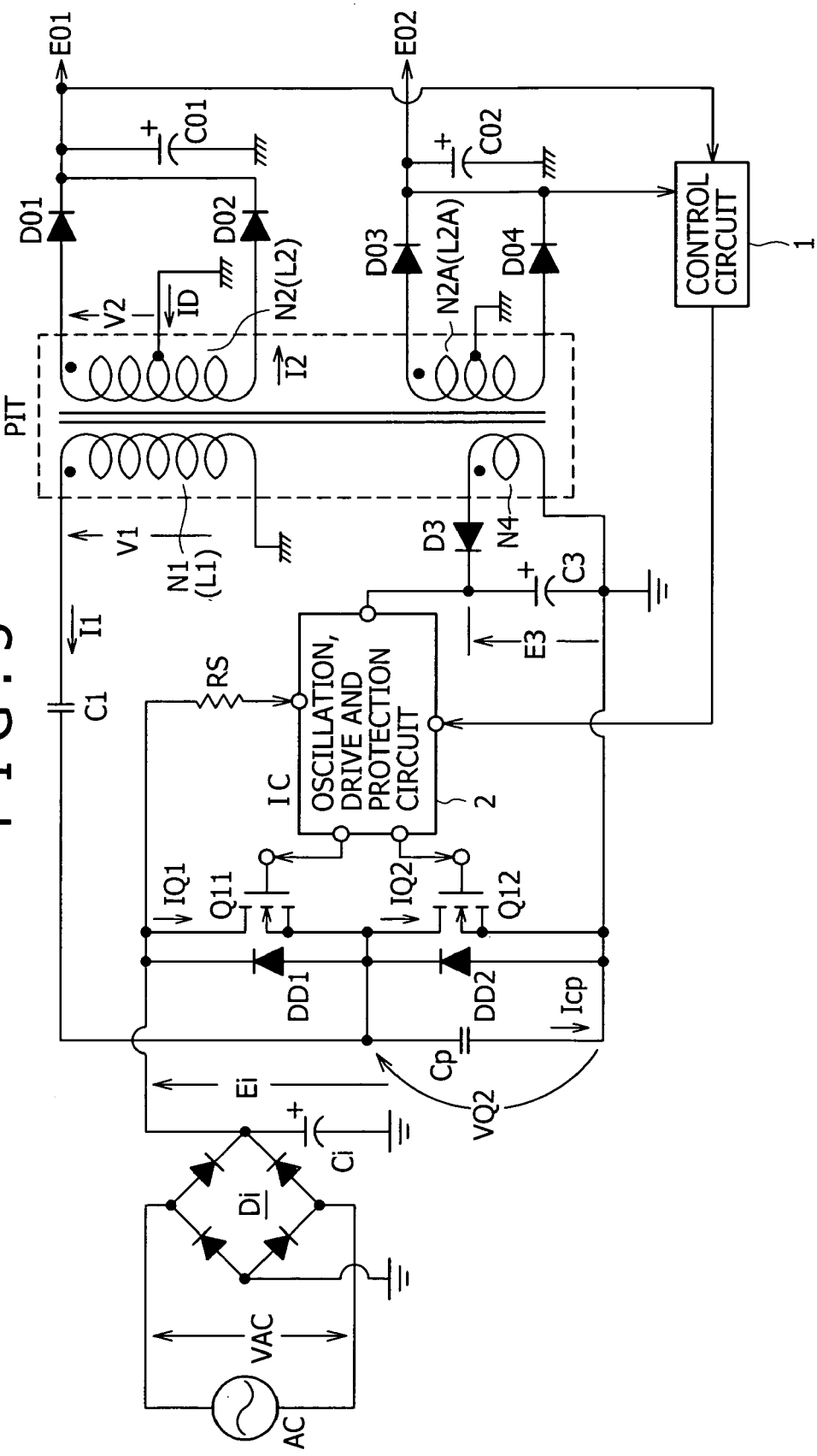
FIG. 5 is a circuit diagram showing a switching power supply circuit of a second embodiment.

FIG. 5 shows an example of a configuration of a switching power supply circuit as a second embodiment of the present invention. It is to be noted that like elements to those of FIG. 1 are denoted by like reference characters and description thereof omitted herein.

The power supply circuit shown in this figure includes a combination of a partial voltage resonance circuit with a separately excited current resonance type converter. Further, the power supply circuit adopts a configuration ready for the condition of the commercial AC power supply AC=100 V system.

In the power supply circuit shown in this figure, a full-wave rectification circuit formed from a bridge rectification circuit Di and a single smoothing capacitor Ci is provided for a commercial AC power supply AC. A rectified smoothed voltage Ei (DC input voltage) is obtained across the smoothing capacitor Ci by full-wave rectification operation of the bridge rectification circuit Di and the smoothing capacitor Ci. The rectified smoothed voltage Ei has a level equal to the AC input voltage VAC.

As a current resonance type converter which receives the DC input voltage as an input thereto and operates with the DC input voltage, two switching elements Q11 and Q12 each formed from a MOS-FET or an IGBT (Insulated Gate Bipolar Transistor) are connected in a half bridge connection as seen in the figure. Damper diodes DD1 and DD2 are connected in parallel in the direction shown in the figure between the drain and the source of the switching elements Q11 and Q12, respectively.

Further, a primary side partial voltage resonance capacitor Cp is connected in parallel between the drain and the source of the switching element Q12. The capacitance of the primary side partial voltage resonance capacitor Cp and the leakage inductance L1*l* of the primary winding N1 form a parallel resonance circuit (partial voltage resonance circuit). Thus, partial voltage resonance operation wherein voltage resonance appears only upon turning off of the switching elements Q11 and Q12 is obtained.

In the power supply circuit shown in FIG. 5, in order to drive the switching elements Q11 and Q12 for switching, an oscillation, drive and protection circuit 2 formed from, for example, an IC for universal use is provided. The oscillation, drive and protection circuit 2 includes an oscillation circuit, a driving circuit and a protection circuit. The oscillation circuit and the driving circuit apply a drive signal (gate voltage) of a required frequency to the gate of the switching elements Q11 and Q12. Consequently, the switching elements Q11 and Q12 perform switching operation such that they are turned on/off alternately with a required switching frequency.

Meanwhile, the protection circuit of the oscillation, drive and protection circuit 2 detects, for example, an overcurrent or overvoltage state of the power supply circuit and controls the switching operation of the switching elements Q11 and Q12 so that the circuit may be protected.

The oscillation, drive and protection circuit 2 inputs a DC voltage E3 of a low voltage obtained by a rectification circuit formed from a rectification diode D3 and a capacitor C3 to a tertiary winding N4 formed by providing a tap on the primary winding N1 of the insulating converter transformer PIT so as to use the DC voltage E3 as an operation power supply. Further, upon starting, the rectified smoothed voltage Ei is inputted through a starting resistor RS to start the oscillation, drive and protection circuit 2.

The insulating converter transformer PIT transmits a switching output of the switching elements Q11 and Q12 to the secondary side. The primary winding N1 of the insulating converter transformer PIT is connected at a winding starting end portion thereof to a node (switching output point) between the source of the switching element Q11 and the drain of the switching element Q12 through a series connection of the primary side series resonance capacitor C1 so that the switching output may be transmitted.

Meanwhile, the primary winding N1 is connected at a winding ending end portion thereof to the primary side ground.

Here, the capacitance of the primary side series resonance capacitor C1 and the leakage inductance L1$l$ of the insulating converter transformer PIT including the primary winding N1 form a primary side series resonance circuit for making operation of the primary side switching converter as that of the current resonance type.

In particular, also the power supply circuit shown in FIG. 5 has a configuration as a composite resonance type converter wherein another resonance circuit is combined with a series resonance circuit for making the switching operation as that of the current resonance type on the primary side.

Also the insulating converter transformer PIT in this instance has a structure shown in the sectional views of FIGS. 19 and 20, that is, a structure which includes a pair of E-E type cores or a pair of U-U type cores.

On the secondary side of the insulating converter transformer PIT, a secondary winding N2 and a secondary winding N2A having a number of turns smaller than that of the secondary winding N2 are wound. An alternating voltage corresponding to a switching output transmitted to the primary winding N1 is excited in the secondary side windings.

The secondary winding N2 has a center tap provided thereon as seen in the figure and is connected at the center tap thereof to the secondary side ground, and a full-wave rectification circuit formed from rectification diodes D01 and D02 and a smoothing capacitor C01 is connected to the secondary winding N2 as seen in the figure. Consequently, a secondary side DC output voltage E01 is obtained as a voltage across the smoothing capacitor C01. The secondary side DC output voltage E01 is connected to a load side not shown and is branched and inputted also as a detection voltage for a control circuit 1 hereinafter described.

Also the secondary winding N2A is connected at a center tap thereof to the secondary side ground, and a full-wave rectification circuit formed from rectification diodes D03 and D04 and a smoothing capacitor C02 is connected to the secondary winding N2A. Consequently, a secondary side DC output voltage E02 is obtained as a voltage across the smoothing capacitor C02. The secondary side DC output voltage E02 is supplied as an operation voltage for the control circuit 1.

The control circuit 1 supplies a detection output corresponding to the level variation of the secondary side DC output voltage E01 to the oscillation, drive and protection circuit 2. The oscillation, drive and protection circuit 2 drives the switching elements Q11 and Q12 while varying the switching frequency in response to the detection output of the control circuit 1 inputted thereto. The switching frequency of the switching elements Q11 and Q12 is varied in this manner to stabilize the level of the secondary side DC output voltage.

Here, in the power supply circuit having the configuration described above, the DC voltage E3 of a low voltage to be supplied as an operation power supply to the oscillation, drive and protection circuit 2 is obtained as approximately 1.7 V.

Also in the power supply circuit shown in FIG. 5, a gap G of 1.5 mm or more is formed between the central magnetic legs of E-E type cores CR1 and CR2 or U-U type cores CR11 and CR12 in the insulating converter transformer PIT as in the configuration of either of FIGS. 19 and 20 such that the primary winding N1 and the secondary winding N2 may have a loosely coupled state similarly as in the power supply circuit shown in FIG. 1.

Further, also in the power supply circuit shown in FIG. 5, the secondary side DC output voltage E01 is obtained as approximately 135 V. Then, the number of turns of the primary winding N1 is increased in such a condition as described above to achieve enhancement of the AC-DC power conversion efficiency ($\eta$AC→DC) when the load is light.

Figure 6:
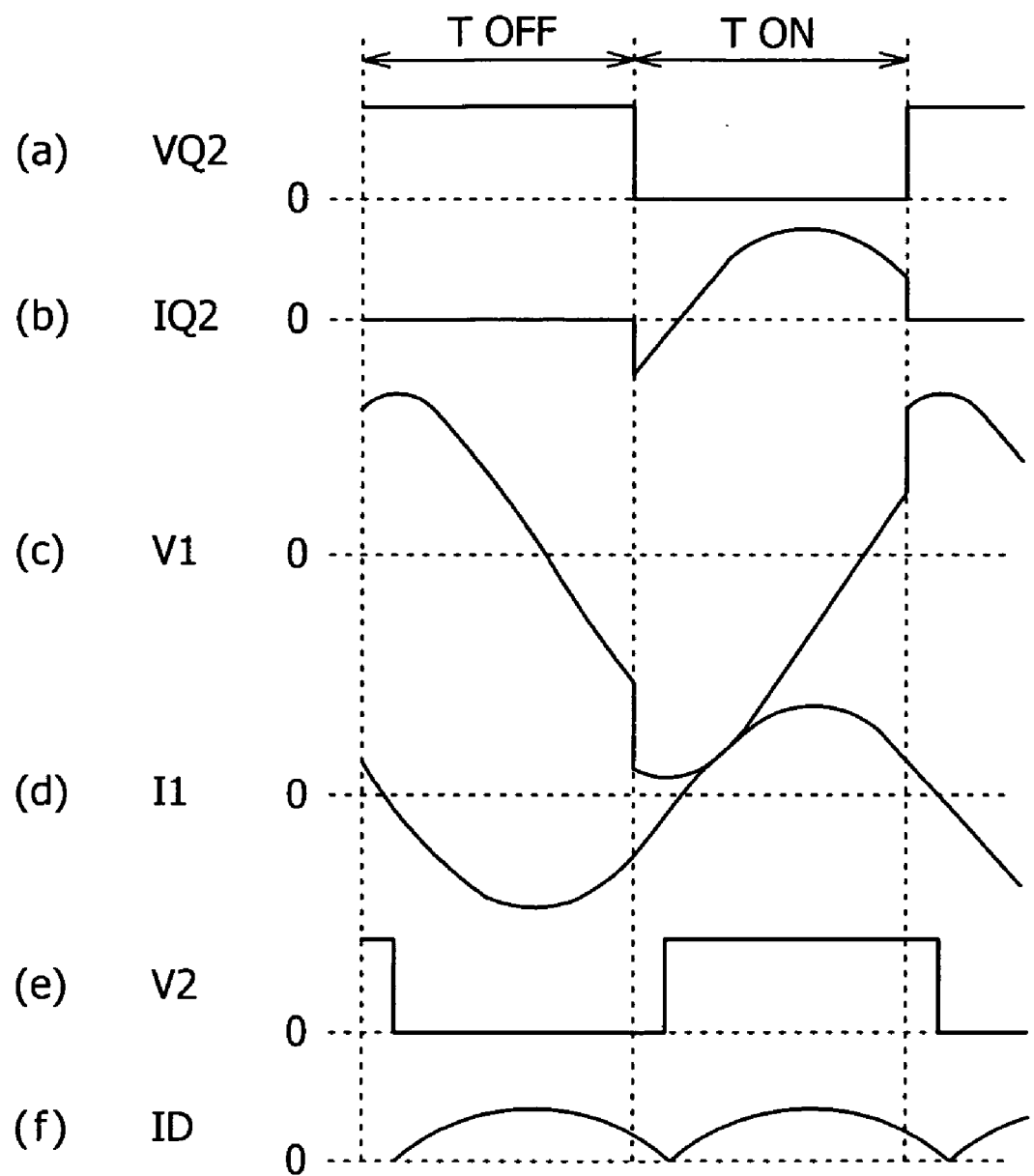
FIGS. 6(*a*) to (*f*) are waveform diagrams illustrating operation of the switching power supply circuit of the second embodiment.
Figure 7:
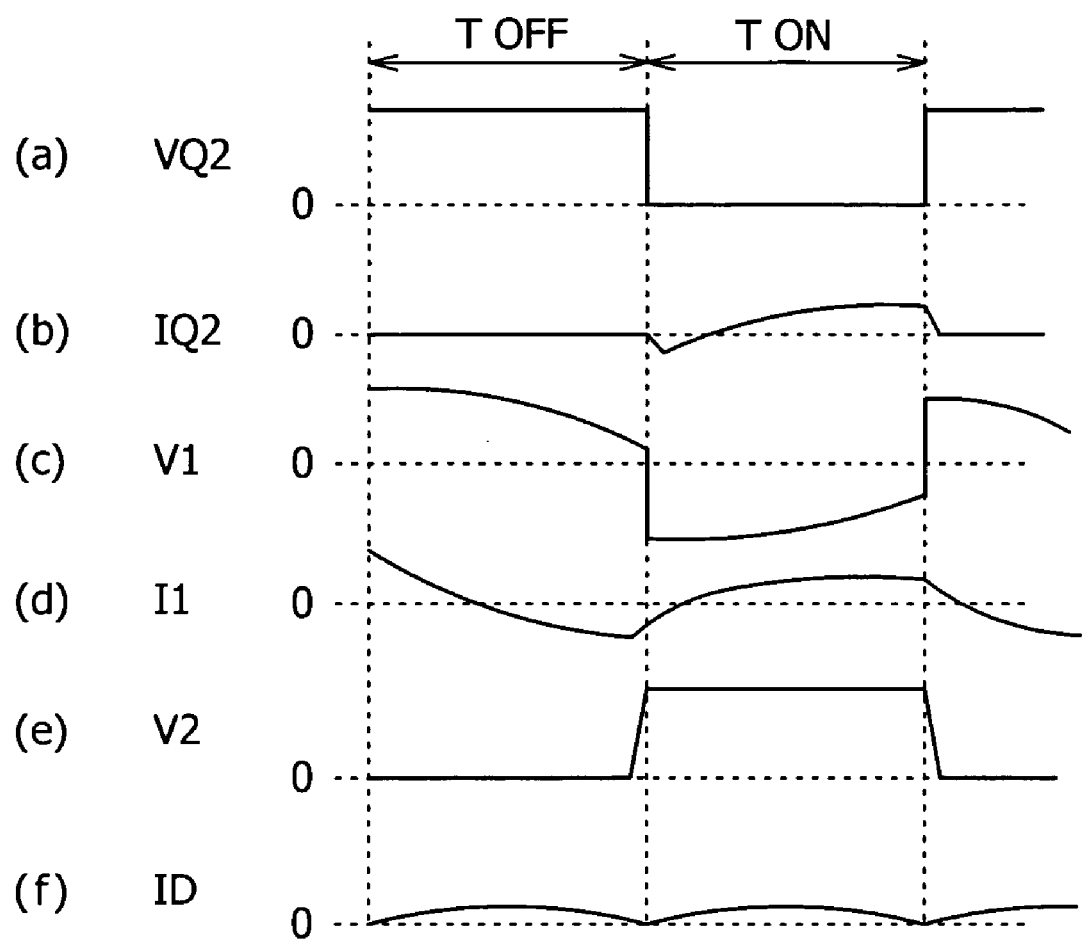
FIGS. 7(*a*) to (*f*) are waveform diagrams illustrating operation of the switching power supply circuit of the second embodiment.

FIGS. 6 and 7 are waveform diagrams illustrating operation of the power supply circuit shown in FIG. 5 within a switching period, and FIG. 6 shows operation waveforms under the conditions of the AC input voltage VAC=100 V and the load power Po=125 W. Meanwhile, FIG. 7 shows operation waveforms under the conditions of the AC input voltage VAC=100 V and the load power Po=25 W.

Figure 8:
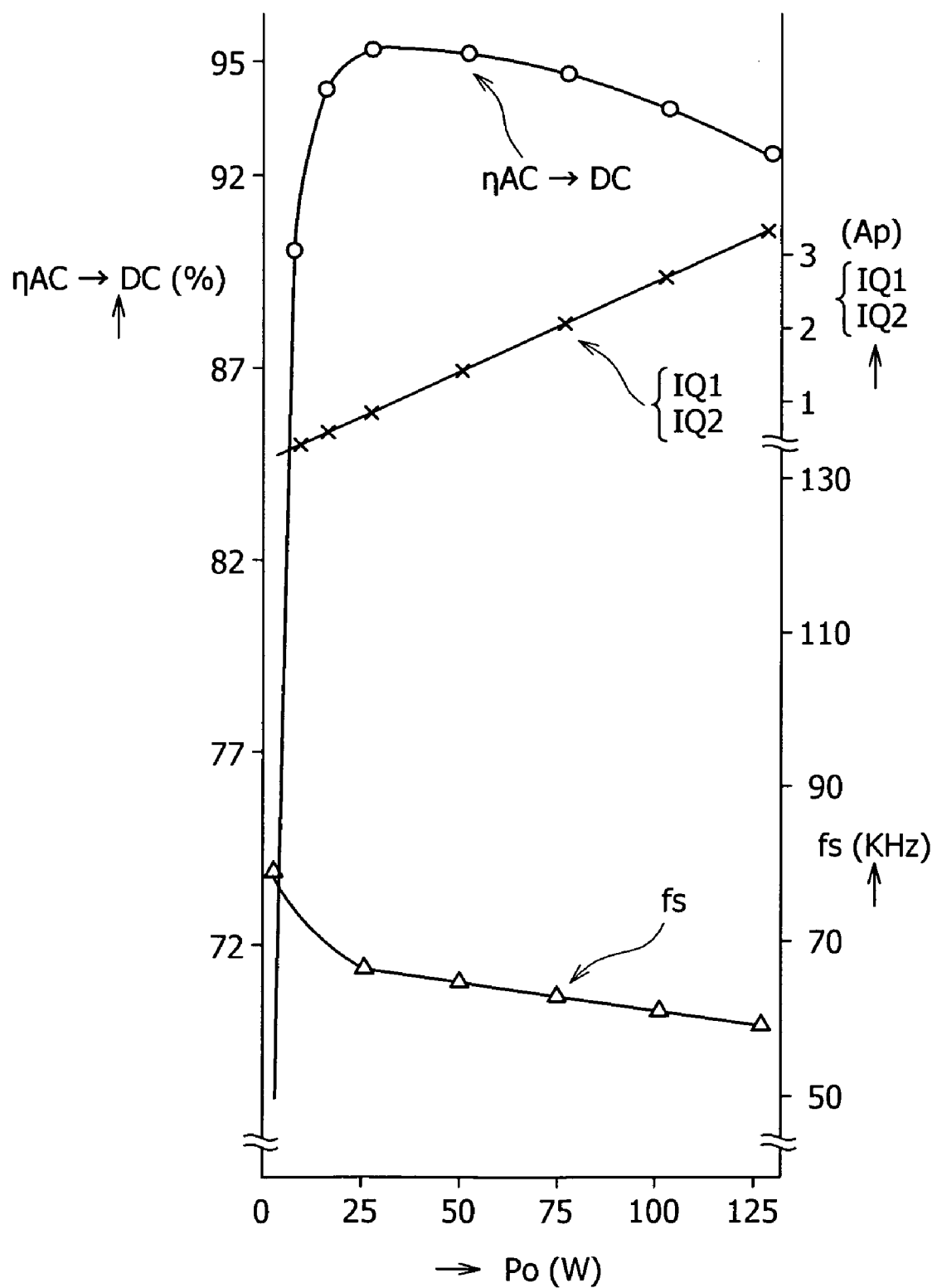
FIG. 8 is a characteristic diagram illustrating a characteristic of the switching power supply circuit of the second embodiment.

Further, FIG. 8 shows variation characteristics of the AC-DC power conversion efficiency ($\eta$AC→DC), switching frequency fs and switching output current IQ1 and IQ2 as characteristics of the power supply circuit when the load power Po varies from Po=0 W to 125 W.

It is to be noted that, when to obtain the measurement results illustrated in FIGS. 6 to 8, part elements of the power supply circuit shown in FIG. 5 are selected in the following manner.

First, as regards the insulating converter transformer PIT, the gap G is set to G=1.5 mm to select the coupling coefficient k=0.81. Further, the primary winding N1=37 T and secondary winding N2=75 T are selected. In this instance, the exciting inductance L1 of the primary winding N1 is L1=302 µH; the leakage inductance L1$l$ of the primary winding N1 is L1$l$=98 µH; the exciting inductance L2 of the secondary winding N2 is L2=966 µH; and the leakage inductance L2$l$ of the secondary winding N2 is L2$l$=315 µH.

Further, the primary side series resonance capacitor C1=0.068 µF is selected.

In the case illustrated in FIG. 6, the collector-emitter voltage VQ2 of the switching element Q12 within a period TON within which the switching element Q12 is on and another period TOFF within which the switching element Q12 is off has such a waveform as shown in (a) of FIG. 6, and the collector current IQ2 having such a waveform as shown in (b) of FIG. 6 flows to the collector of the switching element Q12.

Also in this instance, as the current IQ2 which flows through the switching element Q12, such partial resonance current as seen in (b) of FIG. 6 flows. Further, though not shown, the current IQ1 having a waveform displaced by 180 degrees in phase from that of the current IQ2 flows also through the switching element Q11.

In this instance, since such primary winding current I1 as illustrated in (d) of FIG. 6 flows through the primary side series resonance capacitor C1, such a voltage V1 of a waveform which exhibits the opposite polarities within the period TON and the period TOFF as seen in (c) of FIG. 6 is obtained across the primary winding N1 of the insulating converter transformer PIT.

On the other hand, since such secondary side current ID as illustrated in (f) of FIG. 6 flows between the center tap of the secondary winding N2 and the secondary side ground, the inter-terminal voltage V2 between the winding starting end side of the secondary winding N2 and the secondary side ground is obtained as an output of such a waveform as illustrated in (e) of FIG. 6.

FIG. 7 is a waveform diagram which illustrates operation where the AC input voltage VAC is VAC=100 V and the load power Po is Po=25 W within a switching period for comparison with the waveform diagram within a switching period illustrated in FIG. 6.

In this instance, the collector-emitter voltage VQ2 of the switching element Q12 within a period TON within which the switching element Q12 is on and another period TOFF within which the switching element Q12 is off has such a waveform as shown in (a) of FIG. 7, and the collector current IQ2 having such a waveform as shown in (b) of FIG. 7 flows to the collector of the switching element Q12. Further, the primary side series resonance current I1 which flows through the primary side series resonance capacitor C1 in this instance has such a waveform as illustrated in (d) of FIG. 7.

In this instance, a voltage V1 having such a waveform as illustrated in (c) of FIG. 7 is obtained across the primary winding N1 of the insulating converter transformer PIT. Further, since such secondary side current ID as illustrated in (f) of FIG. 7 flows between the center tap of the secondary winding N2 and the secondary side ground, the inter-terminal voltage V2 between the winding starting end side of the secondary winding N2 and the secondary side ground is obtained as an output having such a waveform as shown in (e) of FIG. 7.

Figure 25:
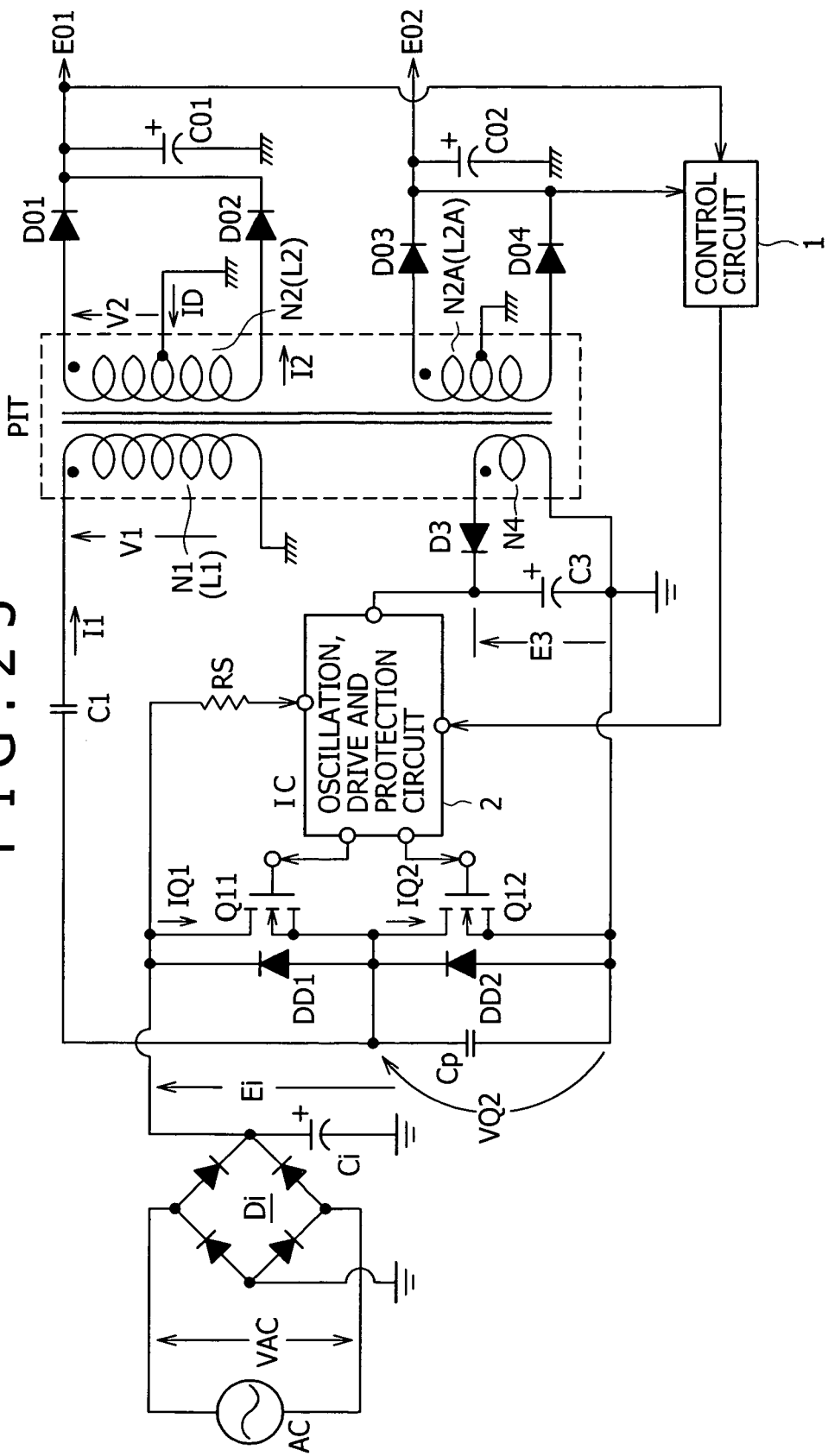
FIG. 25 is a circuit diagram showing a further example of a configuration of a switching power supply circuit as a related art.
Figure 26:
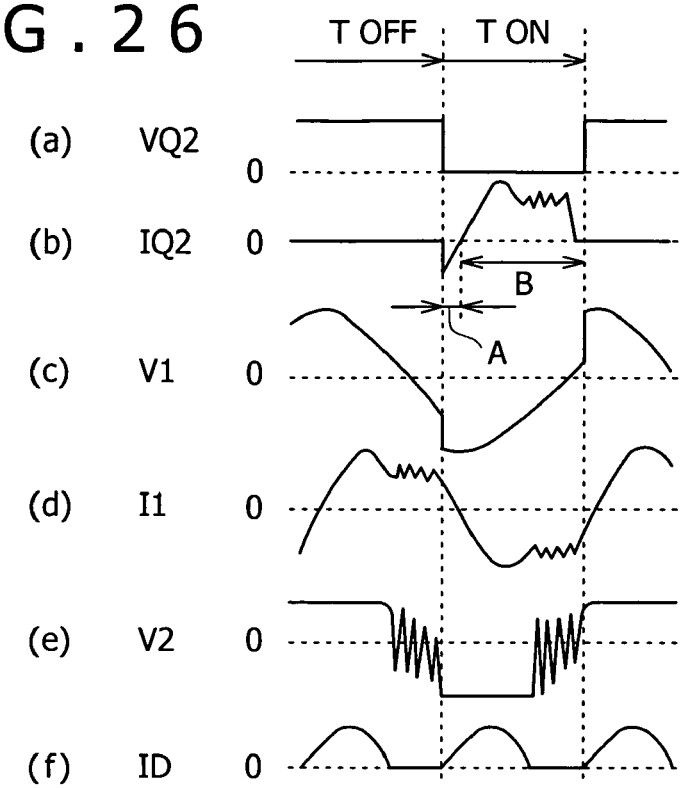
FIGS. 26(*a*) to (*f*) are waveform diagrams illustrating operation of principal elements of the switching power supply circuit shown in FIG. 25.
Figure 27:
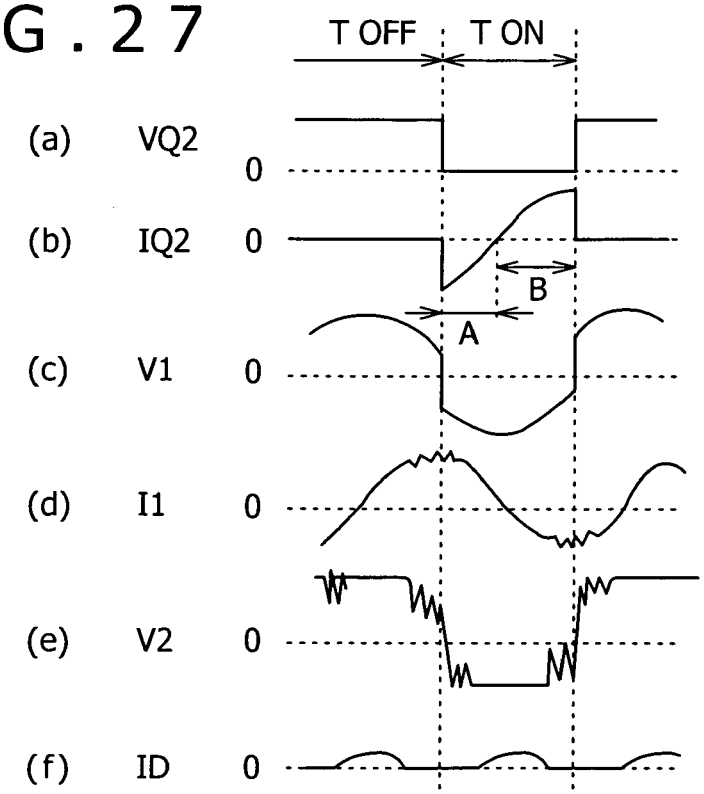
FIGS. 27(*a*) to (*f*) are waveform diagrams illustrating operation of principal elements of the switching power supply circuit shown in FIG. 25.

As can be recognized from comparison between the operation waveforms illustrated in FIGS. 6 and 7 with the operation waveforms of the related art power supply circuits shown in FIGS. 26 and 27, in the power supply circuit as the related art shown in FIG. 25, the secondary side current ID flowing through the secondary side bridge rectification circuit DBR exhibits a discontinuous operation mode as seen from (f) of FIG. 26 and (f) of FIG. 27.

In contrast, the secondary side current ID which flows through the secondary side bridge rectification circuit DBR of the power supply circuit shown in FIG. 5 exhibits a continuous operation mode as seen in (f) of FIG. 6 and (f) of FIG. 7. Further, in this instance, the current waveform of the primary side series resonance current I1 flowing through the primary winding N1 of the insulating converter transformer PIT is a sine waveform, and as a result, the primary side series resonance current I1 drops linearly.

In particular, in the related art power supply circuits, the exciting inductance L1 of the primary winding N1 is L1=165 µH; the leakage inductance L1$l$ of the primary winding N1 is L1$l$=41 µH; the exciting inductance L2 of the secondary winding N2 is L2=171 µH; and the leakage inductance L2$l$ of the primary winding N2 is L2$l$=43 µH, and the secondary side current ID flows only within a series resonance period of the leakage inductance L1$l$ of the primary winding N1 and the primary side series resonance capacitor C1. Therefore, even if the load power Po decreases, the primary side series resonance current I1 does not drop, and the switching output current IQ1 and IQ2 does not drop.

In contrast, with the power supply circuit shown in FIG. 5, as the load power Po decreases, the primary side series resonance current I1 flowing through the primary winding N1 of the insulating converter transformer PIT drops and the switching output current IQ1 and IQ2 drops. Therefore, the switching loss of the switching elements Q11 and Q12 drops, and the power conversion efficiency can be enhanced significantly.

In this manner, in the power supply circuit shown in FIG. 5, the gap G of the insulating converter transformer PIT is set greater than ever to set the coupling coefficient k to approximately 0.84 or less and besides the number of turns of the primary winding N1 and the secondary winding N2 is increased to set the induced voltage V2 per one turn of the secondary winding N2 to V2=3 V/T or less (for example, 1.8 V/T). Since the secondary side current ID to flow through the bridge rectification circuit DBR is thereby caused to operate in a continuous operation mode to achieve reduction of the primary side series resonance current I1, for example, even in a light load state wherein the load power Po is approximately 5% of the maximum load power (200 W), enhancement of the AC-DC power conversion efficiency ($\eta AC \rightarrow DC$) can be anticipated.

According to an experiment, while, with the related art power supply circuit shown in FIG. 25, the AC-DC power conversion efficiency ($\eta AC \rightarrow DC$) at the load power Po=125 W is approximately 91.7%, with the power supply circuit shown in FIG. 5, the AC-DC power conversion efficiency ($\eta AC \rightarrow DC$) can be enhanced up to approximately 93.1%.

Further, where the AC-DC power conversion efficiency ($\eta AC \rightarrow DC$) of the power supply circuit shown in FIG. 25 and the AC-DC power conversion efficiency ($\eta AC \rightarrow DC$) of the power supply circuit shown in FIG. 5 are compared with each other, the AC-DC power conversion efficiency ($\eta AC \rightarrow DC$) can be enhanced from approximately 91.3% to approximately 93.7% at the load power Po=100 W, from approximately 89.8% to approximately 94.2% at the load power Po=75 W, from approximately 87.4% to 94.7% at the load power Po=50 W, and from approximately 80.1% to approximately 93.6% at the load power Po=25 W.

As a result, when compared with the power supply circuit shown in FIG. 25, the power supply circuit shown in FIG. 5 can achieve reduction of the AC input power by approximately 2.0 W at the load power Po=125 W, by approximately 2.9 W at the load power Po=100 W, by approximately 3.9 W at the load power Po=75 W, by approximately 4.5 W at the load power Po=50 W, and by approximately 4.5 W at the load power Po=25 W.

Figure 28:
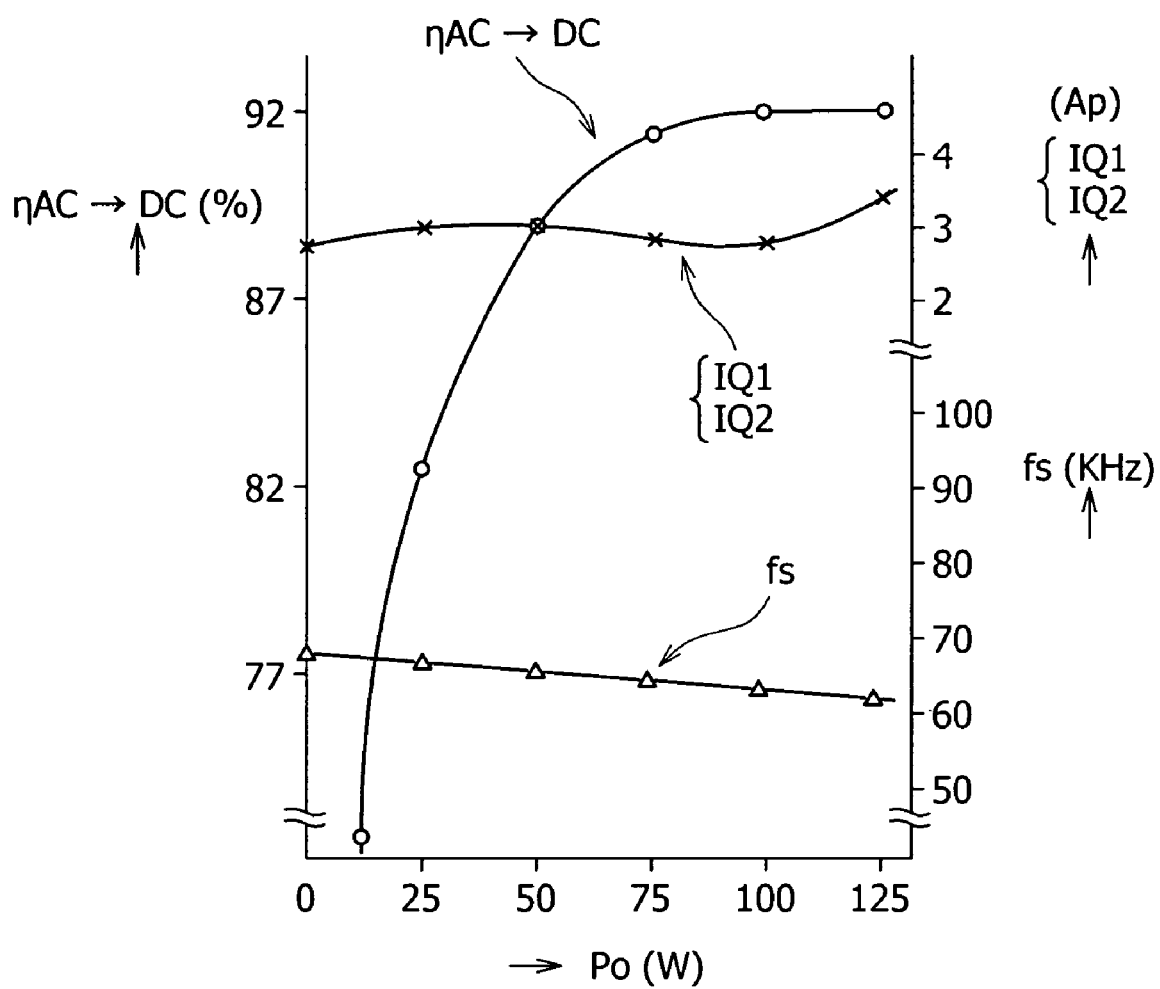
FIG. 28 is a characteristic diagram illustrating a characteristic of the switching power supply circuit shown in FIG. 25.

Further, while, in the power supply circuit shown in FIG. 25, the variation of the switching output current IQ1 and IQ2 is 3.5 Ap to 2.8 Ap within the range of the load power Po=0 W to 125 W as illustrated in FIG. 28, the variation of the switching output current IQ1 and IQ2 in the power supply circuit shown in FIG. 5 can be reduced to 3.2 Ap to 0.8 Ap as illustrated in FIG. 8.

Figure 9:
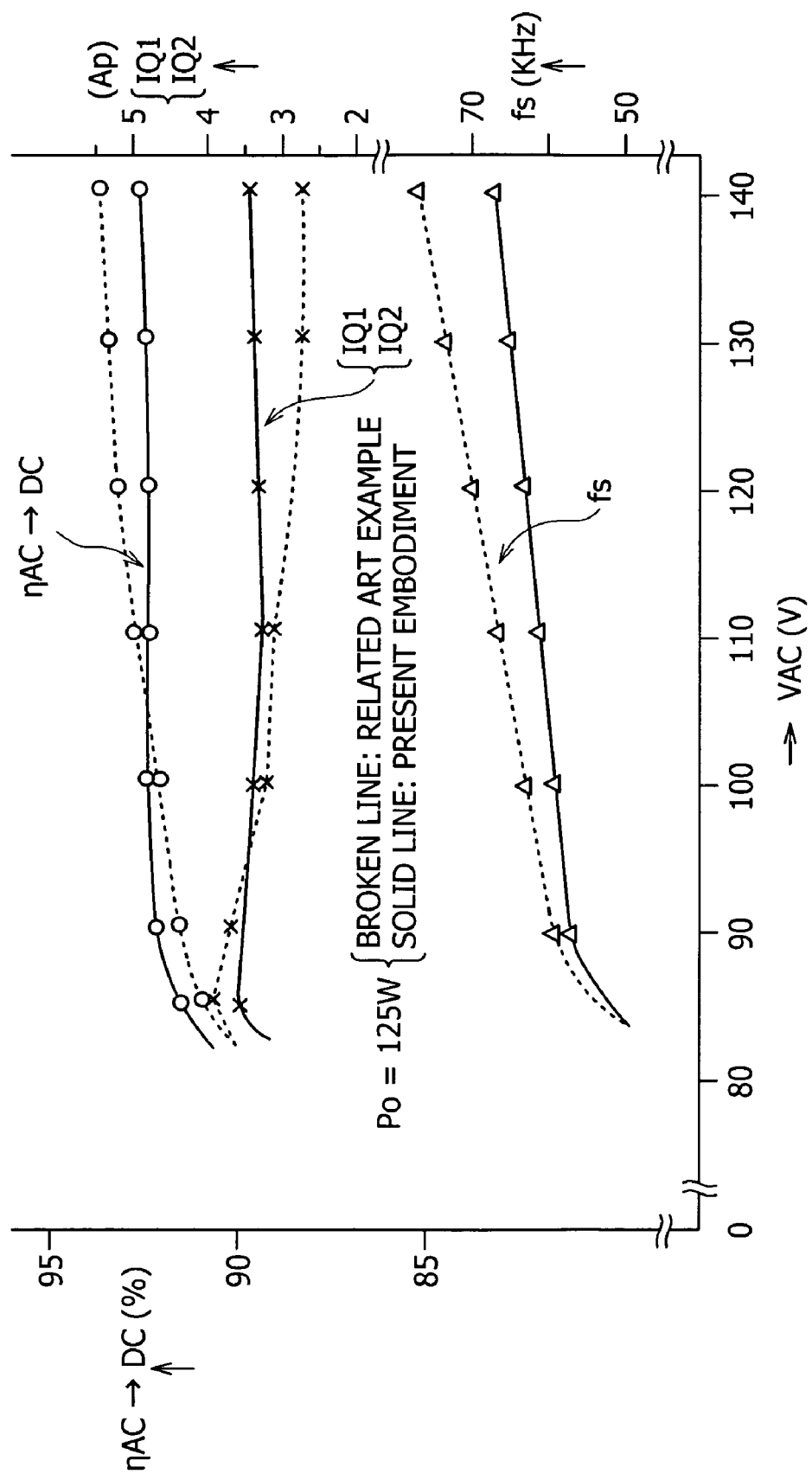
FIG. 9 is a waveform diagram illustrating operation of the switching power supply circuit of the second embodiment.

FIG. 9 is a view showing, as characteristics of the power supply circuit shown in FIG. 5, variation characteristics of the AC-DC power conversion efficiency ($\eta AC \rightarrow DC$), switching frequency fs and switching output current IQ1 and IQ2 with respect to the variation of the AC input voltage VAC of VAC=85 V to 140 V when the load power Po is Po=125 W.

As shown in FIG. 9, where the power supply circuit shown in FIG. 5 is compared with the power supply circuit shown as a related art in FIG. 25, while the control range of the switching frequency fs is 20.6 kHz in the related art example, it is 9.2 kHz in the power supply circuit shown in FIG. 5. Accordingly, the power supply circuit shown in FIG. 5 is advantageous in that the control range of the switching frequency fs with respect to the AC input voltage VAC=85 V to 140 V at the load power Po=125 W can be smaller by approximately 11.4 kHz.

Further, also where the power supply circuit shown in FIG. 5 is compared with the power supply circuit shown as a related art in FIG. 25 in regard to the AC-DC power conversion efficiency (ηAC→DC) and the variation characteristic of the switching output current IQ1 and IQ2 with respect to an input voltage variation, it can be seen that the power supply circuit shown in FIG. 5 exhibits a smaller variation width. From this, it can be considered that the power supply circuit shown in FIG. 5 has a circuit configuration which is less likely to be influenced by the variation of the input voltage when compared with the power supply circuit of the related art.

Figure 10:
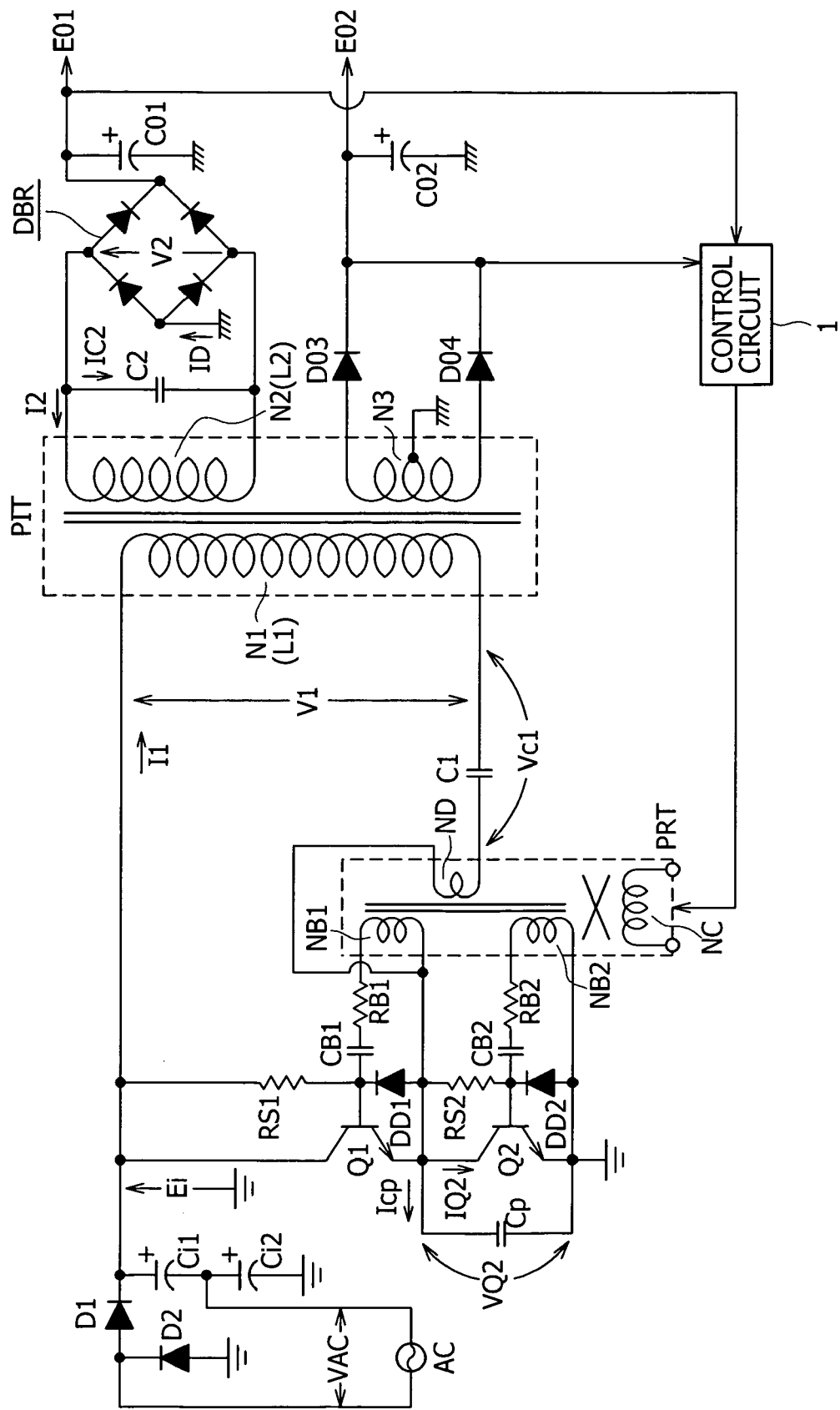
FIG. 10 is a circuit diagram showing a switching power supply circuit of a third embodiment.

FIG. 10 shows an example of a configuration of a switching power supply circuit as a third embodiment of the present invention. It is to be noted that, in FIG. 10, like elements to those of FIGS. 1 and 5 are denoted by like reference characters, and description of them is omitted herein.

First, the power supply circuit shown in FIG. 10 has a self-excitation configuration as a current resonance type converter wherein two switching elements are connected in a half-bridge connection.

Further, in the power supply circuit shown in FIG. 10, a voltage doubler rectification circuit formed from two rectification diodes D1 and D2 of the low speed recovery type and two smoothing capacitors Ci1 and Ci2 connected in such a manner as seen in the figure is provided as a rectification circuit system for producing a DC input voltage (rectified smoothed voltage Ei) from a commercial AC power supply (AC input voltage VAC). In the present voltage doubler rectification circuit, a rectified smoothed voltage Ei corresponding to twice the AC input voltage VAC is produced across the smoothing capacitors Ci1 and Ci2 connected in series.

For the two switching elements Q1 and Q2 in this instance, a BJT (bipolar transistor) is selectively used.

The collector of the switching element Q1 in this instance is connected to the positive electrode terminal of the smoothing capacitor Ci1. The emitter of the switching element Q1 is connected to the collector of the switching element Q2, and the emitter of the switching element Q2 is connected to the primary side ground. In short, the switching elements Q1 and Q2 are connected in accordance with a half-bridge coupling system.

To the base of the switching element Q1, a self-excited oscillation drive circuit formed from a resonance capacitor CB1, a base current limiting resistor RB1 and a driving winding NB1 connected in series is connected. In the self-excited oscillation drive circuit, the capacitance of the resonance capacitor CB1 and the inductance of the driving winding NB1 form a series resonance circuit, and the switching frequency is determined by the resonance frequency of the series resonance circuit. Meanwhile, the base current limiting resistor RB1 adjusts the base current level as a drive signal to be supplied from the self-excited oscillation drive circuit to the base of the switching element Q1.

A damper diode DD1 is connected in the direction shown in the figure between the base and the emitter of the switching element Q1 and forms a reverse direction current path for an on period. Further, a starting resistor Rs1 for supplying current upon starting to the base of the switching element Q1 is connected between the positive terminal of the smoothing capacitor Ci and the base of the switching element Q1.

Similarly, a self-excited oscillation drive circuit formed from a resonance capacitor CB2, a base current limiting resistor RB2 and a driving winding NB2 connected in series is connected to the base of the switching element Q2. The resonance capacitor CB2 and the driving winding NB2 form a series resonance circuit. A damper diode DD2 is connected between the base and the emitter of the switching element Q2, and a starting resistor Rs2 is connected between the collector and the base of the switching element Q2.

A primary side partial voltage resonance capacitor Cp is connected in parallel between the collector and the emitter of the switching element Q2.

Also in this instance, a parallel resonance circuit (partial voltage resonance circuit) is formed from the capacitance of the primary side partial voltage resonance capacitor Cp and the leakage inductance L1*l* of the primary winding N1. Thus, partial voltage resonance operation wherein the parallel resonance circuit resonates in voltage only upon turning off of the switching elements Q1 and Q2 is obtained.

The drive transformer PRT is provided to drive the switching elements Q1 and Q2 to switch and variably control the switching frequency to obtain a constant voltage.

The drive transformer PRT is formed as a saturable reactor which has driving windings NB1 and NB2 and a resonance current detection winding ND wound thereon and has a control winding Nc wound in an orthogonal direction to the windings. It is to be noted that the driving winding NB1 and the driving winding NB2 are wound in such winding directions that voltages of the opposite polarities to each other are excited therein.

Also in this instance, the insulating converter transformer PIT transmits a switching output of the switching elements Q1 and Q2 to the secondary side.

The primary winding N1 of the insulating converter transformer PIT is connected at a winding starting end portion thereof to the collector of the switching element Q1 and at a winding ending end portion thereof to a node (switching output point) between the emitter of the switching element Q1 and the collector of the switching element Q2 through a series resonance capacitor C1 and the resonance current detection winding ND. Consequently, a switching output is obtained at the primary winding N1.

Also in this instance, the capacitance of the series resonance capacitor C1 and the leakage inductance L1 of the insulating converter transformer PIT including the primary winding N1 form a primary side series resonance circuit for making operation of the primary side switching converter as that of the current resonance type.

In this manner, also the primary side switching converter shown in the figure adopts a configuration as a composite resonance type converter wherein operation of the current resonance type and the partial voltage resonance operation described above are obtained compositely.

The switching operation of the power supply circuit is, for example, such as follows.

First, if the commercial AC power supply AC is made available, then base current for starting the switching elements Q1 and Q2 is supplied to the bases of the switching elements Q1 and Q2, for example, through the starting resistors Rs1 and Rs2. Here, since voltages of the opposite polarities to each other are excited, for example, in the driving windings NB1 and NB2 of the drive transformer PRT, if it is assumed that the switching element Q1 is turned on first, then the switching element Q2 is controlled so as to be turned off. Then, the self-excited oscillation drive circuits of the switching elements Q1 and Q2 perform self-oscillation operation by resonance operation using alternating voltages excited in the driving windings NB1 and NB2 as sources, respectively. As a result, the switching elements Q1 and Q2 are controlled so as to be turned on/off alternately. In other words, the switching elements Q1 and Q2 perform switching operation.

Then, for example, when the switching element Q1 is on, resonance current flows as a switching output of the switching element Q1 to the primary winding N1 and the series resonance capacitor C1 through the resonance current detection winding ND, and the switching element Q1 is turned off and the switching element Q2 is turned on in the proximity of a point of time at which the resonance current comes to "0". Consequently, resonance current in the reverse direction flows through the switching element Q2. Thereafter, the self-excited switching operation wherein the switching elements Q1 and Q2 are turned on alternately by ZVS and ZCS is repeated. Further, when the switching elements Q1 and Q2 perform on/off operation, current flows through the primary side partial voltage resonance capacitor Cp within a short period of time upon turning off of the switching elements Q1 and Q2. In short, partial resonance voltage operation is obtained.

A secondary side partial voltage resonance capacitor C2 is connected in parallel to the secondary winding N2 of the insulating converter transformer PIT. For example, a film capacitor is adopted for the secondary side partial voltage resonance capacitor C2. The capacitance of the secondary side partial voltage resonance capacitor C2 and the leakage inductance of the secondary winding N2 form a secondary side partial voltage resonance circuit.

Therefore, since an alternating voltage is excited in the secondary winding N2 of the insulating converter transformer PIT, partial resonance (voltage resonance) operation is obtained on the secondary side.

In other words, the power supply circuit shown in FIG. 10 is configured as a composite resonance type converter wherein current resonance operation and partial voltage resonance operation are obtained on the primary side and partial voltage resonance operation is obtained also on the secondary side.

To the secondary winding N2 described above, a bridge rectification circuit DBR and a smoothing capacitor C01 are connected to form a full-wave rectification circuit similarly as in the case of FIG. 1. A secondary side DC output voltage E01 is obtained across the smoothing capacitor C01 by full-wave rectification operation of the full-wave rectification circuit.

Also in the power supply circuit as the third embodiment having such a configuration as described above, if the insulating converter transformer PIT has a coupling coefficient k of approximately 0.81 which exhibits a loose coupling state and the induced voltage per one turn of the secondary winding N2 is 3 V or less, for example, 1.8 V/T or less while the capacitance value of the secondary side partial voltage resonance capacitor C2 is 3,300 pF, then the AC-DC power conversion efficiency ($\eta AC \rightarrow DC$) at the load power Po=200 W can be 93% or more in addition to enhancement of the AC-DC power conversion efficiency ($\eta AC \rightarrow DC$) in a low load state wherein the load power is, for example, approximately 5% of the maximum load power.

Further, while, in the related art power supply circuits, the AC input power at the load power Po=0 W is approximately 4.2 W, the AC input power may be 2.2 W with the power supply circuit shown in FIG. 10. Accordingly, in this instance, there is an advantage also that the AC input power when the load power is 0 W can be reduced by approximately 2.0 W.

It is described above that the switching power supply circuits described as the first to third embodiments above have been described taking a case wherein, as regards the number of turns of the secondary winding N2 of the insulating converter transformer PIT, the number of turns of the secondary winding N2 or the primary winding N1 of the insulating converter transformer PIT is selected so that the induced voltage per one turn of the secondary winding N2 may be approximately 1.8 V/T as an example, the effects described above can be obtained if the number of turns of the primary winding N1 or the secondary winding N2 is selected so that the induced voltage per one turn of the secondary winding N2 may be approximately 3 V/T or less.

Figure 11:
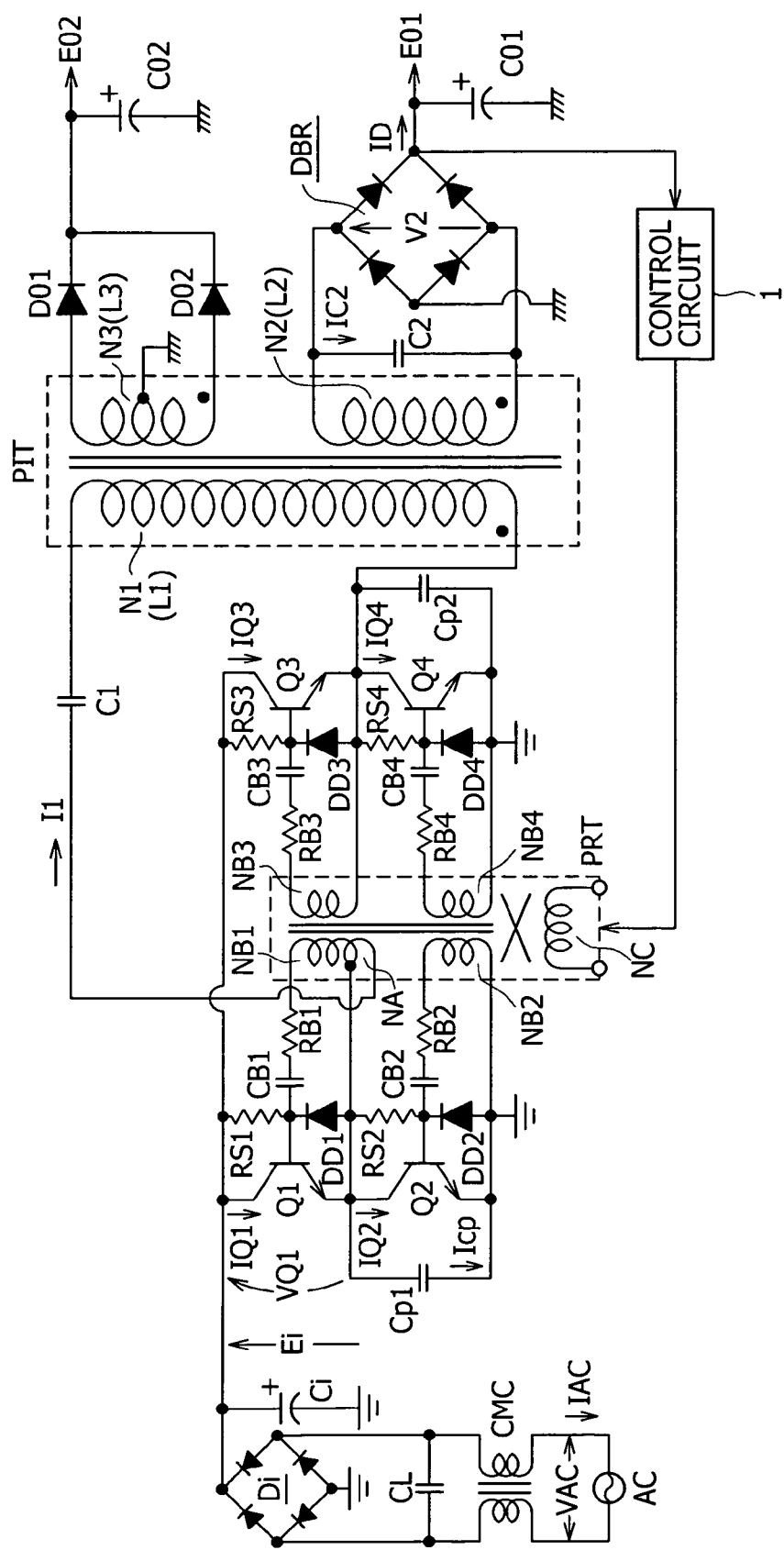
FIG. 11 is a circuit diagram showing a switching power supply circuit of a fourth embodiment.

FIG. 11 shows an example of a configuration of a switching power supply circuit as a fourth embodiment of the present invention. It is to be noted that, since the power supply circuit shown in FIG. 11 has a substantially same circuit configuration as that of the power supply circuit shown in FIG. 1, like elements are denoted by like reference characters and description thereof is omitted herein.

Also the power supply circuit shown in FIG. 11 has a configuration as a composite resonance converter wherein another resonance circuit is combined with a series resonance circuit for making the switching operation as that of the current resonance type on the primary side similarly as in the power supply circuit shown in FIG. 1.

Also in this instance, as in the power supply circuit shown in FIG. 1, a gap G of 1.5 mm or more is formed in the central magnetic leg of the core which forms the insulating converter transformer PIT so that a loose coupling state may be obtained. However, in this instance, the coupling coefficient k is set, for example, to k=approximately 0.84. It is to be noted that, also in this instance, the insulating converter transformer PIT having the structure of FIG. 19 or FIG. 20 can be applied as the insulating converter transformer PIT.

Further, according to the power supply circuit shown in FIG. 11, the number of turns of the secondary winding N2 of the insulating converter transformer PIT is set so that the induced voltage per one turn of the secondary winding N2 may be 5 V or more and a secondary side partial voltage resonance capacitor C2 is connected in parallel to the secondary winding N2 such that a secondary side partial voltage resonance circuit is formed from the capacitance of the secondary side partial voltage resonance capacitor C2 and the leakage inductance of the secondary winding N2.

It is to be noted that, where the power supply circuit shown in FIG. 11 and the power supply circuit shown in FIG. 1 are compared in circuit configuration with each other, the power supply circuit shown in FIG. 1 establishes a continuous mode of the secondary side rectification current thereby to achieve enhancement of the power conversion efficiency without including the secondary side partial voltage resonance capacitor C2 for forming a secondary side partial voltage resonance circuit. In other words, in order to achieve a same effect, the circuit shown in FIG. 1 can omit the secondary side partial voltage resonance capacitor C2, and it is considered that, in this regard, the circuit shown in FIG. 1 is reduced in number of parts and has a more simplified circuit configuration than the circuit shown in FIG. 11.

Figure 12:
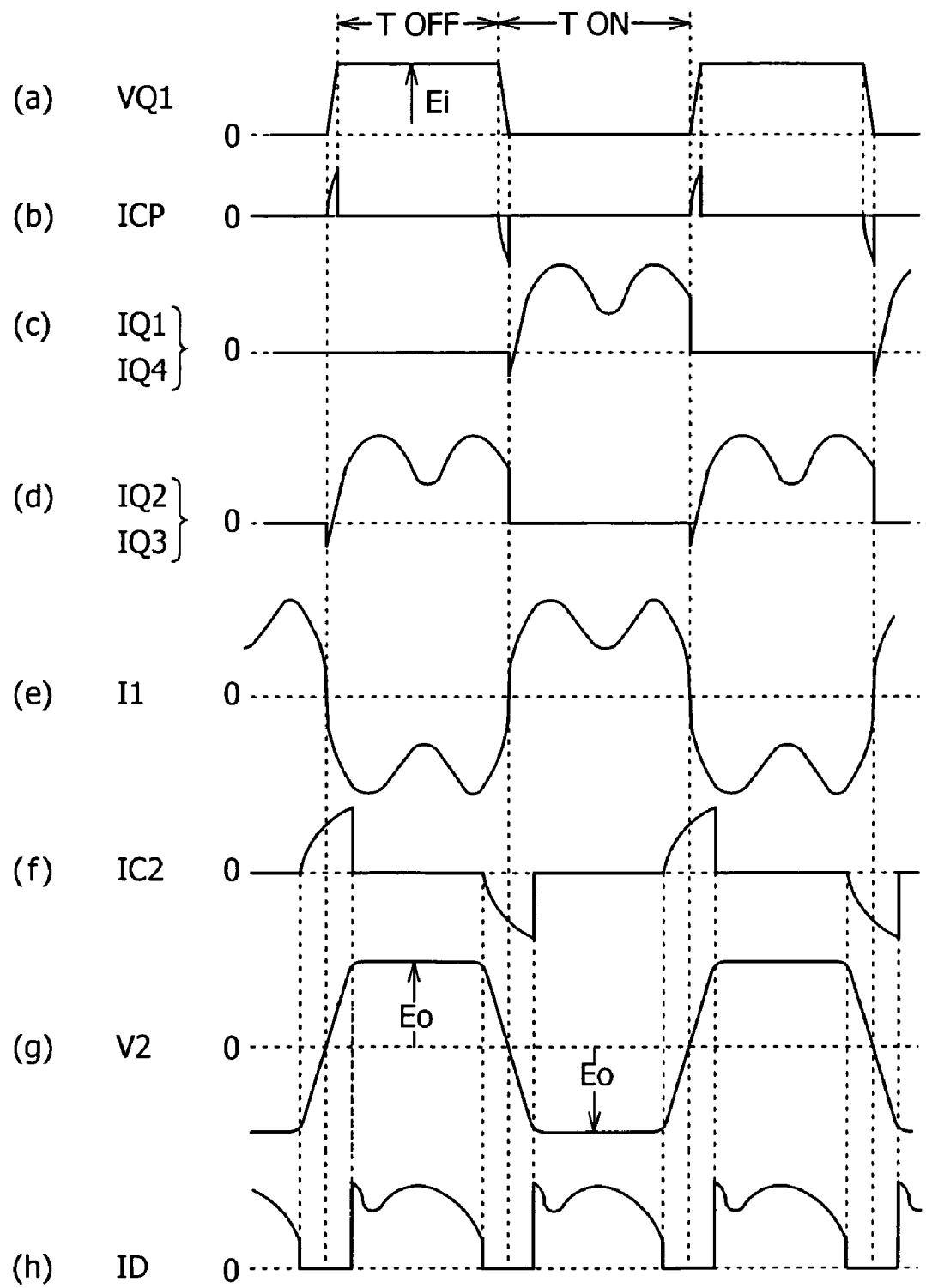
FIGS. 12(*a*) to (*h*) are waveform diagrams illustrating operation of the switching power supply circuit of the fourth embodiment.

FIG. 12 is a view illustrating operation waveforms of several components of the power supply circuit shown in FIG. 11 where the AC input voltage VAC is VAC=100 V and the load power Po is Po=200 W.

Figure 13:
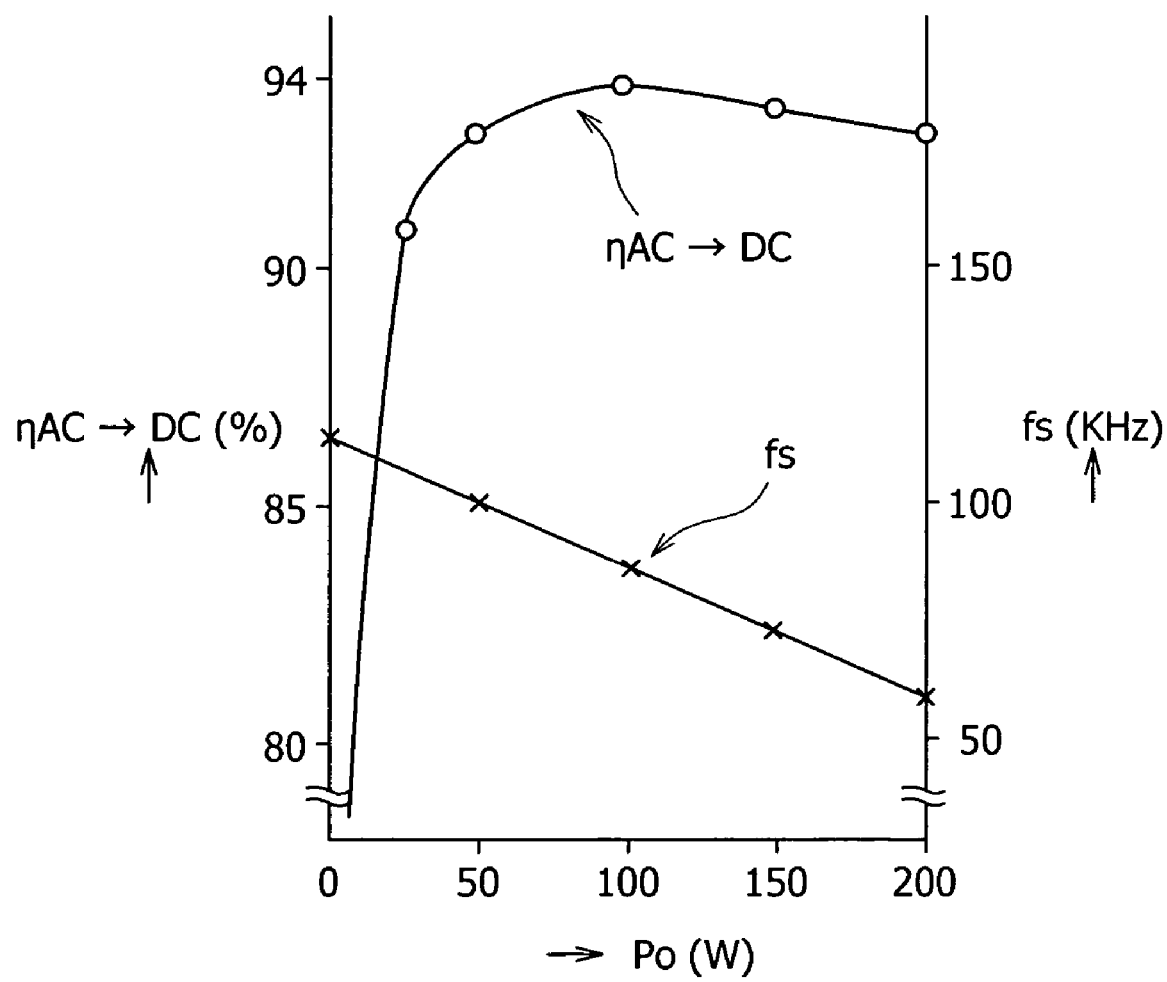
FIG. 13 is a characteristic diagram illustrating a characteristic of the switching power supply circuit of the fourth embodiment.

FIG. 13 is a view illustrating variation characteristics of the AC-DC power conversion efficiency (ηAC→DC) and the switching frequency fs with respect to a variation of the load power Po of Po=0 W to 200 W where the AC input voltage VAC is VAC=100 V.

It is to be noted that, when to obtain the measurement results illustrated in FIGS. 12 and 13, part elements of the power supply circuit shown in FIG. 11 are selected in the following manner.

First, as regards the insulating converter transformer PIT, the gap G is set to G=2.0 mm to select the coupling coefficient k=0.81. Further, the primary winding N1=secondary winding N2=23 T, the exciting inductances L1 and L2=145 µH, and the leakage inductances L1*l* and L2*l*=43 µH are selected.

Further, the primary side series resonance capacitor C1=0.082 µF and the secondary side partial voltage resonance capacitor C2=3,300 pF are selected.

As seen in FIG. 12, operation of the switching elements Q1 to Q4 of the power supply circuit shown in FIG. 11 is indicated by a collector-emitter voltage VQ1 of the switching element Q1 shown in (a) of FIG. 12, switching current IQ1 and IQ4 illustrated in (c) of FIG. 12 and switching current IQ2 and IQ3 shown in (d) of FIG. 12. In this instance, the switching elements Q1 and Q4 perform switching operation such that they are on within a period TON and are off within another period TOFF.

Here, if the switching elements Q1 and Q4 are turned on, then resonance current flows along a path of the switching element Q1→primary side series resonance capacitor C1→primary winding N1→switching element Q4. Then, the switching elements Q1 to Q4 are controlled such that the switching elements Q2 and Q3 are turned on and the switching elements Q1 and Q4 are turned off in the proximity of a point of time at which the resonance current becomes equal to zero. Consequently, resonance current now flows along another path of the switching element Q3→primary winding N1→primary side series resonance capacitor C1→switching element Q2. Thereafter, the switching elements Q1 to Q4 are controlled such that the switching elements Q1 and Q4 and the switching elements Q2 and Q3 are turned on alternately.

Meanwhile, to a primary side partial voltage resonance capacitor Cp1 connected in parallel to the switching element Q2, such partial resonance current ICP as seen in (b) of FIG. 12 flows within a short period within which the switching element Q2 is turned on or turned off. Further, though not shown, also to another primary side partial voltage resonance capacitor Cp2 connected to the switching element Q4, partial resonance current flows within a short period within which the switching element Q4 is turned on or turned off.

Further, in the power supply circuit shown in FIG. 11, switching current IQ1 and IQ4 flowing between the collector and the emitter of the switching elements Q1 and Q4 has an M-shaped waveform as seen in (c) of FIG. 12 wherein the current level decreases in the proximity substantially of the center of a period TON within which the switching elements Q1 and Q4 are turned on. Also the switching current IQ2 and IQ3 flowing through the switching elements Q2 and Q3 has such an M-shaped waveform as seen in (d) of FIG. 12 which is displaced by 180 degrees in phase from that of the switching current IQ1 and IQ4.

Figure 23:
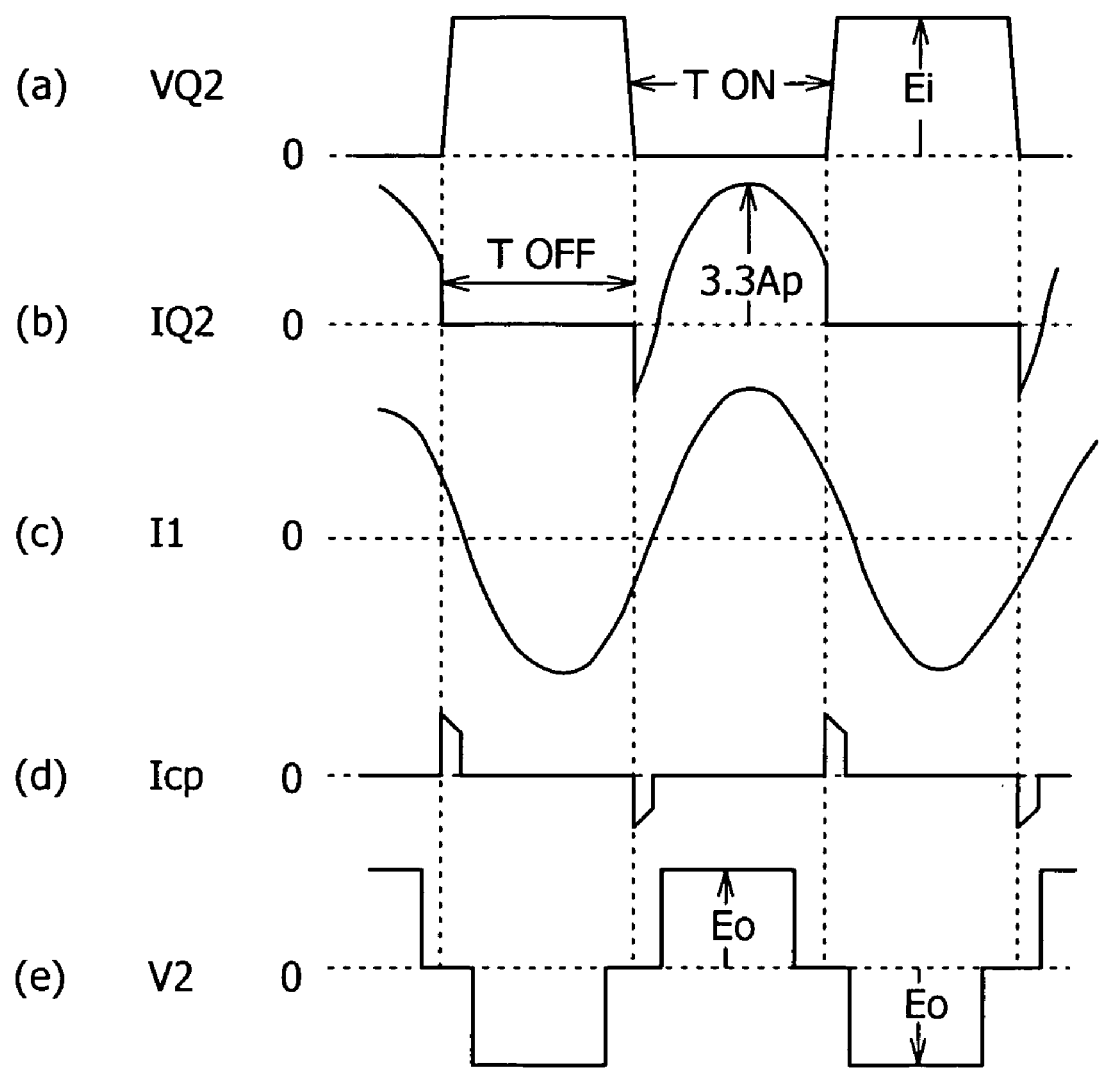
FIGS. 23(*a*) to (*e*) are waveform diagrams illustrating operation of the switching power supply circuit shown in FIG. 21.

Accordingly, if the waveforms of the switching current IQ1 to IQ4 shown in (c) and (d) of FIG. 12 and the waveform of the current IQ2 of the power supply circuit as a related art shown in (b) of FIG. 23 are compared with each other, then it can be seen that the peak value of the primary side current of the power supply circuit shown in FIG. 11 exhibits a decrease by an amount provided by the M-shaped waveform of the switching current IQ1 to IQ4.

It arises from the following factors that the switching current IQ1 to IQ4 flowing between the collector and the emitter of the switching elements Q1 to Q4 of the power supply circuit shown in FIG. 11 has an M-shaped waveform in this manner.

First, as regards the configuration, the gap G of the insulating converter transformer PIT is expanded from the conventional one to achieve decrease of the coupling coefficient k. Further, the number of turns of the secondary winding N2 is selected so that an induced voltage V2 per one turn of the secondary winding N2 may be, for example, 5.9 V/T (=135 V/23 T) or more. Furthermore, the secondary side partial voltage resonance capacitor C2 is connected in parallel to the secondary winding N2.

As a result, by a partial voltage resonance action of the capacitance of the secondary side partial voltage resonance capacitor C2 and the leakage inductance L2*l* of the secondary winding N2, a period within which the partial voltage resonance current IC2 flows through the secondary side partial voltage resonance capacitor C2 is obtained within a period within which the rectification current ID is off. In this instance, the partial voltage resonance current IC2 flows within a period within which the rectification diode which forms the bridge rectification circuit DBR on the secondary side is turned off and the rectification current ID does not flow as seen from (f) and (h) of FIG. 12. In this instance, the current flowing through the secondary winding N2 is composite current of the rectification current ID and the partial voltage resonance current IC2, and the composite current waveform exhibits an M shape. Consequently, also the series resonance current flowing through the primary winding N1 which is magnetically coupled to the secondary winding N2 has an M-shaped waveform.

In this instance, the primary side series resonance current I1 in the positive polarity direction flows through the switching elements Q1 and Q4 while the primary side series resonance current I1 in the negative pole direction flows through the switching elements Q2 and Q3. In other words, when the set of the switching elements Q1 and Q4 and the set of the switching elements Q2 and Q3 exhibit turning on/off alternately, drive current having a waveform proximate to a resonance current waveform is supplied to the primary winding N1 connected in series to the primary side series resonance capacitor C1. Then, an alternating voltage is excited also in the secondary winding N2 by an alternating voltage generated in response to the current flowing through the primary winding N1.

Then, the inter-terminal voltage V2 obtained between the positive electrode side input terminal and the negative electrode side input terminal of the bridge rectification circuit DBR connected to the secondary winding N2 is obtained with such a waveform as shown in (g) of FIG. 12 in accordance with the alternating voltage generated in the secondary winding N2 in such a manner as described above. In short, a waveform which is clamped at the absolute value level of the rectified smoothed voltage E0 within a period within which rectification current flows through the bridge rectification circuit DBR.

Further, rectification current ID having such a waveform as shown in (h) of FIG. 12 is outputted from the bridge rectification circuit DBR. Further, since, in the proximity of the zero cross at which the induced voltage V2 generated in the bridge rectification circuit DBR exhibits the zero level, such partial voltage resonance current IC2 as illustrated in (f) of FIG. 12 flows through the secondary side partial voltage resonance capacitor C2, the rectification current ID on the secondary side exhibits a discontinuous mode. However, from the primary side of the insulating converter transformer PIT, it looks that current according to a continuous mode flows through the secondary winding.

Further, the power supply circuit shown in FIG. 11 is controlled such that the switching frequency fs decreases as the load power Po becomes heavier as seen in FIG. 13. In short, it can be recognized that constant voltage control of the secondary side DC output voltage E01 is performed through switching frequency control.

More particularly, in the power supply circuit shown in FIG. 11, the gap G of the insulating converter transformer PIT is expanded from 1.0 mm of the conventional example to 2.0 mm to decrease the coupling coefficient k from 0.87 to 0.81. Then, the induced voltage V2 per one turn of the secondary winding N2 is set to V2=5.9 V/T and the capacitance value of the secondary side partial voltage resonance capacitor C2 is selectively set to 3300 pF.

In this manner, in the power supply circuit shown in FIG. 11, while the current flowing on the secondary side of the insulating converter transformer PIT exhibits a discontinuous mode, in this instance, also the waveform of the primary side series resonance current I1 flowing through the primary side series resonance capacitor C1 can be made an M-shaped waveform by a partial voltage resonance action of the capacitance of the secondary side partial voltage resonance capacitor C2 and the leakage inductance L2l of the secondary winding N2. Thus, also the current waveform of the switching current IQ1 to IQ4 flowing through the switching elements Q1 to Q4 can be made an M-shaped waveform.

Consequently, the peak level of the primary side series resonance current I1 and IQ1 to IQ4 flowing on the primary side within the range of the load power Po of Po=200 W to 0 W can be lowered, and enhancement of the AC-DC power conversion efficiency (ηAC→DC) at the load power Po=200 W to 0 W can be achieved.

According to an experiment, while, with the related art power supply circuit shown in FIG. 21, the AC-DC power conversion efficiency (ηAC→DC) at the load power Po=200 W (in a heavy load condition) is approximately 91.8%, with the power supply circuit shown in FIG. 11, the AC-DC power conversion efficiency (ηAC→DC) can be enhanced up to approximately 93.0%.

Further, where the AC-DC power conversion efficiency (ηAC→DC) of the power supply circuit shown in FIG. 21 and the AC-DC power conversion efficiency (ηAC→DC) of the power supply circuit shown in FIG. 11 are compared with each other, the AC-DC power conversion efficiency (ηAC→DC) can be enhanced from approximately 92.4% to approximately 93.6% at the load power Po=150 W, from approximately 92.0% to approximately 94.0% at the load power Po=100 W, from approximately 87.0% to 93.0% at the load power Po=50 W, and from approximately 82.0% to approximately 91.3% at the load power Po=25 W. Further, also the input power in a no-load state wherein the load power Po is Po=0 W can be reduced from approximately 3.5 W to approximately 1.7 W.

As a result, when compared with the power supply circuit shown in FIG. 21, the power supply circuit shown in FIG. 11 can achieve reduction of the AC input power by approximately 4.8 W at the load power Po=200 W, by approximately 2.0 W at the load power Po=150 W, by approximately 2.3 W at the load power Po=100 W, by approximately 3.7 W at the load power Po=50 W, by approximately 3.1 W at the load power Po=25 W, and by approximately 1.8 W at the load power Po=0 W.

Further, in the power supply circuit shown in FIG. 11, since the input rectification circuit which forms the input rectification smoothing circuit can be formed from a full-wave rectification circuit similarly as in the power supply circuit shown in FIG. 1, the input rectification smoothing circuit requires only one smoothing capacitor. Further, since the switching element is formed from a full-bridge coupling, also the voltage withstanding property of the switching elements Q1 to Q4 can be selected within a range from 400 V to 200 V, and consequently, reduction of the cost of the circuit can be achieved. Further, since also the switching characteristics of the switching elements Q1 to Q4 are enhanced, heat generation by the switching elements Q1 to Q4 can be reduced. Consequently, there is an advantage also that the necessity for a heat radiating plate for the switching elements Q1 to Q4 is eliminated.

Further, a secondary side circuit having such a configuration as shown in FIG. 4 can be applied also to the power supply circuit shown in FIG. 11.

However, with the power supply circuit shown in FIG. 1, in order to prevent abnormal oscillation operation in a low load condition, the secondary side partial voltage resonance capacitor C2 is connected in parallel to the secondary winding N2.

In contrast, in the power supply circuit shown in FIG. 11, the secondary side partial voltage resonance capacitor C2 is provided not in order to prevent abnormal oscillation operation in a low load state but in order to artificially obtain a continuous operation mode wherein, although the secondary side rectification current ID is in a discontinuous operation mode, it looks from the primary side that the secondary side rectification current ID flows continuously by allowing the partial voltage resonance current IC2 to flow through the secondary side partial voltage resonance capacitor C2 as described hereinabove.

In this instance, the secondary windings N2+N3=23 T is selected. Further, a low capacitance capacitor of 1,000 pF is selectively used for the secondary side partial voltage resonance capacitor C2.

FIG. 14 shows an example of a configuration of a switching power supply circuit as a fifth embodiment of the present invention. It is to be noted that the circuit configuration of the power supply circuit shown in FIG. 14 is substantially same as that of the power supply circuit shown in FIG. 5, and therefore, like elements are denoted by like reference characters and description thereof is omitted herein.

Also the power supply circuit shown in FIG. 14 has a configuration as a composite resonance type converter wherein another resonance circuit is combined with a series resonance circuit for making switching operation as that of the current resonance type on the primary side similarly as in the power supply circuit shown in FIG. 5.

Also in this instance, a gap G of 1.5 mm or more is formed in the central magnetic leg of the core which forms the insulating converter transformer PIT so that a loose coupling state wherein the coupling coefficient k of the primary winding N1 and secondary winding N2 or N3 is, for example, k=approximately 0.84 or less may be obtained similarly as in the power supply circuit shown in FIG. 5.

Further, a secondary side partial voltage resonance capacitor C2 is connected in parallel to the secondary winding N2 of the insulating converter transformer PIT such that the capacitance of the secondary side partial voltage resonance capacitor C2 and the leakage inductance of the secondary winding N2 form a secondary side partial voltage resonance circuit. Further, in order to obtain an secondary side DC output voltage E01 of approximately 135 V, the number of turns of the secondary winding N2 of the pits is set so that the induced voltage per one turn of the secondary winding N2 may be 5 V or more to achieve enhancement of the AC-DC power conversion efficiency (ηAC→DC) over a range from a heavy load state (125 W) to a light load state. It is to be noted that, also in this instance, an insulating converter transformer having the configuration of FIG. 19 or FIG. 20 described hereinabove can be applied to the insulating converter transformer PIT. It is to be noted that, also where the power supply circuit shown in FIG. 14 and the power supply circuit shown in FIG. 5 are compared with each other, it is considered that the power supply circuit shown in FIG. 5 can be simplified in circuit configuration in that the secondary side partial voltage resonance capacitor can be eliminated.

Figure 15:
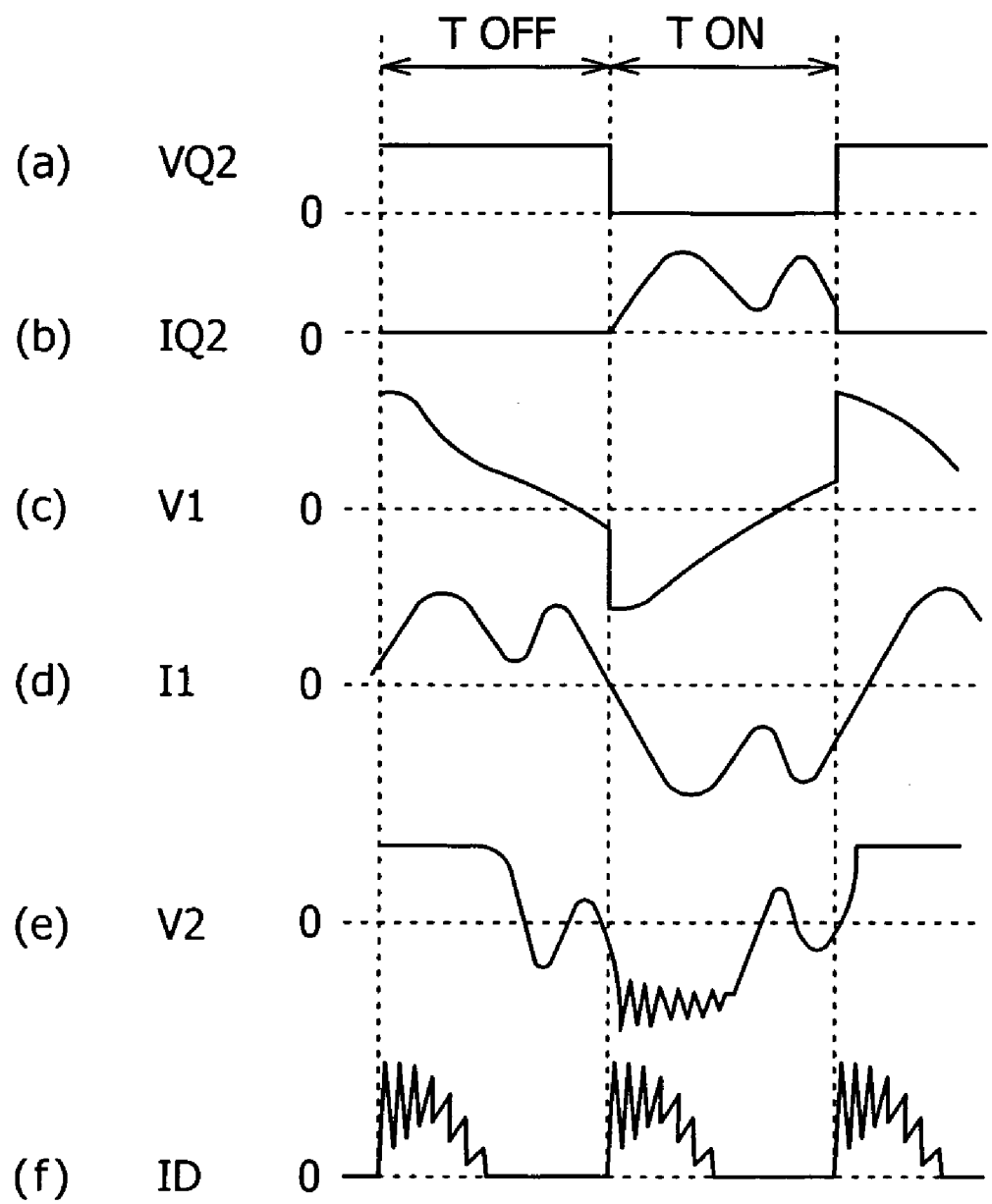
FIGS. 15(*a*) to (*f*) are waveform diagrams illustrating operation of the switching power supply circuit of the fifth embodiment.
Figure 16:
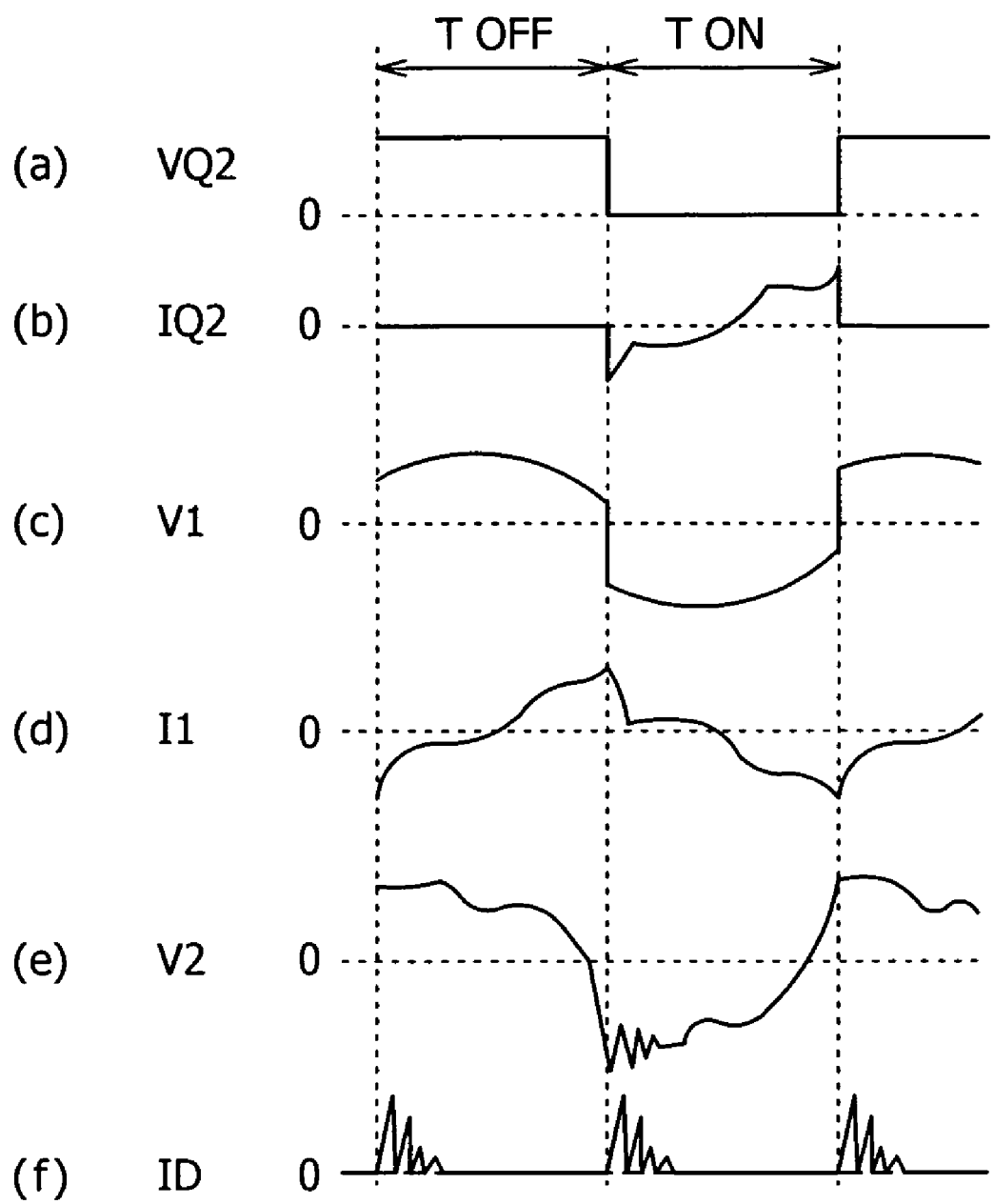
FIGS. 16(*a*) to (*f*) are waveform diagrams illustrating operation of the switching power supply circuit of the fifth embodiment.

FIGS. 15 and 16 are waveform diagrams which illustrate operation of the power supply circuit shown in FIG. 14 within a switching period. FIG. 15 illustrates operation under the conditions of the AC input voltage VAC=100 V and the load power Po=125 W. Meanwhile, FIG. 16 illustrates operation under the conditions of the AC input voltage VAC=100 V and the load power Po=25 W.

Figure 17:
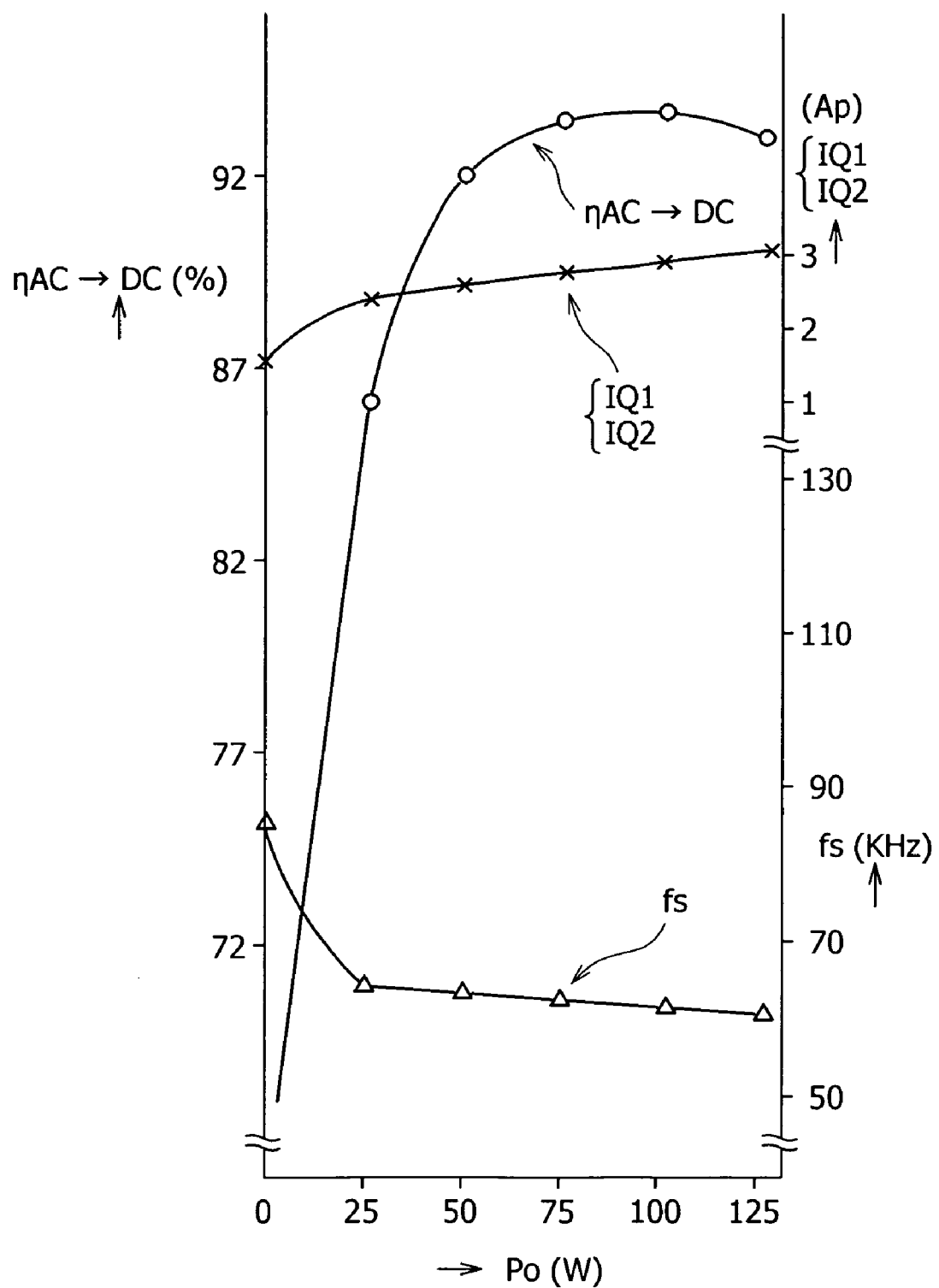
FIG. 17 is a characteristic diagram illustrating a characteristic of the switching power supply circuit of the fifth embodiment.

Further, FIG. 17 illustrates, as characteristics of the power supply circuit, variation characteristics of the AC-DC power conversion efficiency (ηAC→DC), the switching frequency fs and the switching output current IQ1 and IQ2 with respect to a variation of the load power Po of Po=0 W to 125 W.

It is to be noted that, when to obtain the measurement results illustrated in FIGS. 15 to 17, part elements of the power supply circuit shown in FIG. 14 are selected in the following manner.

First, as regards the insulating converter transformer PIT, the gap G is set to G=1.5 mm to select the coupling coefficient k=0.84. Further, the primary winding N1=28 T and the secondary winding N2=23 T+23 T are wound. In this instance, the exciting inductance L1 of the primary winding N1 is L1=186 μH; the leakage inductance L1*l* of the primary winding N1 is L1*l*=56 μH; the exciting inductance L2 of the secondary winding N2 is L2=145 μH; and the leakage inductance L2*l* of the secondary winding N2 is L2*l*=43 μH.

Further, the primary side series resonance capacitor C1=0.047 μF and the secondary side partial voltage resonance capacitor C2=1,200 pF are selected.

In the case illustrated in FIG. 15, the collector-emitter voltage VQ2 of the switching element Q12 within a period TON within which the switching element Q12 is on and another period TOFF within which the switching element Q12 is off has such a waveform as shown in (a) of FIG. 15, and the collector current IQ2 having such a waveform as shown in (b) of FIG. 15 flows to the collector of the switching element Q12.

Also in this instance, the current IQ2 which flows through the switching element Q12 has an M-shaped waveform wherein the current level exhibits a decrease in the proximity of the substantially center of a period TON within which the switching element Q12 is on. Though not shown, M-shaped current IQ1 having a phase displaced by 180 degrees from that of the current IQ2 flows also through the switching element Q11.

In this manner, the power supply circuit shown in FIG. 14 achieves increase of the leakage inductance L1*l* of the primary winding N1 by expanding the gap G of the insulating converter transformer PIT from the conventional one to achieve decrease of the coupling coefficient k. Further, the number of turns of the secondary winding N2 is selected so that the induced voltage per one turn of the secondary winding N2 may be 5 V or more, and the secondary side partial voltage resonance capacitor C2 is connected in parallel to the secondary winding N2.

In this instance, the primary side series resonance current I1 flowing through the primary side series resonance capacitor C1 is provide with such an M-shaped waveform as shown in (d) of FIG. 15 by a parallel resonance action of the capacitance of the secondary side partial voltage resonance capacitor C2 and the leakage inductance L1*l* of the primary winding N1.

Consequently, where the related art power supply circuit shown in FIG. 25 is compared, the power supply circuit shown in FIG. 14 exhibits a lower peak value of the switching current IQ2 and the primary side series resonance current I1, and enhancement of the power conversion efficiency is achieved over a range of the load power Po=0 W to 125 W.

In particular, in order to increase the leakage inductance L1*l* of the primary winding N1 and set the induced voltage V2 per one turn of the secondary winding N2 to V2=5.87 V/T, the gap G of the insulating converter transformer PIT is expanded from 1.0 mm of the conventional one to 1.5 mm to decrease the coupling coefficient k from 0.87 to 0.84.

Further, the number of turns of the primary winding N1 of the insulating converter transformer PIT is increased from 24 T to 28 T. Consequently, the leakage inductance L1*l* of the primary winding N1 is increased from 42 μH to 56 μH.

Further, as the capacitance value of the secondary side partial voltage resonance capacitor C2 in this instance, 1,200 pF is selected.

Further, in this instance, a voltage V1 of a waveform wherein the polarity is reversed between the period TON and the period TOFF as seen in (c) of FIG. 15 is obtained across the primary winding N1 of the insulating converter transformer PIT. Further, since such secondary side rectification current ID as shown in (f) of FIG. 15 flows between the center tap of the secondary winding N2 and the secondary side ground, the inter-terminal voltage V2 between the winding starting end side of the secondary winding N2 and the secondary side ground is obtained as an output of such a waveform as shown in (e) of FIG. 15.

FIG. 16 is a waveform diagram illustrating operation under the conditions of the AC input voltage VAC=100 V and the load power Po=25 W within a switching period for comparison with the waveform diagram within a switching period shown in FIG. 15.

In this instance, the collector-emitter voltage VQ2 of the switching element Q12 within a period TON within which the switching element Q12 is on and another period TOFF within which the switching element Q12 is off has such a waveform as illustrated in (a) of FIG. 16, and collector current IQ2 having such a waveform as shown in (b) of FIG. 16 flows to the collector of the switching element Q12. Also in this instance, the primary side series resonance current I1 flowing through the primary side series resonance capacitor C1 has such a waveform as shown in (d) of FIG. 16 because of a parallel resonance action of the secondary side partial voltage resonance capacitor C2 and the leakage inductance L1*l* of the primary winding N1.

In this instance, a voltage V1 of such a waveform as shown in (c) of FIG. 16 is obtained across the primary winding N1 of the insulating converter transformer PIT. Further, since such rectification current ID as illustrated in (f) of FIG. 16 flows between the center tap of the secondary winding N2 and the secondary side ground, the induced voltage V2 between the winding starting end side of the secondary winding N2 and the secondary side ground is obtained as an output of such a waveform as shown in (e) of FIG. 16.

In this manner, in the power supply circuit shown in FIG. 14, the primary side series resonance current I1 flowing through the primary side series resonance capacitor C1 is provided with an M-shaped waveform by a parallel resonance action of the capacitance of the secondary side partial voltage resonance capacitor C2 and the leakage inductance L1*l* of the primary winding N1. Consequently, the switching output current IQ1 and IQ2 flowing through the switching elements Q1 and Q2 can be provided with an M-shaped waveform.

Consequently, as can be seen from a characteristic diagram of the power supply circuit of FIG. 14 shown in FIG. 17 and the characteristic diagram of the power supply circuit of FIG. 25 shown in FIG. 28, the power supply circuit shown in FIG. 14 exhibits enhancement of the power conversion efficiency over the range of the load power Po=0 W to 125 W. It can be seen that the power conversion efficiency is enhanced particularly where the load is light.

According to an experiment, while, with the related art power supply circuit shown in FIG. 25, the AC-DC power conversion efficiency (ηAC→DC) at the load power Po=125 W is approximately 92.0%, with the power supply circuit shown in FIG. 14, the AC-DC power conversion efficiency (ηAC→DC) can be enhanced up to approximately 93.1%.

Further, where the AC-DC power conversion efficiency (ηAC→DC) of the power supply circuit shown in FIG. 25 and the AC-DC power conversion efficiency (ηAC→DC) of the power supply circuit shown in FIG. 11 are compared with each other, the AC-DC power conversion efficiency (ηAC→DC) can be enhanced from approximately 92.0 to approximately 93.7% at the load power Po=100 W, from approximately 91.5% to approximately 93.4% at the load power Po=75 W, from approximately 89.0% to 92.1% at the load power Po=50 W, and from approximately 82.5% to approximately 85.8% at the load power Po=25 W. Further, also the input power in a no-load state wherein the load power Po is Po=0 W can be reduced from approximately 4.2 W to approximately 1.7 W.

As a result, when compared with the power supply circuit shown in FIG. 25, the power supply circuit shown in FIG. 14 can achieve reduction of the AC input power by approximately 1.6 W at the load power Po=125 W, by approximately 2.0 W at the load power Po=100 W, by approximately 1.7 W at the load power Po=75 W, by approximately 1.9 W at the load power Po=50 W, by approximately 1.2 W at the load power Po=25 W, and by approximately 2.5 W at the load power Po=0 W.

Further, as shown in FIG. 17, the power supply circuit shown in FIG. 14 is controlled such that the switching frequency fs becomes lower as the load power Po becomes heavier. In other words, the switching frequency fs has a proportionally rising tendency as the switching frequency fs becomes lighter.

Thus, for example, the control range of the switching frequency fs with respect to the variation of the load power Po=125 W to 25 W of the power supply circuit shown in FIG. 14 is from approximately 61.7 kHz to 64.9 kHz.

In contrast, the control range of the switching frequency fs with respect to the variation of the load power Po=125 W to 25 W of the power supply circuit shown in FIG. 25 is from approximately 62.5 kHz to 65.8 kHz. Accordingly, in the power supply circuit shown in FIG. 14 and the power supply circuit shown in FIG. 25, the control ranges of the switching frequency fs with respect to the variation of the load power Po=125 W to 25 W are substantially equal to each other.

Further, while the control range of the switching frequency fs with respect to an input voltage variation (85 V to 140 V) of the AC input voltage VAC at the load power Po=125 W is from approximately 52.1 kHz to 76.9 kHz with the power supply circuit shown in FIG. 25, but is from approximately 58.8 kHz to 74.6 kHz with the power supply circuit shown in FIG. 14. Accordingly, the power supply circuit shown in FIG. 14 has an advantage that the control range of the switching frequency fs with respect to the input voltage variation at the load power Po=125 W is smaller by approximately 9 kHz.

A switching power supply circuit as a sixth embodiment of the present invention is described. It is to be noted that the power supply circuit of the sixth embodiment has a circuit configuration same as that of the power supply circuit shown in FIG. 10, and therefore, the power supply circuit of the sixth embodiment is omitted in the drawings.

However, in the power supply circuit described hereinabove with reference to FIG. 10, in order to prevent abnormal oscillation operation in a low load condition to achieve stable operation, the secondary side partial voltage resonance capacitor C2 is connected in parallel to the secondary winding N2. However, in the power supply circuit according to the sixth embodiment, the secondary side partial voltage resonance capacitor C2 is provided in order to artificially obtain a continuous operation mode in which the secondary side current flowing through the secondary side of the insulating converter transformer PIT flows continuously. In short, also the sixth embodiment has a configuration which includes the secondary side partial voltage resonance capacitor C2 for obtaining operation and action similar to those of the fourth and fifth embodiments described hereinabove.

Figure 18:
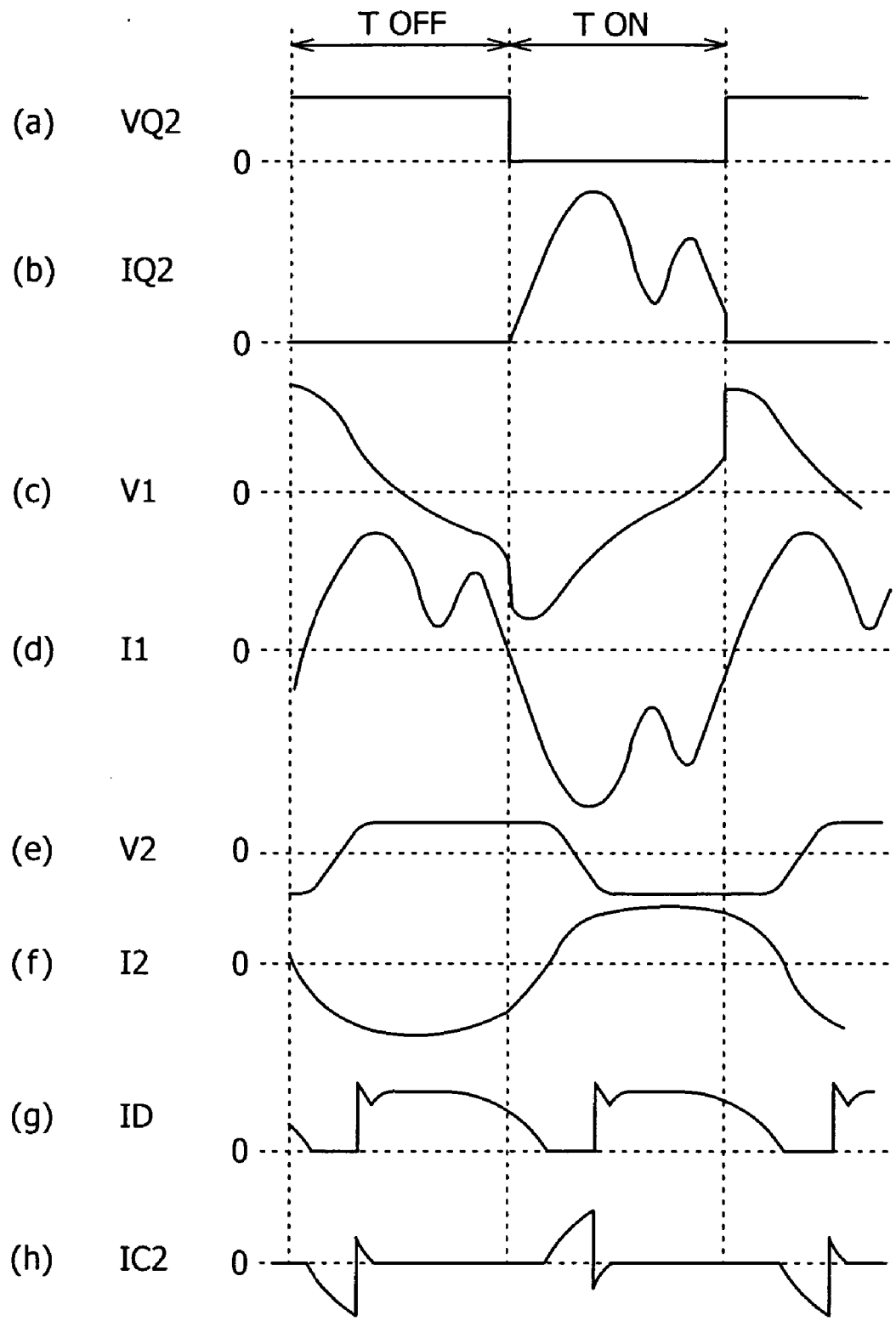
FIGS. 18(*a*) to (*h*) are waveform diagrams illustrating operation of a switching power supply circuit of a sixth embodiment.

FIG. 18 is a waveform diagram illustrating operation of the power supply circuit as the sixth embodiment within a switching period. Here, operation waveforms under the conditions of the AC input voltage VAC=100 V and the load power Po=200 W are shown.

First, the switching output current (drain current) IQ2 flowing through the switching element Q2 flows within a period TON within which the switching element Q2 is on and exhibits the zero level within another period TOFF within which the switching element Q2 is off as seen in (b) of FIG. 18.

Meanwhile, the inter-terminal voltage VQ2 of the switching element Q2 to which the primary side partial voltage resonance capacitor Cp is connected in parallel is obtained with a waveform which is clamped at the level of the DC input voltage Ei within the period TOFF within which the switching element Q2 is off and exhibits the zero level within the period TON within which the switching element Q2 is on as seen in (a) of FIG. 18.

Further, since the switching operation described above is obtained, the primary winding current I1 of a waveform shown in (d) of FIG. 18 flows through the primary winding N1. The primary winding current I1 has a waveform whose polarity is reversed in accordance with the switching period such that it has the positive polarity within the period TON but has the negative polarity within the period TOFF as seen in the figure.

Further, the inter-terminal voltage V1 of the primary winding N1 at this time has such a waveform as shown in (c) of FIG. 18.

Meanwhile, on the secondary side of the power supply circuit, such secondary side current ID as shown in (g) of FIG. 18 flows between the center tap of the secondary winding N2 and the secondary side ground, and the voltage V2 of such a waveform as shown in (e) of FIG. 18 is obtained between the winding starting end side of the secondary winding N2 and the secondary side ground. Further, the secondary side current I2 flowing through the secondary winding N2 is shown in (f) of FIG. 18. Furthermore, the partial voltage resonance current IC2 of such a waveform as shown in (h) of FIG. 18 flows through the secondary side partial voltage resonance capacitor C2 connected in parallel to the secondary winding N2.

Thus, since also the power supply circuit as the sixth embodiment having such a configuration as described above has characteristics similar to those of FIG. 17, enhancement of the power conversion efficiency over a range from a light load condition to a heavy load (200 W) condition, which is an effect similar to that of the power supply circuit shown in FIG. 14, can be achieved.

It is to be noted that, in the switching power supply circuits as the fourth to sixth embodiments described above, as regards the number of turns of the secondary winding N2 of the insulating converter transformer PIT, the number of turns of the secondary winding N2 or the primary winding N1 is selected so that the induced voltage per one turn of the secondary winding N2 may be approximately 5.9 V/T or 5.87 V/T. However, if the number of turns of the primary winding N1 or the secondary winding N2 is selected so that the induced voltage per one turn of the secondary winding N2 may be approximately 5 V/T, then the effects described above are achieved.

It is to be noted that, while the power supply circuits of the embodiments described above have a configuration which keeps the secondary side DC output voltage as a constant voltage through the switching frequency control as a constant voltage control section, they may otherwise have a different configuration for constant voltage control, for example, which includes a series regulator.

Furthermore, a power supply circuit based on the concept of the present invention can achieve intended action and effects even if the configuration for keeping the secondary side DC output voltage as a constant voltage is omitted. Accordingly, when to construct the power supply circuit based on the present invention, it can be said that it is not always necessary to provide the configuration for keeping the secondary side DC output voltage as a constant voltage.

Further, the switching power supply circuit according to the present invention is not limited to the configurations of the embodiments described above, but the constants of the part elements of essential part may be altered suitably to appropriate values in accordance with various conditions.

Further, while, in the first and fourth embodiments, a self-excited oscillation circuit is provided for the switching elements Q1 to Q4, for example, where the switching elements Q1 to Q4 are each formed from a MOS-FET or an IGBT, they may be configured correspondingly so as to perform switching operation from a separately excited oscillation circuit. On the contrary, although, as regards the power supply circuits which include the half-bridge system by two switching elements, only a configuration of the separately excited type as in the case of the second embodiment is described, they may otherwise be formed as those of the self-excited type.

The invention claimed is:

1. A switching power supply circuit, comprising:
 a rectification section for receiving a commercial AC voltage as an input thereto and performing rectification operation for the commercial AC voltage to produce a rectified voltage;
 a smoothing section for outputting a DC voltage produced by smoothing the rectified voltage from said rectification section;
 a switching section including one or a plurality of sets of two switching elements connected in series to each other between the DC voltage and a reference potential for interrupting the DC voltage from said smoothing section;
 an insulating converter transformer including a core having a gap formed therein and a primary winding and a secondary winding wound on said core for transmitting an output of said switching section obtained at said primary winding to said secondary winding;
 a primary side series resonance circuit formed at least from a capacitance of a primary side series resonance capacitor connected in series to said primary winding of said insulating converter transformer for resonating with a resonance frequency determined in advance to make operation of said switching section as that of the current resonance type;
 a driving section for driving each of said switching elements which form said switching section to switch in a switching frequency determined in advance;
 a primary side partial voltage resonance circuit provided for each of said plurality of sets of switching elements which form said switching section and formed from a capacitance of a primary side partial voltage resonance capacitor connected in parallel to a predetermined one of said switching elements and a leakage inductance component of said primary winding of said insulating converter transformer for performing partial voltage resonance operation only within a turnoff period of the switching element which forms said switching section;
 a DC output voltage production section for receiving an alternating voltage obtained at said secondary winding of said insulating converter transformer as an input thereto and performing rectification operation for the inputted alternating voltage to produce a secondary side DC output voltage; and
 a constant voltage control section for controlling said driving section in response to a level of the secondary side DC output voltage from said DC output voltage production section to vary the switching frequency to perform constant voltage control for the secondary side DC output voltage;
 a width of said gap of said core and an induced voltage per one turn of said secondary winding being set so that secondary side current to flow through said secondary winding may flow continuously.

2. A switching power supply circuit, comprising:
 a rectification section for receiving a commercial AC voltage as an input thereto and performing rectification operation for the commercial AC voltage to produce a rectified voltage;
 a smoothing section for outputting a DC voltage produced by smoothing the rectified voltage from said rectification section;
 a switching section including one or a plurality of sets of two switching elements connected in series to each other between the DC voltage and a reference potential for connecting the DC voltage from said smoothing section;
 a driving section for driving said switching section to switch in a switching frequency determined in advance;
 an insulating converter transformer including a core having a gap formed therein and a primary winding and a secondary winding wound on said core for transmitting an output of said switching section obtained at said primary winding to said secondary winding;

a primary side series resonance circuit formed at least from a primary side series resonance capacitor connected in series to said primary winding of said insulating converter transformer for resonating with a resonance frequency determined in advance to make operation of said switching section as that of the current resonance type;

a primary side partial voltage resonance circuit provided for each of said plurality of sets of switching elements which form said switching section and formed from a capacitance of a primary side partial voltage resonance capacitor connected in parallel to a predetermined one of said switching elements and a leakage inductance component of said primary winding of said insulating converter transformer for performing partial voltage resonance operation only within a turnoff period of the switching element which forms said switching section;

a DC output voltage production section for receiving an alternating voltage obtained at said secondary winding of said insulating converter transformer as an input thereto and performing rectification operation for the inputted alternating voltage to produce a secondary side DC output voltage;

a secondary side partial voltage resonance circuit formed from a capacitance of a secondary side partial voltage resonance capacitor connected in parallel to said secondary winding of said insulating converter transformer and a leakage inductance component of said secondary winding for performing partial resonance operation on the secondary side; and a constant voltage control section for controlling said driving section in response to a level of the secondary side DC output voltage from said DC output voltage production section to vary the switching frequency, which is used for the switching driving of said plurality of switching elements, to perform constant voltage control for the secondary side DC output voltage;

a width of said gap of said core and an induced voltage per one turn of said secondary winding being set so that secondary side current to flow through said secondary winding may flow continuously.

3. A switching power supply circuit according to claim 1, wherein said driving section is a driving resonance circuit which includes a driving winding and a driving resonance capacitor connected in series to said driving winding and has a switching frequency based on a resonance frequency determined by an inductance of said driving winding and a capacitance of said driving resonance capacitor.

4. A switching power supply circuit according to claim 3, wherein said driving winding of said driving section is a driving winding of an orthogonal control transformer, and said orthogonal control transformer includes said driving winding, a detection winding connected in series to said primary winding and said primary side series resonance capacitor, and a control winding wound in an orthogonal direction to said driving winding and said detection winding for being supplied with control current of a level corresponding to a variation of a level of the secondary side DC output voltage, the inductance of said driving winding being variably controlled by varying the control current.

5. A switching power supply circuit according to claim 1, wherein a center tap connected to a reference potential is provided at a central portion of said secondary winding of said converter transformer, and a rectifier and a smoothing capacitor are provided at each of the opposite end portions of said secondary winding so that full-wave rectification is performed.

\* \* \* \* \*